(12) United States Patent
Ellison

(10) Patent No.: US 11,176,675 B2
(45) Date of Patent: Nov. 16, 2021

(54) SYSTEM AND METHOD FOR CREATING AN IMAGE AND/OR AUTOMATICALLY INTERPRETING IMAGES

(71) Applicant: CONFLU3NCE LTD, Jerusalem (IL)

(72) Inventor: Tami Robyn Ellison, Jerusalem (IL)

(73) Assignee: CONFLU3NCE LTD, Jerusalem (IL)

( * ) Notice: Subject to any disclaimer, the term of this patent is extended or adjusted under 35 U.S.C. 154(b) by 0 days.

(21) Appl. No.: 16/262,884

(22) Filed: Jan. 30, 2019

(65) Prior Publication Data

US 2019/0164293 A1 May 30, 2019

Related U.S. Application Data

(63) Continuation-in-part of application No. 15/884,565, filed on Jan. 31, 2018, now Pat. No. 10,582,189.

(60) Provisional application No. 62/499,655, filed on Feb. 1, 2017, provisional application No. 62/626,208, filed on Feb. 5, 2018, provisional application No. 62/721,665, filed on Aug. 23, 2018.

(51) Int. Cl.
| | |
|---|---|
| *G06T 11/00* | (2006.01) |
| *G06T 7/136* | (2017.01) |
| *G06T 7/90* | (2017.01) |
| *G06T 7/13* | (2017.01) |
| *G06T 7/174* | (2017.01) |
| *G06K 9/00* | (2006.01) |
| *G06T 7/11* | (2017.01) |

(52) U.S. Cl.
CPC .............. *G06T 7/136* (2017.01); *G06K 9/00* (2013.01); *G06T 7/11* (2017.01); *G06T 7/13* (2017.01); *G06T 7/174* (2017.01); *G06T 7/90* (2017.01); *G06T 2207/20132* (2013.01); *G06T 2207/20221* (2013.01); *G06T 2207/30242* (2013.01)

(58) Field of Classification Search
CPC ..................................................... G06T 11/60
See application file for complete search history.

(56) References Cited

U.S. PATENT DOCUMENTS

| | | |
|---|---|---|
| 5,594,841 A | 1/1997 | Schutz |
| 5,901,245 A | 5/1999 | Warnick et al. |
| 5,987,164 A | 11/1999 | Szeliski et al. |
| 6,102,846 A | 8/2000 | Patton |

(Continued)

OTHER PUBLICATIONS

Cong, Runmin, et al. "Review of visual saliency detection with comprehensive information." IEEE Transactions on circuits and Systems for Video Technology vol. 29, No. 10 (2018): pp. 2941-2959, URL: https://arxiv.org/pdf/1803.03391.pdf.

(Continued)

*Primary Examiner* — Ian L Lemieux
(74) *Attorney, Agent, or Firm* — Sheppard Mullin Richter & Hampton LLP

(57) ABSTRACT

A method of identifying contiguities in images is disclosed. The contiguities are indicative features and various qualities of an image, which may be used for identifying objects and/or relationships in images. Alternatively, the contiguities may be helpful in ensuring that an image has a desired switching factor, so as to create a desired effect when combined with other images in a composite image. The contiguity may be a group of picture elements that are adjacent to one another that form a continuous image element that extends generally horizontally (e.g., diagonally, horizontally) across the image.

27 Claims, 24 Drawing Sheets

(56) References Cited

U.S. PATENT DOCUMENTS

| | | | |
|---|---|---|---|
| 6,507,364 B1 | 1/2003 | Bishay et al. | |
| 6,631,207 B2 | 10/2003 | Hirota et al. | |
| 6,721,461 B1 | 4/2004 | Nichani | |
| 6,978,052 B2 | 12/2005 | Beged-Dov et al. | |
| 7,102,647 B2 | 9/2006 | Sloan et al. | |
| 7,400,768 B1* | 7/2008 | Mayzlin | G06K 9/03 |
| | | | 382/177 |
| 7,532,771 B2 | 5/2009 | Taylor et al. | |
| 7,576,755 B2 | 8/2009 | Sun et al. | |
| 7,653,261 B2* | 1/2010 | Blake | G06K 9/469 |
| | | | 382/284 |
| 7,686,769 B2 | 3/2010 | Caplygin | |
| 8,078,969 B2 | 12/2011 | Harrison | |
| 8,126,269 B2 | 2/2012 | Eggert et al. | |
| 8,135,174 B2 | 3/2012 | Wiedemann et al. | |
| 8,135,182 B2 | 3/2012 | Luo et al. | |
| 8,265,349 B2 | 9/2012 | Wang | |
| 8,363,939 B1 | 1/2013 | Khosla et al. | |
| 8,471,898 B2* | 6/2013 | Neuman | H04N 13/261 |
| | | | 348/51 |
| 8,690,325 B1 | 4/2014 | Straus | |
| 8,692,930 B2 | 4/2014 | Rolston | |
| 8,737,769 B2 | 5/2014 | Finch et al. | |
| 9,081,799 B2 | 7/2015 | King, et al. | |
| 9,275,486 B2 | 3/2016 | Minamihara et al. | |
| 9,754,163 B2 | 9/2017 | Segalovitz et al. | |
| 9,885,961 B1 | 2/2018 | Amir | |
| 10,188,337 B1 | 1/2019 | Charvat | |
| 10,327,637 B2 | 6/2019 | Gelbman et al. | |
| 10,582,189 B2 | 3/2020 | Ellison | |
| 2002/0163582 A1 | 11/2002 | Gruber et al. | |
| 2004/0071349 A1 | 4/2004 | Harrington et al. | |
| 2004/0146201 A1 | 7/2004 | Sathyanarayana | |
| 2005/0089213 A1 | 4/2005 | Geng | |
| 2005/0146521 A1 | 7/2005 | Kaye et al. | |
| 2007/0291177 A1 | 12/2007 | Lahoz et al. | |
| 2008/0204548 A1 | 8/2008 | Goulanian et al. | |
| 2008/0205789 A1 | 8/2008 | Ten Kate et al. | |
| 2009/0003712 A1 | 1/2009 | Mei et al. | |
| 2009/0066786 A1* | 3/2009 | Landa | G02B 30/00 |
| | | | 348/54 |
| 2009/0297061 A1* | 12/2009 | Mareachen | H04N 19/167 |
| | | | 382/285 |
| 2010/0020160 A1* | 1/2010 | Ashbey | H04N 13/261 |
| | | | 348/43 |
| 2010/0080490 A1 | 4/2010 | Akiyama | |
| 2010/0177328 A1* | 7/2010 | Li | H04N 1/40 |
| | | | 358/1.9 |
| 2010/0191156 A1 | 7/2010 | Sakamoto | |
| 2010/0194851 A1 | 8/2010 | Pasupaleti | |
| 2010/0322522 A1* | 12/2010 | Wang | G06K 9/6211 |
| | | | 382/218 |
| 2011/0074925 A1* | 3/2011 | Turner | H04N 13/261 |
| | | | 348/46 |
| 2011/0285748 A1 | 11/2011 | Slatter et al. | |
| 2012/0027294 A1 | 2/2012 | Krolczyk et al. | |
| 2012/0044241 A1* | 2/2012 | Chen | H04N 13/261 |
| | | | 345/419 |
| 2014/0133741 A1 | 5/2014 | Wang | |
| 2014/0181682 A1 | 6/2014 | Spracklen et al. | |
| 2014/0254884 A1* | 9/2014 | Elkington | G01V 11/00 |
| | | | 382/109 |
| 2014/0294287 A1* | 10/2014 | Guo | G06T 7/536 |
| | | | 382/154 |
| 2014/0307980 A1 | 10/2014 | Hilt | |
| 2015/0164402 A1 | 6/2015 | Smith | |
| 2015/0249815 A1* | 9/2015 | Sandrew | H04N 13/122 |
| | | | 348/47 |
| 2015/0350730 A1 | 12/2015 | Kaliouby | |
| 2015/0358613 A1* | 12/2015 | Sandrew | H04N 13/261 |
| | | | 348/36 |
| 2016/0269589 A1* | 9/2016 | Sargent | H04N 1/32267 |
| 2016/0278682 A1 | 9/2016 | Khaligh-Razavi | |
| 2017/0006234 A1 | 1/2017 | Higuchi | |
| 2017/0236258 A1* | 8/2017 | Hsu | G06T 5/20 |
| | | | 382/260 |
| 2017/0251985 A1 | 9/2017 | Howard | |
| 2018/0103886 A1 | 4/2018 | Landau | |
| 2018/0220124 A1* | 8/2018 | Ellison | H04N 13/261 |
| 2019/0114777 A1* | 4/2019 | Maity | G06K 9/00201 |
| 2019/0150819 A1 | 5/2019 | Charvat | |
| 2019/0164293 A1* | 5/2019 | Ellison | G06T 7/11 |
| 2019/0175090 A1 | 6/2019 | Reiner | |
| 2019/0254581 A1 | 8/2019 | Papathomas | |
| 2019/0347801 A1 | 11/2019 | Ellison | |
| 2019/0378621 A1 | 12/2019 | Ellison | |
| 2019/0385711 A1 | 12/2019 | Shriberg | |
| 2020/0151439 A1 | 5/2020 | Johnson | |
| 2020/0349687 A1* | 11/2020 | Weng | G06T 5/50 |
| 2020/0383621 A1 | 12/2020 | Rodriguez | |
| 2020/0388178 A1 | 12/2020 | Barbuto | |
| 2020/0410257 A1* | 12/2020 | Machii | G06K 9/6268 |
| 2021/0192351 A1 | 6/2021 | Zakariaie | |
| 2021/0224601 A1 | 7/2021 | Chen | |

OTHER PUBLICATIONS

Few, Stephen. "Data visualization for human perception." The Encyclopedia of Human-Computer Interaction, 2nd Ed. (2013). Interaction Design Foundation, URL: https://www.interaction-design.org/literature/book/the-encyclopedia-of-human-computer-interaction-2nd-ed/data-visualization-for-human-perception.

Grill-Spector, Kalanit. "What has fMRI taught us about object recognition." Object categorization: Computer and human vision perspectives (2009): pp. 102-128. <URL: https://www.researchgate.net/publication/239922833_What_Has_fMRI_Taught_Us_About_Object_Recognition>.

Guberman, Shelia. "Gestalt theory rearranged: back to Wertheimer." Frontiers in psychology 8 (Oct. 11, 2017) 1782, URL: https://www.frontiersin.org/articles/10.3389/fpsyg.2017.01782/full.

Kim, Been, et al. "Do neural networks show Gestalt phenomena? An exploration of the law of closure." arXiv preprint arXiv: 1903.01069 (2019). Date printed on article Mar. 5, 2019, URL: https://arxiv.org/pdf/1903.01069.pdf.

Kornmeier, Juergen, and Michael Bach, "The Necker cube—an ambiguous figure disambiguated in early visual processing," Vision Research, vol. 45, No. 8 (Apr. 2005): pp. 955-960, URL: https://www.sciencedirect.com/science/article/pii/S0042698904005152.

Martinez-Conde, Susana, et al., "Eye movements and the perception of a clear and stable visual world." Journal of Vision vol. 8, No. 14 (Oct. 2008): i-i, , the abstract, URL: https://jov.arvojournals.org/article.aspx? articleid=2193393.

Ozkan, Kerem, and Myron L. Braunstein. "Background surface and horizon effects in the perception of Yelative size and distance." Visual cognition vol. 18, No. 2 (Feb. 2010): pp. 229-254, URL: https://www.ncbi.nlm. nih.gov/pmc/articles/PMC2929966/.

Oudeyer, Pierre-Yves. "Intelligent adaptive curiosity: a source of self-development." (2004): pp. 127-130, URL: http://cogprints.org/4144/1/oudeyer.pdf.

Thirumavalavan, Sasirooba, and Sasikala Jayaraman. "An improved teaching-learning based robust edge detection algorithm for noisy images." Journal of advanced research vol. 7, No. 6 (2016): pp. 979-989. Available online Apr. 30, 2016, <URL: https://www.sciencedirect.com/science/article/pii/S2090123216300224>.

Todorovic, Dejan. "Gestalt principles." Scholarpedia vol. 3, No. 12 (2008): 5345. URL: http://www.scholarpedia.org/article/Gestalt_principles.

Tsotsos, John K., Iuliia Kotseruba, and Calden Wloka. "Rapid visual categorization is not guided by early salience-based selection." PloS one, vol. 14, No. 10 (2019): e0224306. San Francisco, California. USA, Published Oct. 24, 2019, URL: https://journals.plos.org/plosone/article?id=10.1371/journal.pone.0224306.

Veale, Richard, Ziad M. Hafed, and Masatoshi Yoshida. "How is visual salience computed in the brain? Insights from behaviour, neurobiology and modelling." Philosophical Transactions of The Royal Society B: Biological Sciences 372.1714 (2017): 20160113. London, England. <URL: https://royalsocietypublishing.org/doi/pdf/10.1098/Ystb.2016.0113>.

(56) References Cited

OTHER PUBLICATIONS

Wagemans, Johan, et al. "A century of Gestalt psychology in visual perception: I. Perceptual grouping and figure-ground organization." Psychological bulletin, vol. 138, No. 6 (Nov. 2012): 1172, pp. 1218-1252, American Psychological Association. Washington, DC, USA, URL: https://www.ncbi.nlm.nih.gov/pmc/articles/PMC3482144/.
Workman S., Zhai M., Jacobs N. 2016. Horizon Lines in the Wild. In: British Machine Vision Conference (BMVC). Cornell University. Ithaca, New York, USA. Date on copy of article Aug. 16, 2016, URL: https://arxiv.org/pdf/1604.02129.pdf.
Zhou, Bolei et al. "Places: A 10 Million Image Database for Scene Recognition." IEEE Transactions on Pattern Analysis and Machine Intelligence, vol. 40, No. 6 (Jun. 2018): 1452-1464 ©2017 Institute of Electrical and Electronics Engineers, New York, New York, USA, URL: http://places2.csail.mit.edu/.
Yao, Ting, et al. "Exploring visual relationship for image captioning." Proceedings of the European conference on computer vision (ECCV). 2018. Springer Science+Business Media/Springer Nature. Berlin, Germany, URL: https://openaccess.thecvf.com/content_ECCV_2018/papers/Ting_Yao_Exploring_Visual_Relationship_ECCV_2018_paper.pdf.
Noroozi, Mehdi, and Paolo Favaro. "Unsupervised learning of visual representations by solving jigsaw puzzles." European Conference on Computer Vision. Springer, Cham, 2016, the abstract, URL: https://arxiv.org/pdf/1603.09246.pdf.
Kuo, Ying-Miao, et al. "Generating ambiguous figure-ground images." IEEE transactions on visualization and computer graphics vol. 23, No. 5 (Sep. 2016): pp. 1534-1545, URL: http://graphics.csie.ncku.edu.tw/Figure_ground/FG_TVCG_R2.pdf.
Guo, Yanming, et al. "A review of semantic segmentation using deep neural networks." International journal of multimedia information retrieval vol. 7, No. 2 (2018): pp. 87-93., Published on line Nov. 24, 2017, Springer Nature, Berlin, Germany, URL: https://link.springer.com/article/10.1007/s13735-017-0141-z.
Gunawan, Teddy Surya, et al. "Artificial Neural Network Based Fast Edge Detection Algorithm for MRI Medical Images." Indonesian Journal of Electrical Engineering and Computer Science vol. 7, No. 1 (Jul. 2017): pp. 123-130. Bantul, Yogyakarta, Indonesia, URL: https://www.researchgate.net/profile/Teddy_Gunawan/publication/319312808_Artificial_neural_network_based_fast_edge_detection_algorithm_for_mri_medical_images/links/5a7e3da30f7e9be137c4d896/Artificial-neural-network-based-fast-edge-detection-algorith m-for-mri-medical-images.pdf.
Dai, Bo, Yuqi Zhang, and Dahua Lin. "Detecting visual relationships with deep relational networks." Proceedings of the IEEE conference on computer vision and Pattern recognition. 2017, URL: https://openaccess.thecvf.com/content_cvpr_2017/papers/Dai_Detecting_Visual_Relationships_CVPR_2017_paper.pdf.
Couto, Javier "Object Detection with Deep Learning: The Definitive Guide," Date printed on article Jul. 13, 2020,URL https://tryolabs.com/blog/2017/08/30/object-detection-an-overview-in-the-age-of-deep-learning/.
Eagleman, David M. "Visual illusions and neurobiology." Nature Reviews, Neuroscience vol. 2 No.12 (Dec. 2001): pp. 920-926, URL: http://physiology.elte.hu/gyakorlat/cikkek/Visual%20illusions%20and%20neurobiology.pdf.
Verbeek, Piet W., and Lucas J. Van Vliet. "Line and edge detection by symmetry filters." 11th IAPR International Conference on Pattern Recognition, The Hague, The Netherlands. 1992, URL: http://citeseerx.ist.psu.edu/viewdoc/download?doi=10.1.1,218.8063&rep=rep1&type=pdf.
Ren, Xiaofeng, Charless C. Fowlkes, and Jitendra Malik. "Figure/ground assignment in natural images." European Conference on Computer Vision. Springer, Berlin, Heidelberg, 2006, URL: https://link.springer.com/content/pdf/10.1007/11744047_47.pdf.
Hramov, Alexander E., et al. "Classifying the perceptual interpretations of a bistable image using EEG and artificial neural networks." Frontiers in neuroscience 11 (Dec. 4, 2017): 674, URL: https://www.frontiersin.org/articles/10.3389/fnins.2017 00674/full.

Sachin, Narkhede, et al. "Brain tumor detection based on bilateral symmetry information." arXiv preprint arXiv:1412.3009 (2014). Int. Journal of Engineering Research and Applications www.ijera.com ISSN : 2248-9622, vol. 4, Issue 6 (Version 3), Jun. 2014, pp. 98-103, URL: https://arxiv.org/ftp/arxiv/papers/1412/1412.3009.pdf.
Guberman, Shelia, Vadim V. Maximov, and Alex Pashintsev. "Gestalt and image understanding." Gestalt Theory vol. 34, No. 2 (2012): 143. URL: http://iitp.ru/upload/publications/6097/GubMaxPas2012.pdf.
"Sobel operator". Wikipedia, hosted by WikiMedia Foundation, Jun. 7, 2016, URL: https://en.wikipedia.org/wiki/Sobel_operator, which can be found at the Way Back Machine Archive at http://web.archive.org/web/20160607212450/https://en.wikipedia.org/wiki/Sobel_operator.
"Color depth". Wikipedia, hosted by WikiMedia Foundation, Dec. 27, 2017 URL: https://en.wikipedia.org/wiki/Color_depth, which can be found at the Way Back Machine Archive at https://web.archive.org/web/20161227211655/en.wikipedia.org/wiki/Color_depth.
"Image stitching". Wikipedia, hosted by WikiMedia Foundation, Nov 9. 2016, URL: https://en.wikipedia.org/wiki/Image_stitching, which can be found at the Way Back Machine Archive at https://web.archive.org/web/20161109225805/https://en.wikipedia.org/wiki/Image_stitching.
"Tangible user interface". Wikipedia, hosted by WikiMedia Foundation, Nov. 23, 2016, URL: https://en.wikipedia.org/wiki/Tangible_user_interface, which can be found at the Way Back Machine Archive at https://web.archive.org/web/20161123210418if_/https://en.wiki pedia.org/wiki/Tangible_user_interface.
"Saliency map". Wikipedia, hosted by WikiMedia Foundation, May 31, 2019, URL: https://en.wikipedia.org/wiki/Saliency_map, .which can be found at the Way Back Machine Archive at https://web.archive.org/web/20190531093317/https://en.wikipedia.org/wiki/Saliency_map.
"Color-blocking". Wikipedia, hosted by WikiMedia Foundation, Nov. 21, 2016, URL: https://en.wikipedia.org/wiki/Color-blocking, which can be found at the Way Back Machine Archive at https://web.archive.org/web/20161121091117/en. wikipedia.org/wiki/Color-blocking.
Padmapriya, B. "Volumetric measurement of urinary bladder and classification of polycystic ovarian syndrome using ultrasound images". Chapter 3, Edge-based image segmentation followed by quad split technique. Anna University. Aug. 2015. Citation <URL: http://hdl.handle.net/10603/141792, Appears in Departments: Faculty of Information and Communication Engineering, Thesis URL: https://shodhganga. inflibnet.ac.in/bitstream/10603/141792/11/11_chapter%203.pdf.
Conflu3nce, ltd. Jerusalem, Israel, Sep. 9, 2016, Website URL: http://www.conflu3nce.com, which can be found at the Way Back Machine Archive at https://web.archive.Org/web/20160909045642/http://www.conflu3nce.com:80/.
Neiman, Rachel. "Photage Autumn Impressions" Israel 21C. Nov. 7, 2014. San Francisco, CA USA, URL: https://www.israel21c.org/photage-autumn-impressions/, secondary referenced article URL: https://www.pinterest.com/pin/279223245622920855/?nic_v2=1a2WNfQVI.
Visual Illusion Extraordinaire—Patent Pending Juxtaposition Technique Transforms Complex Images Into 3D Art Kwithout Special Glasses) Jun. 4, 2013, URL: https://www.newswire.com/visual-illusion-extraordinaire/224926.
Long, Yang, et al. "From zero-shot learning to conventional supervised classification: Unseen visual data synthesis." Proceedings of the IEEE Conference on Computer Vision and Pattern Recognition. 2017. pp. 1627-1636, URL: https://openaccess.thecvf.com/content_cvpr_2017/papers/Long_From_Zero-Shot_Learning_CVPR_2017_paper.pdf.
Wang, Jason, and Luis Perez. "The effectiveness of data augmentation in image classification using deep learning." Convolutional Neural Networks Vis. Recognit 11 (2017). (date printed on article Dec. 13, 2017), URL: https://arxiv.org/pdf/1712.04621.pdf.

(56) References Cited

OTHER PUBLICATIONS

Elk on hill image, "popular 500px nature photos in 2016," (Where I want to be) || Автор фото Furstset (Photo credit: Furstet), 2016, URL: https://zefirka.net/2016/03/22/20-populyarnyx-fotografij-prirody-na-500px-v-2016-godu/.

"Walden Pond," Tom Grill, Dec. 13, 2015, p. 1, URL: http://www.tomgrill.com/projects/walden-pond/, which can be found at the Way Back Machine Archive at http://web.archive.org/web/20151213000513/http://www.tomgrill.com/projects/walden-pond.

Tineye.Com, "color extraction and reverse image search tools," Jan. 18, 2017, Toronto, Ontario, Canada, URL: tineye.com, which can be found at the WayBack Machine Archive at http://web.archive.org/web/20170118191553/http://labs.tineye.com/color/.

Conflu3nce, ltd., Jerusalem, Israel, Apr. 21, 2019, website and video content, Website content: http://www.conflu3nce.com, which can be found at the WayBack Machine archive at http://web.archive.org/web/20190421160008/http://conflu3nce.com/index.htm.

Non-final Office Action dated Jan. 26, 2021 for U.S. Appl. No. 16/427,305, filed May 30, 2019.

\* cited by examiner

| Ambiguity Factor | Range | Formula |
|---|---|---|
| Contig Number ($AF_1$) | 0-6 | Sobel or Differential Edge counts using color and thresholded images. Compare b/w area counts |
| Color Block ($AF_2$) | 1.0-6.0 | Sequential color extraction using reduced 2-6 color images, quadrant based identification of dominant colors (total, Q1-A4, top, bottom, right, left) |
| Linearity ($AF_3$) | -1.0 to +1.0 | $C_{linearity} = C_A + C_D$ where $C_A$ is the angularity across the contiguity and $C_D$ is a break in the contiguity |
| Continuity($AF_4$) | -1.0 to +1.0 | $C_{cont} = C_{VD} + C_{IE}$ |
| Color Block Depth (100) ($AF_5$) | 0.25 to 1.0 | define color block distribution (see rules table) |
| Spatial Color-Contig ($AF_6$) | -2.0 to +2.0 | compare contig # to color block # |
| Ambi Value* | | 0.75 to 2.25 |

FIG. 11

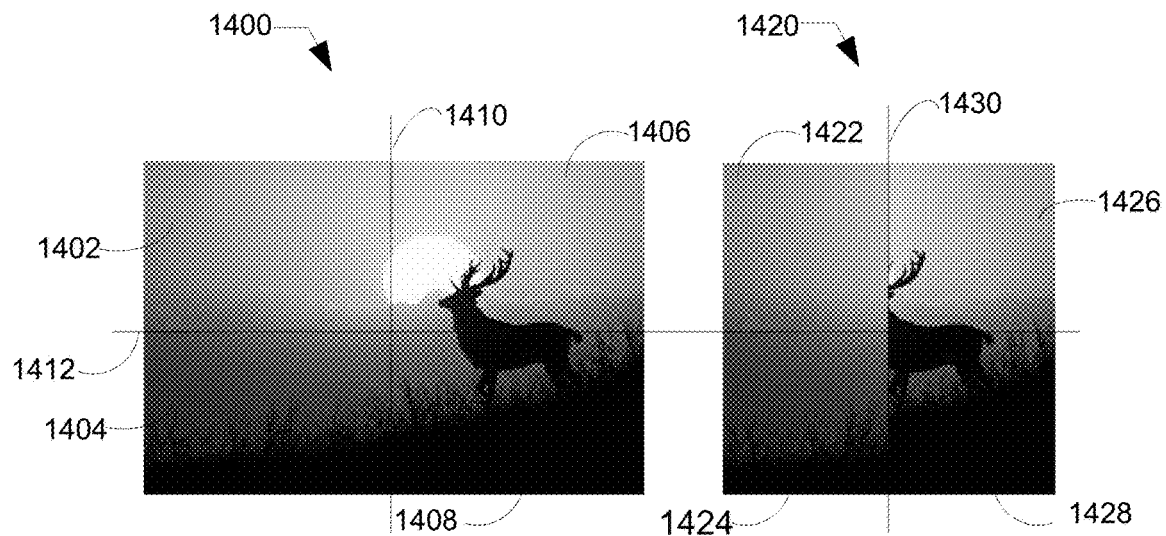
FIG. 14A
FIG. 14B
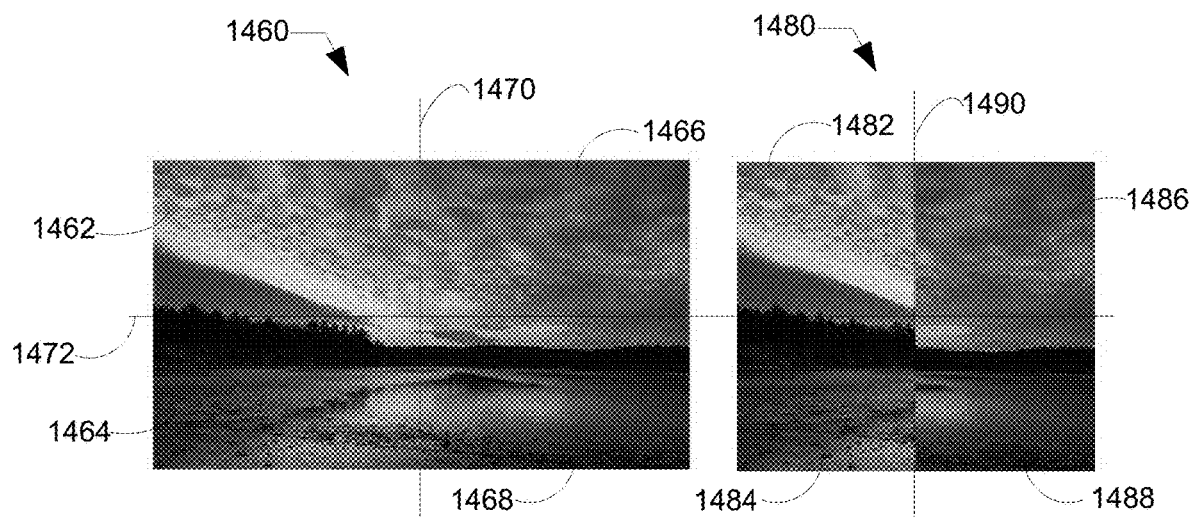
FIG. 14C
FIG. 14D

FIG. 24
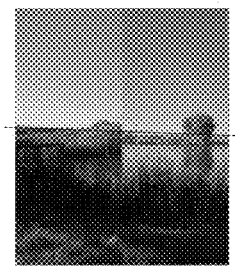 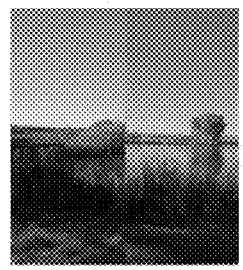 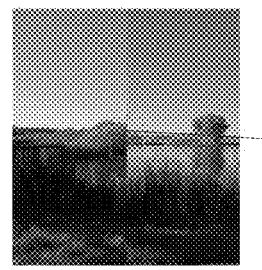
FIG. 25     FIG. 26     FIG. 27
 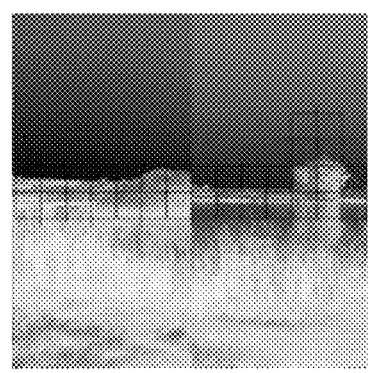
FIG. 28     FIG. 29

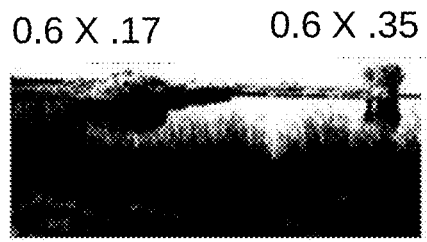
FIG. 31
FIG. 32
FIG. 30
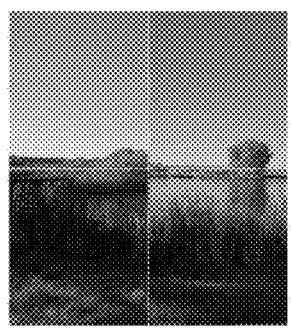
FIG. 33
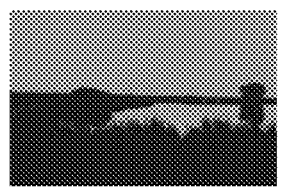
FIG. 34
FIG. 35
FIG. 36
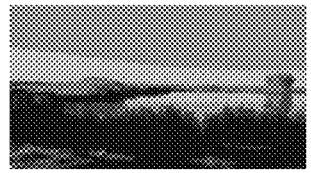
FIG. 37
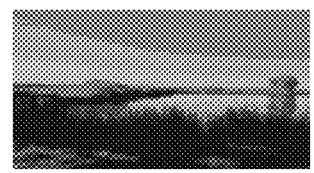
FIG. 38

SYSTEM AND METHOD FOR CREATING AN IMAGE AND/OR AUTOMATICALLY INTERPRETING IMAGES

PRIORITY CLAIM AND CROSS-REFERENCE TO RELATED APPLICATIONS

This application claims priority benefit of U.S. Provisional Patent Application No. 62/626,208, entitled "SYSTEM AND METHOD FOR IDENTIFYING CONTIGUITY CHARACTERISTICS IN AN IMAGE," filed on Feb. 5, 2018, by Tami Ellison, which is incorporated herein by reference; this application also claims priority benefit of U.S. Provisional Patent Application No. 62/721,665, entitled "MULTI-PURPOSE INTERACTIVE COGNITIVE PLATFORM," filed on Aug. 23, 2018, by Tami Ellison, which is incorporated herein by reference; this application is a continuation-in-part of U.S. patent application Ser. No. 15/884,565, entitled "SYSTEM AND METHOD FOR GENERATING COMPOSITE IMAGES," filed on Jan. 31, 2018, by Tami Ellison, which is incorporated herein by reference; U.S. patent application Ser. No. 15/884,565 claims priority benefit of U.S. Provisional Patent Application No. 62/499,655, entitled "PHOTAGE 2.5D—METHOD AND SYSTEM FOR CREATING DYNAMIC VISUAL ILLUSIONS USING COMPLEX, JUXTAPOSED AMBIGUOUS IMAGES," filed on Feb. 1, 2017, by Tami Robyn Ellison, which is incorporated herein by reference; and the contents of all of the above listed applications are incorporated herein by reference, in their entirety.

FIELD

This specification relates image processing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Computer image recognition methods, such as with Microsoft Caption AI, recognize some predominant objects in a picture, but sometimes the identification of the object is inaccurate, or the identification misses other elements and details.

BRIEF DESCRIPTION OF THE FIGURES

In the following drawings like reference numbers are used to refer to like elements. Although the following figures depict various examples of the invention, the invention is not limited to the examples depicted in the figures.

FIG. 7 shows an example of a flowchart of a method of computing the contiguity values.

FIG. 8 shows an example flowchart of part of the method of FIG. 7. FIG. 8 is a continuation of FIG. 7, and is a method of computing a contiguity linearity value.

FIG. 11 shows a table summarizing an embodiment of various computations that may be useful in analyzing images.

FIG. 14A-D shows the application of a stitching analysis with quadrant-based color blocking, according to at least one embodiment.

FIG. 24 shows an example of measuring the angle of a dominant contiguity of the image of FIG. 20.

FIGS. 25-27 shows an example of stitching/peeling the image of FIG. 20.

FIG. 28 shows an example of measuring a vertical distractor of the image of FIG. 20.

FIG. 29 shows an example of measuring a vertical distractor of a reversed image of the image of FIG. 20.

FIG. 30 shows an example of another method of measuring a vertical distractor of the image of FIG. 20.

FIGS. 31 and 32 show an example of a method of measuring irregular edges of the image of FIG. 20.

FIG. 33 show an example of a stitched image of FIG. 20 used in a color block analysis.

FIGS. 34-38 show example of color reduced images of the image of FIG. 20, in which FIG. 34 is reduced to 2 colors, FIG. 35 is reduced to 3 colors, FIG. 36 is reduced to 4 colors, FIG. 37 is reduced to 5 colors, and FIG. 38 is reduced to 6 colors.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Figure 1:
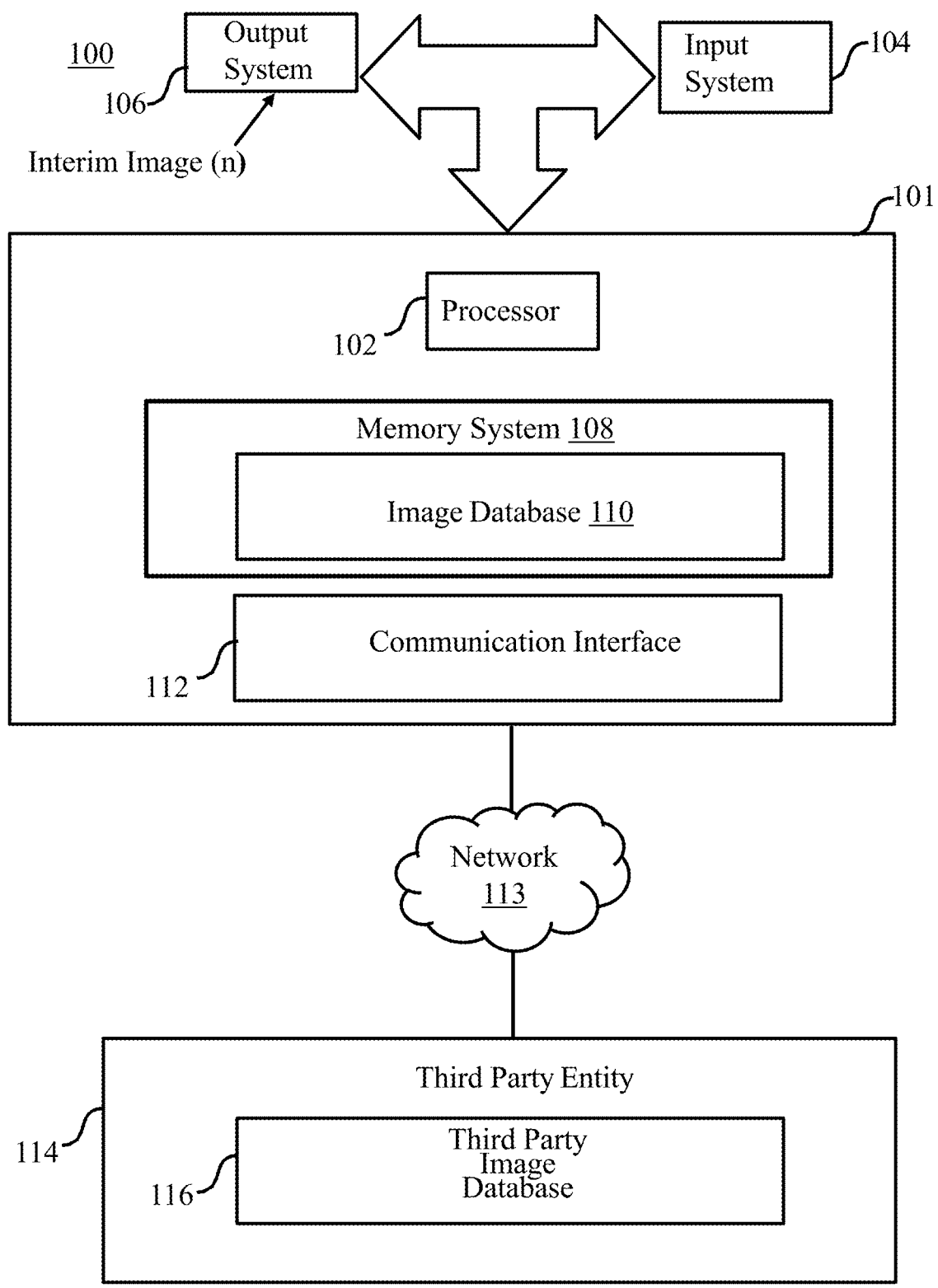
FIG. 1 is a block diagram of an example of a system that generates analyzing an image.

FIG. 1. is a block diagram of an example of system 100 that generates analyzing an image. System 100 may include machine system 101, which has processor system 102, input system 104, output system 106, memory system 108, image database 110, communication interface 112, and third party system 114 and third party database 116. In other embodiments, System 100 may include additional components and/or may not include all of the components listed above.

System 100 is a network of systems including multiple machines communicating in via a network.

Machine system 101 includes one or more machines that run an image analysis system. Each machine of machine system 101 may run the image analysis system independently and/or as a distributed system. Machine system 101 may be an Internet server, network server, a system for analyzing images and/or may be a mobile machine or other machine that includes machine vision, for example.

In at least one embodiment, in machine system 101, each image and/or each image of a plurality of images is analyzed to identify contiguity characteristics in the image that facilitate identification of visual when the viewer observes the image. A contiguity is a region a continuous region having relatively uniform characteristics. For example, the color of a contiguity may be uniform within preset thresholds. In an embodiment, the contiguities that are of interest are those that extend horizontally across the image, which for example extend at least 75% of the width of the image (in other embodiments smaller or larger percentages of the width maybe used). In an embodiment, the contiguities of interest make an angle of 45 degrees or less with a horizontal line (in other embodiments the angle may be 75 degrees or less, 60 degrees or less, 30 degrees or less, or 15 degrees or less, for example). A contiguity and separate regions of the image and/or may define an a region of the image. In at least one embodiment, the contiguity characteristics may include contiguity lines that separate different color segments in the image, e.g. the edges between the color segments. A contiguity line may separate a contiguity form other regions. In at least one embodiment, the images display landscape scenes in which the contiguity lines are naturally occurring border lines. The edges of the contiguity may separate color sections of the image, for example between different parts of a background, a foreground, an object, and/or the like. The contiguity characteristics may enable a person viewing the image to mentally organize parts of the scene displayed in the image into different areas that allow the viewer to understand what is shown, and can be used to train a computer vision system to recognize continuities between disrupted contiguities, which may be absent or obstructed. The contiguity lines can provide a contrast enabling the person's brain or the computer vision system to organize and evaluate the image and to resolve ambiguity in the image, image set or image scene. In at least one embodiment, contiguities may be used to inform image classification and can be used to identify content and aid in finding objects and/or regions in the image.

In at least one embodiment, contiguities may represent an edge. Continuity may have a color. The contiguity may be defined and used to train systems to recognize parts of a whole. Contiguities may be seen as familiar horizon lines, interfaces with known and/or predictable color and content characteristics, and may include shape and density information. For example, color blocks may aid in the identification of objects contained in an image or a plurality of images or image scene.

In at least one embodiment, contiguities may be formed by color blocks and which can be viewed as the image's background with or without a foreground image (also referred to as figure). The figure can be an object or other content element, including another color block which can disrupt the continuity of at least one color block.

In at least one embodiment, the system 101 may be configured to identify the contiguity lines by applying various image processing filters to the image, e.g. Sobel, thresholding, and/or the like, to identify the contiguities in the image. In at least one embodiment, the system can be configured to perform a stitch analysis of the image to designate the contiguity characteristics that are preferred for use for analyzing components in the image and to facilitate identifying images with similar or overlapping characteristics. Stitching may involve removing portions of an image. For example, vertical strips of the image may be removed. The vertical strips may be of the same size as one another and equally spaced from one another. For example, the system can be configured to identify and designate contiguity lines that are horizontal, vertical, within a predetermined degree of angle deviation and/or the like, according to predetermined parameters provided to the system. Peeling or backstitching refers to putting back parts of the image that was removed. In at least one embodiment, the stitch analysis may enable the system to identify contiguity characteristics that are obstructed by objects in the image that segment the contiguity line. In at least one embodiment, the stitch analysis may be implemented by dividing the image into a predetermined number of sections, e.g., three sections. At least one of the sections can be manipulated, e.g. shifted, to mask or overlap another section in the image. The overlapping section can then be peeled off the masked section to reveal portions of the masked section such that the contiguity line can be identified from the portions of the image being revealed via the peeling.

In at least one embodiment, the system can be configured to identify the contiguity lines by applying various image processing filters to the image, e.g., Sobel, thresholding, and/or the like, to identify the contiguities in the image. In at least one embodiment, the system can be configured to perform a stitch analysis of the image to designate the contiguity characteristics that are preferred for use for analyzing components in the image and to facilitate identifying images with similar or overlapping characteristics. For example, the system can be configured to identify and designate contiguity lines that are horizontal, vertical, within a predetermined degree of angle deviation and/or the like, according to predetermined parameters provided to the system. In at least one embodiment, the stitch analysis can enable the system to identify contiguity characteristics that are obstructed by objects in the image that segment the contiguity line. In at least one embodiment, the stitch analysis can be implemented by dividing the image into a predetermined number of sections, e.g. three sections. At least one of the sections can be manipulated, e.g. shifted, to mask or overlap one other section in the image. The overlapping section can then be peeled off the masked section to reveal portions of the masked section such that the contiguity line can be identified from the portions of the image being revealed via the peeling.

Processor system 102 may include any one of, some of, any combination of, or all of multiple parallel processors, a single processor, a system of processors having one or more central processors and/or one or more specialized processors dedicated to specific tasks.

Input system 104 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 104 may include a graphical use interface that third parties can interact with.

Output system 106 may include any one of, some of, any combination of, or all of a display, a monitor system, a handheld display system, a printer system, a speaker system, a connection or interface system to a sound system, an interface system to peripheral devices and/or a connection and/or interface system to a computer system, intranet, and/or internet, for example. Output system 106 may include a network interface via which third parties interact with machine system 101. Input system 104 and output system 106 may be the same system or different system.

Memory system 108 may include, for example, any one of, some of, any combination of, or all of a long-term storage system, such as a hard drive; a short-term storage system, such as random access memory; a removable storage system, such as a floppy drive or a removable drive; and/or flash memory. Memory system 108 may include one or more machine-readable mediums that may store a variety of different types of information. The term machine-readable medium is used to refer to any non-transient medium capable carrying information that is readable by a machine. One example of a machine-readable medium is a non-transient computer-readable medium. Another example of a machine-readable medium is paper having holes that are detected that trigger different mechanical, electrical, and/or logic responses. Memory system 108 may store one or more images for users to select from and/or that users may use. Image database 110 may be a database of images that to be analyzed that were analyzed and/or from which composite images may be formed. Optionally image 110 may include a relational database. Optionally, image database 110 may associates with images and/or portion of an image attributes, such as contiguity, ambiguity, juxtaposition, a color map and/or other color properties, saliency, complexity, aesthetic value, edge information, and/or threshold information. Optionally, image database 110 may be associated with a database server for retrieving information from image database 110. Optionally, the image server (if present) may be a relational database and the database server may be executed by processor system 102.

Communication interface 112 is an interface via which communications are sent to and from machine system 101. Communications interface 112 may be part of input system 104 and/or output system 106.

Third party system 114 is a third party system and interacts with machine systems 101 to analyze images. Third patty system 114 may include third party database 116, which stored images of the third party system 114. Third party system 114 is optional.

Processor system 102 may be communicatively linked input system 104, output system 106, memory system 108, and communication interface 112. Processor system 102 may be communicatively linked via any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

In at least one embodiment, machine system 101 may be configured to receive an image, for example, from third party system 114. The image may be stored in the image database 108, which stores the image. Processor system 102 may retrieve can provide the image to processor 102 for the contiguity analysis. In at least one embodiment, machine system 101 can be configured to size and crop the image to predetermined size. The cropping may remove portions of the image that are not wanted, or edges of the image that cause the image to be too large for generating the composite image, and to centralize dominant contiguities and color blocks. In at least one embodiment, machine system 101 can be configured to generate the image grid map. The image grid map can be generated, for example, by designating the Cartesian coordinate system to the image designating numerical coordinates of the image. In at least one embodiment, the numerical coordinates can be pixel locations of the image or can be used to construct quadrants or some other predetermined areas of the image.

Figure 2:
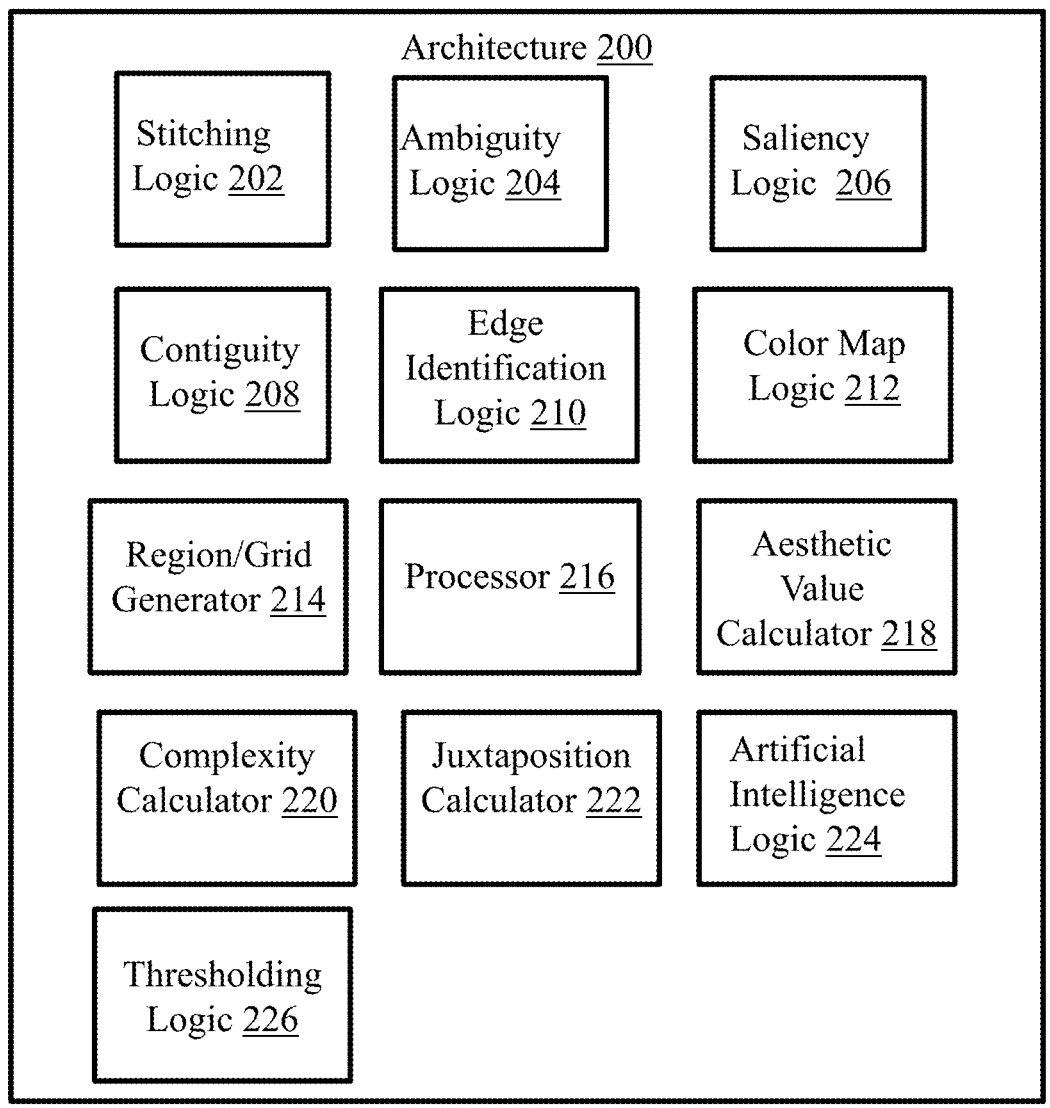
FIG. 2 is a block diagram of an embodiment of the architecture of the machine system of FIG. 1.

FIG. 2 is a block diagram of the architecture 200 of machine system 101, which designed to analyze an image. Architecture 200 may include stitching logic 202, ambiguity logic 204, and saliency logic 206, contiguity logic 208, edge identification logic 210, and color map logic 212, region/grid generator 214, processor 216, aesthetic value calculator 218, complexity calculator 220, juxtaposition calculator 222, and the artificial intelligence logic 224. In other embodiments, architecture 200 may include additional components and/or may not include all of the components listed above.

Stitching logic 202 performs the stitching of an image. During the stitching a portion of an image (e.g., one or more horizontal strips may be removed from the image). After removing the portions of the image, the image may be analyzed, such as by computing the contiguity, and optionally other characteristics of the image, such as the saliency, color block depth, ambiguity, color map, edge detection, color threshold map, brightness and/or threshold map. After removing the portions of the image, and analyzing the image, the portions may be returned. After each portion of the image is restored, the image is again analyzed to determine contiguities and optionally other characteristics.

Ambiguity logic 204 determines the ambiguity of an image and/or of a portion of an image. The ambiguity is a measure of the degree to which there are elements that may have multiple interpretations.

Saliency logic 206 computes the saliency of an object, image, or portion of an image. The saliency is the about of contrast within an object or element. The saliency is a measure of internal contrast. Regions of high saliency may be regions that include a foreground type object. Contiguity logic 208 identifies contiguities in an image and/or contiguity lines in an object. Contiguity lines may aid in identifying separate regions that have different meaning from one another, such as separating land from sky, foreground from background, street from buildings, plains from mountains or hills. Edge identification logic 210 may identify edges in an image. In an embodiment, edge identification logic may divide images into regions that have pixels with brightness values above and below a particular threshold, to help identify regions in the image. Edge identification logic 210 may also divide regions that are below a particular color threshold. Color map logic 212 maps the color of different regions. The image may be separated out into image of different color (e.g., a blue image made from the blue pixels of the image, a red image made from the red pixels of the image and a green image made from the green pixels of an image.

Region/grid generator 214 may generate a grid and/or divide the image in multiple regions (e.g., quadrants, halves, thirds, eighths), which may be further divided into sub regions. The regions, subregions, and grid may be used to identify the locations of elements in an image. Processor 216 may be an embodiment of processor system 102, and may be capable of implementing a stitching analysis, determining contiguities, compute aesthetic value, complexity, and/or juxtaposition of an image and/or portions of an image. Artificial intelligence logic 224 may be a neural network or other artificial intelligence logic. Artificial intelligence logic 224 may receiving a training set of images, and/or stitched images that are associated with the contiguity values, an identification of contiguities, an identification of contiguity lines, an aesthetic value, a complexity value, and/or juxtaposition values, and an identification of objects in the image. After receiving the training set and artificial intelligence logic 224 is trained to identify the objects based on the stitched images that are associated with the contiguity values, an identification of contiguities, an identification of contiguity lines, an aesthetic value, a complexity value, and/or juxtaposition values.

Figure 3:
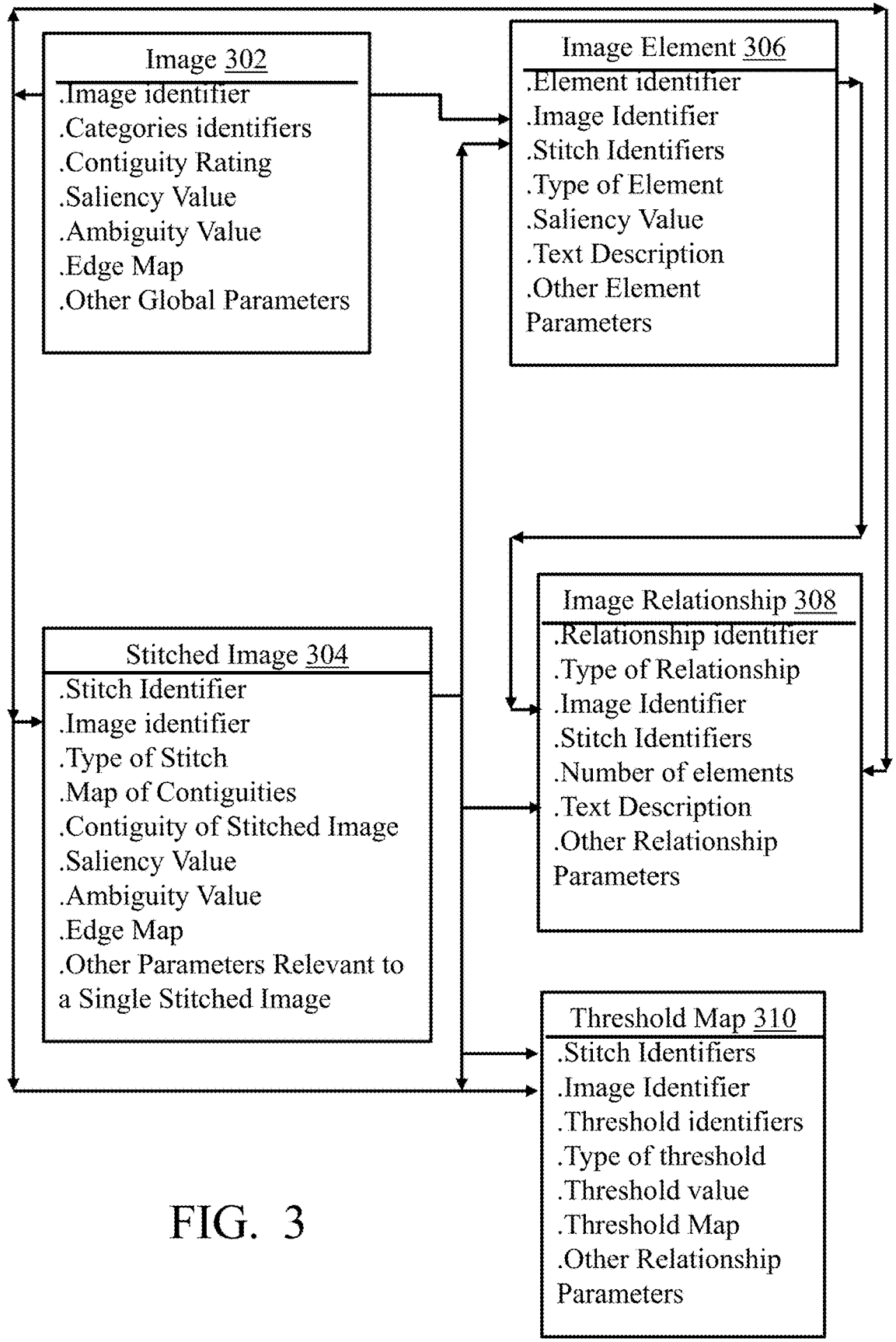
FIG. 3 shows an example of entity relationship diagrams of an embodiment of a database schema of the system of FIGS. 1 and 2.

FIG. 3 shows an example of entity relationship diagrams of an embodiment of a database schema 300 of the system of FIGS. 1 and 2. Database schema 300 may include an image table 302, a stitched image table 304, an image element table 306, a relationship image table 308, and threshold map 310.

Image table 302 may include various attributes associated with the image. A particular object of a table may be found by search the attributes of the object. For example, a user may find a particular image by searching for an image having a particular set of attributes. For example, image table 302 may include among its attributes an image identifier, category identifier, a saliency value, and a contiguity rating, edge map, and other attributes. Image table 302 may also include an edge may generated by an edge identification table. The image identifier is a primary key and unique identifier of an image.

Each of the stitched image table 304, an image element table 306, a relationship image table 308, and threshold map 310, have the image identifier as key, so that each threshold map, image relation, image element may be associated with one image. The stitched image table 304 lists each stitched image of each image. Each image may have multiple stitched images. The attributes of the stitched image table may include the image identifier, stitched image identifier, map of contiguities, stitched image contiguities, saliency value, ambiguity value, edge map, and other attributes. The image identifier identifies the image that the stitched image was generated from, and the stitched image identifier uniquely identifies the stitched image. Stitched image table 304 may also include a type, which describes the type of stitch, which may indicate how much of the image was removed and/or the portion removed. The saliency, ambiguity, and edge map may be the saliency value, ambiguity, and edge map of the stitched image.

Image element table 306 may be a table of elements identified in images. Image element table 306 includes an image identifier identifying which image the element was found in, and an element identifier identifying the element. Image element table 308 includes an image identifier, relationship identifier, stitched identifier, type of element, text description, and other attributes. Image element table 306 may include a descriptor that identifies any relationship that involves the element. Image element table 306 may include a type of element that describes the type of element.

Relationship table 308 may be a table of relationships identified in images. Relationship table 308 includes an image identifier, relationship identifier, stitched identifier, type of relations, text description, number of elements and other elements. The image identifier identifies which image the relationship was found in, and the relationship identifier uniquely identifies the relationship. Relationship table 308 may include a descriptor that identifies any objects in the image that are related by the relationship. The saliency value is the saliency of the element.

Threshold map table 310 may be a table that lists all the threshold maps. The attributes of threshold table 310 may include relationship identifier, stitch identifier, type of threshold, threshold value, threshold map.

The image identifier identifies the image from which the threshold map was created, and a threshold map identifier identifies the threshold map. The type of threshold indicates the type threshold, such as whether the threshold map is a black and white threshold map or color threshold map. Threshold attribute is the value used as the threshold for making the threshold map.

Figure 4:
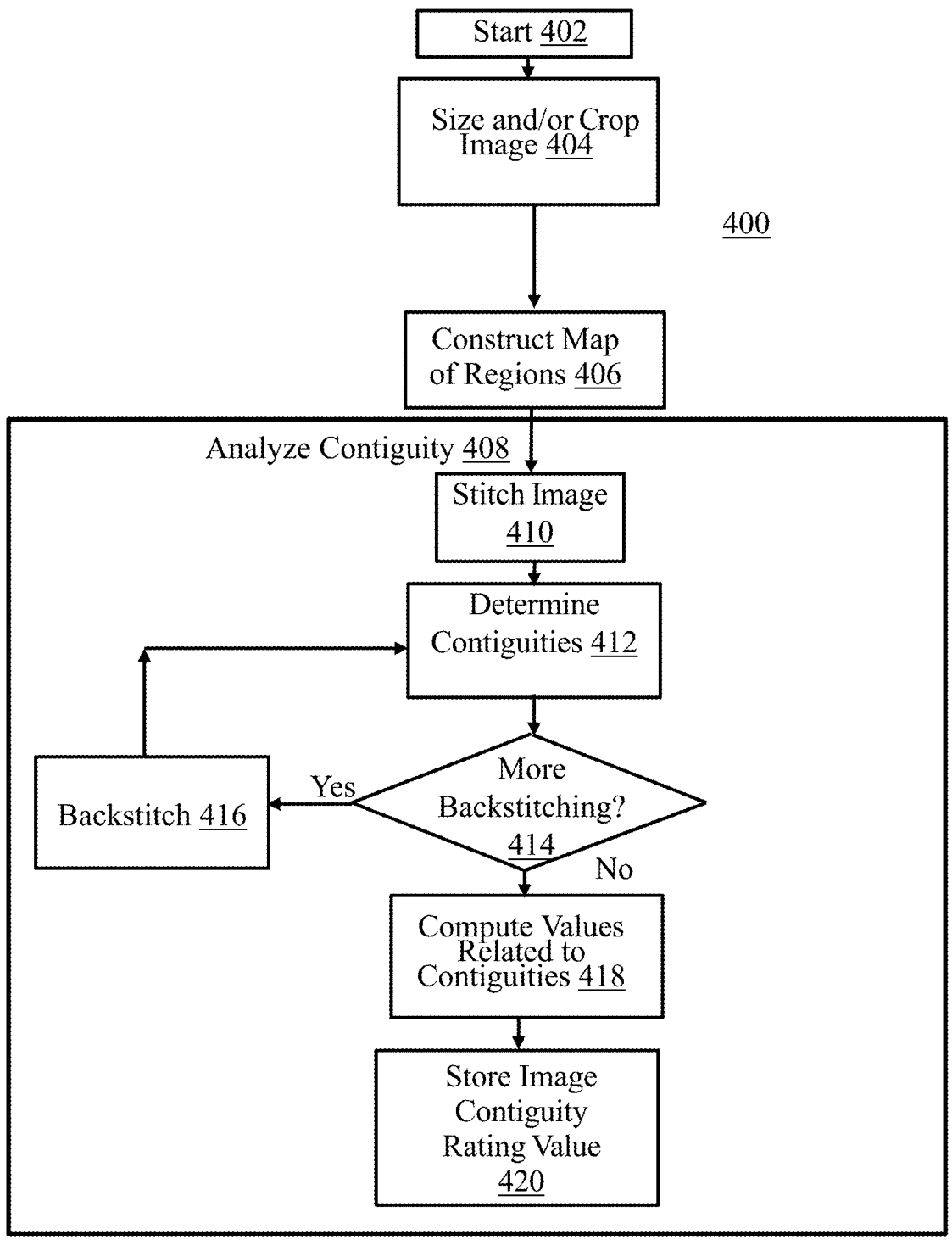
FIG. 4 shows an example of a flowchart for performing a contiguity analysis of an image.

FIG. 4 shows an example of a flowchart 400 for performing a contiguity analysis of an image. In step 402, method 400 starts. For example, in step 402, one or more images are received, retrieved, captured, taken and/or formed, via processor 102 and/or communication interface 112.

In step 404, the image may be sized and cropped (step 404 is optional), via processor 112. In other words, the image may be enlarged or shrunk. In at least one embodiment, machine system 101 may be configured to size and crop the image to a predetermined size. The cropping may remove portions of the image that are not wanted, or edges of the image that cause the image to be too large for generating the composite image, and to centralize dominant contiguities and color blocks.

In step 406, a quadrant map and an image grid map are generated, via region/grid generator 214. In at least one embodiment, machine system 101, via region/grid generator 214, may generate a quadrant map, which can equally divide the image into quadrants spanning the entire area of the image (or into another number of regions, such as halves, thirds, fifths, sixths, eighths, etc. In at least one embodiment, the quadrants can be arranged along a Cartesian coordinate system including an X-axis and a Y-axis, in which the center of the Cartesian coordinate system can be predetermined according to predetermined parameters, such as position of dominant content, color blocks, and/or the like. In other embodiments, other coordinate systems may be used, such as polar coordinates, hyperbolic coordinates, elliptical coordinates, etc.

In at least one embodiment, machine system 101, via region/grid generator 214, may be configured to generate the image grid map. The image grid map can be generated, for example, by designating the Cartesian coordinate system to the image designating numerical coordinates of the image. In at least one embodiment, the numerical coordinates can be pixel locations of the image or can be used to construct quadrants or some other predetermined areas of the image. In at least one embodiment, machine system 101, via region/grid generator 214, is configured to generate a measurement area within the image grid map. The measurement area can be designated as a predetermined area of the image grid map in which the contiguity characteristics can be identified. In at least one embodiment, the measurement area enables identification of objects in the image.

In step 408, the contiguities of the image are analyzed, via contiguity logic 208. In at least one embodiment, machine system 101, via contiguity logic 208, is configured to analyze the image to identify contiguities in the image. In at least one embodiment, the contiguity of the image can include contiguity lines, e.g. the edges that separate different regions of the image according to color differences between the areas, color combinations, and/or the like. In at least one embodiment, the contiguities can enable a viewer of the image to identify objects, backgrounds, foregrounds, or the like in the image. The contiguities may appear in different locations within the image according to the visual content of the image, image set, or image scene comprised of a at least one image. Optionally, the contiguities are identified, via contiguity logic 208, prior to performing any of the substeps of step 408.

In step 410, one or more images are stitched, via stitching logic 202, by removing one more parts of the image. Optionally, the parts removed may be rectangular sections stretching from the top of the image the bottom of the image. For example, the middle third of the image may be removed.

In step 412, the contiguities of the stitched image are analyzed, by contiguity logic 208. The stitching may facilitate determining contiguities and determining objects that interfere with the contiguity, breaking up the contiguities. There is object interference and/or a distinction between color blocks that have similar color but different colors. In at least one embodiment, the stitch analysis may include masking and progressively peeling portions of the image to enable analyzing a reduced portion of the image to enable defining contiguity characteristics, e.g. contiguity lines, horizon lines, interfaces breaking up the lines, linearities, continuities, regularities, for example. The steps for stitching and peeling are discussed further below.

In step 414, a determination is made whether it is desired to backstitch the image. If it is desired to backstitch, the method proceeds to step 416. In step 716 the image is backstitched. Optionally, each time step 416 is performed a fraction of the image that was removed is put back into the image. After step 416, the method returns to step 412, where the backstitched image analyzed (e.g., for contiguities). Steps 412, 414, and 416 may be performed multiple times, until all of the backstitching desired is performed.

In at least one embodiment, machine system 101, can be configured to perform the serial backstitch to the image, image set or image scene. The serial backstitch can compress the contiguity edge analysis by arranging in an adjacent manner the non-adjacent sections of an image. The serial backstitch can be configured to compress the image on which the contiguity and/or edge analysis by bringing together non-adjacent sections of the image.

Returning to step 414, if all the backstitching needed has been performed, the method proceeds to step 418. In step 418, the computations of the multiple implementations of step 416 are combined. For example, the number of contiguities determined in each backstitch are averaged by the total number backstitching steps 716 were performed. The backstitching and evaluation of contiguities is discussed further below.

In step 420, an image contiguity rating ("CR") value is stored in association with the image. Optionally, the locations of the contiguities are also stored in association with the data, for further analysis of the image. In at least one embodiment, machine system 101 can be configured to store the image CR value. The image CR value can include a rating that enables machine system 101 to determine an image compatibility for use in generating the composite images. The image CR value can be based on multiple parameters, such as the definiteness of the contiguity in the image, the number of contiguities identified in the image, spatial distribution of the contiguities, width and color composition of the contiguities, and/or the angularity of the contiguity.

Figure 5:
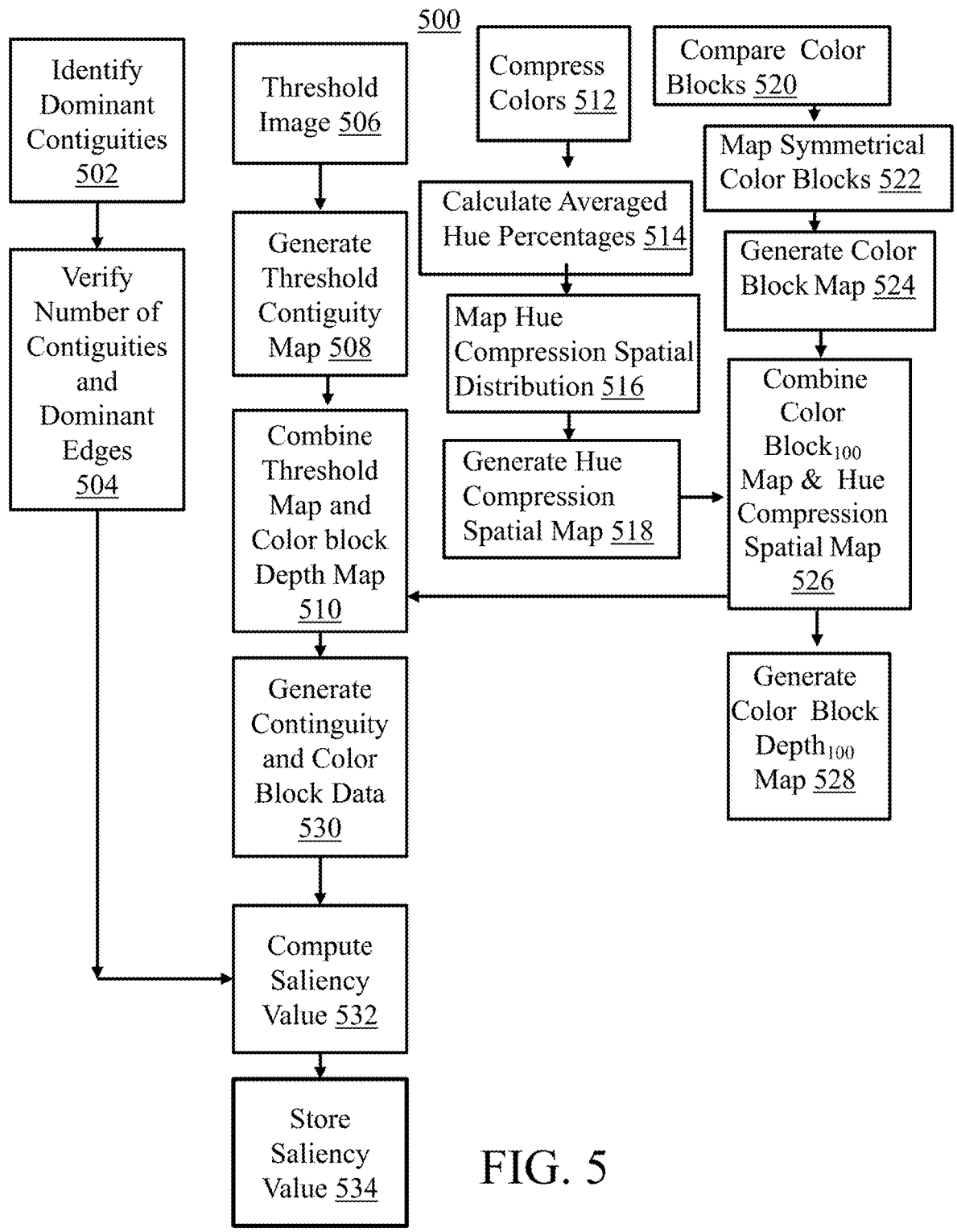
FIG. 5 shows an example of flowchart of an embodiment of a method for computing parameters associated with contiguities and/or contiguity lines.

FIG. 5 shows an example of flowchart of an embodiment of a method 500 for computing parameters associated with contiguities and/or contiguity lines. FIG. 5 schematically illustrates a method for generating contiguity parameters, according to at least one embodiment.

FIG. 5 schematically illustrates a method 500 for generating a contiguity rating value. In step 502 dominant contiguities are identified by edge identification logic 210. In at least one embodiment, machine system 101 is configured to identify dominant contiguities. The dominant contiguities can be identified, for example, implementing Sobel filters to the image, or another edge identification method. The dominant contiguities can be the edges of the image as well as the color blocks in the image.

In step 502, the total number of contiguities and dominant edges are identified in the image. In an embodiment, dominant edge is an edge that extends across at least a majority of the image. In an embodiment, a dominant edge is an edge that is longer than the majority of edges. In an embodiment, a dominant edge is an edge that is longer than the majority of edges and extends more horizontally than vertically. In an embodiment, a dominant edge extends horizontally across 75% or more of the image. In at least one embodiment, machine system 101 is configured to verify the total number of contiguities and the dominant edges in the image. The total number of dominant edges can be determined by performing a corner and border identification of the image and identifying edges between color blocks that are above a predetermined contrast level. Optionally, a dominant edge has a contrast between adjacent regions that is above a predetermined threshold. For example, in an embodiment, a dominant edge has a contrast of at least 8:1, at least 10:1, at least 20:1, or at least 100:1.

In step 504 thresholding is performed by a threshold Logic 226. Thresholding logic 226 may form a binary image by setting pixels of the original image above the threshold to white (or black) and the pixels below the threshold being set to black (white). The threshold may be for brightness, a particular color, and/or hue. In at least one embodiment, machine system 101, by thresholding logic 226, may be configured to apply a threshold filter function to the image. The threshold filter function of thresholding logic 226 may aid in partitioning the image into a foreground and background. The thresholding of thresholding logic 226 may be based on a particular reduction of the colors in the image.

The reduction of the color in the image may be performed by the representing a color that is not in the color palette of machine that made the image with the closest color in the palette and/or a dithering pattern of the close colors. The threshold filter function of thresholding logic 226 may generate a binary image of the image to enable edge recognition between the foreground, the background, objects in the image, for example. The threshold filter function may include computing, by thresholding logic 226, a histogram, and clustering the colors into bins and setting the threshold, so as to operate between two clusters of bins. Thresholding logic 226 may choose the threshold based on color, hue, or brightness level that divides between, colors, hues or brightnesses that are associated with different levels of entropy (e.g., perhaps pixels having a brightness of above 200 are associated with regions having more entropy than those below the threshold and so the binary image is formed with the threshold set a brightness of 200). The threshold of thresholding logic 226 may be set based on an object attribute. For example, pixels that are known to be associated with a particular attribute or interest (e.g., an object of interest) tend to have a particular color or brightness and so the threshold may be set and a color or brightness above or below that particular color. The threshold of thresholding logic 226 may be based on spacial filtering. For example, certain regions of the image may be removed from the image, prior to setting the threshold. In at least one embodiment, a multi-level thresholding filter can be implemented by thresholding logic 226 to designate a separate threshold for each of the red, green, and blue components of the image, which can then be combined, for example. Alternatively, multiple brightness thresholds may be set by thresholding logic 226 to produce multiple binary images.

In step 506, thresholding logic 226 may generating a threshold-spacial map (which may be referred to as a T-spatial map). The threshold spacial map stores the locations (e.g., the pixel coordinates of each pixel of the original image that has a value above a threshold and/or each pixel of the original image that has a pixel blue below a threshold may be stored as the T-spacial map). In at least one embodiment, machine system 101 can be configured to generate, by thresholding logic 226, the T-spatial map, for example, by implementing a threshold filter to the image.

In step 512, color hues are compressed, by color map logic 212. The compression of the colors may involve, for each pixel determining which of a predetermined number of colors the pixel of the original image is closest to. In at least one embodiment, machine system 101 can be configured to compress the color hues. The color hues compression may reduce the colors in the image to a predetermined number of colors, for example, within a range of 1-6 colors, for example.

In step 514 the averaged hue percentages are computed, color map logic 212. For example, for each of the predetermined colors the percentage of the total number of pixels in the image that are binned with (closest to) one of the predetermined colors. Thus, if one of the colors (e.g., red) has 2500 pixels associated with that color and the image has 1096×1096 pixels, then there are 2500*100%/(1096×1096) =0.2% red pixels. In at least one embodiment, machine system 101 can be configured to calculate, via color map logic 212, the averaged hue percentages. Optionally, a map is constructed having the pixel locations (e.g., pixel coordinates) of each color. The averaged hue percentages of the colors identified in the image locations.

In step 516, the hue compression ("HC") spatial distribution is mapped by the color map logic 212. In at least one embodiment, machine system 101 can be configured, by the color map logic 212, to map the hue compression spatial distribution. In other words, the probability of a pixel in a particular region is computed (e.g., as the percentage of the pixels in a particular region). The HC spatial distribution can be correlated to location according to a higher-order probability distribution and/or correlation between the pixels of the image and the location of the colors in the image.

In step 518, a hue compression spatial map may be generated by color map logic 212. In at least one embodiment, machine system 101 can be configured to generate the hue compression spatial map. The hue compression spatial map provides a mapping of the colors provided through the hue compression. As part of step 518, color map logic 212 may compute the locations of color blocks (each color block has the color of the average of the color of the block. Optionally, each block of a grid overlaid over the image is assigned its average color as the color of that block, by color map logic 212.

In step 522 color blocks are compared to one another, by color map logic 212. In at least one embodiment, machine system 101 can be configured, by color map 212, to compare the color blocks, which can determine different color blocks in the image and determines similarities and dissimilarities within and across the image grid map. The color blocks can be compared according to different quadrants in the image grid, being compared to determine the different values. For example, in a black and white image, the color block comparison can differentiate between colors having a binary value of zero for white color blocks and a binary value of one for black color blocks. A second example, where the image includes color blocks such as green and blue, where each color is represented by a distinct value, which enables comparing the color blocks within the image grid map.

In step 524, symmetrically-placed color blocks are mapped by color map logic 212.

In at least one embodiment, machine system 101, by color map logic 212, may be configured to map color blocks that have a symmetrical shape. Machine system 101, by color map logic 212, may determine that the color blocks are symmetrical according to the pixel location of the color block pixels on the image grid map and can evaluate the asymmetry of a color block, by color map logic 212. In at least one embodiment, the number of grid boxes of the color block on the image grid map may be compared, by color map logic 212 to determine the edges of the color block to determine that the color block is symmetric, across and within a color block, and can be compared to color blockST data obtained as discussed in FIGS. 6 and 12.

In step 526, a color block 100 map is generated by color map logic 212. In at least one embodiment, machine system 101 can be configured to generate the color block 100 map. The image can be divided into a predetermined number of quadrants that can be defined as positive and negative values arranged on the Cartesian coordinate system. The number of color block patterns identified by machine system 101 in each quadrant relative to other quadrants in the image can provide a relation analysis of different portions of the image and can be mapped onto the image grid map to generate the color block 100 map.

In step 528 the hue compression spatial map and color block 100 map are combined (e.g., integrated). In at least one embodiment, machine system 101 can be configured to integrate the hue compression spatial map and the color block 100 map. The hue compression spatial map generated from the threshold function can be aligned with the color block 100 map to provide a unified map for recognizing the necessary edges for designating the contiguities in the image based on the color composition. The integration of the hue compression spatial map and color block 100 map can maintain the embedded color information of the image.

In step 530 a color block depth 100 is generated In at least one embodiment, machine system 101 can be configured to generate the color block depth 100, which is the composited map including the overlaid information obtained by aligning the hue compression spatial map and the color block 100 map.

In step 532, the T-spatial map and the color block depth 100 are combined. In at least one embodiment, machine system 101 can be configured to combine (e.g., integrate) the T-spatial map and the color block depth 100.

In step 534, a contiguity number is generated by contiguity logic 208. Color blocks and spatial data are also generated. In at least one embodiment, machine system 101 can be configured to generate the contiguity number, the color blocks and the spatial data. The contiguity number may be the number of contiguities designated in the image based on predetermined parameters.

In step 536 an image saliency value is generated. In at least one embodiment, machine system 101 can be configured to generate the image saliency value. The image saliency value provides a pixel's unique quality and enables easier analysis of the image. The image saliency value sets contour extracts from the image to enable edge detection, e.g. each pixel in a region that are similar with respect to a predetermined characteristic or computed property, such as color, intensity, texture or the like.

In step 538, the saliency value is stored in image database 110 and/or passed on to other methods that make use of the saliency. The image saliency value, which is a measure of internal contrast, contributes to the dominance of a subset of image characteristics defined in part or whole by continuous and/or contiguous color blocks of commonly recognizable elements and their corresponding juxtapositions, or as defined by their shape.

Figure 6:
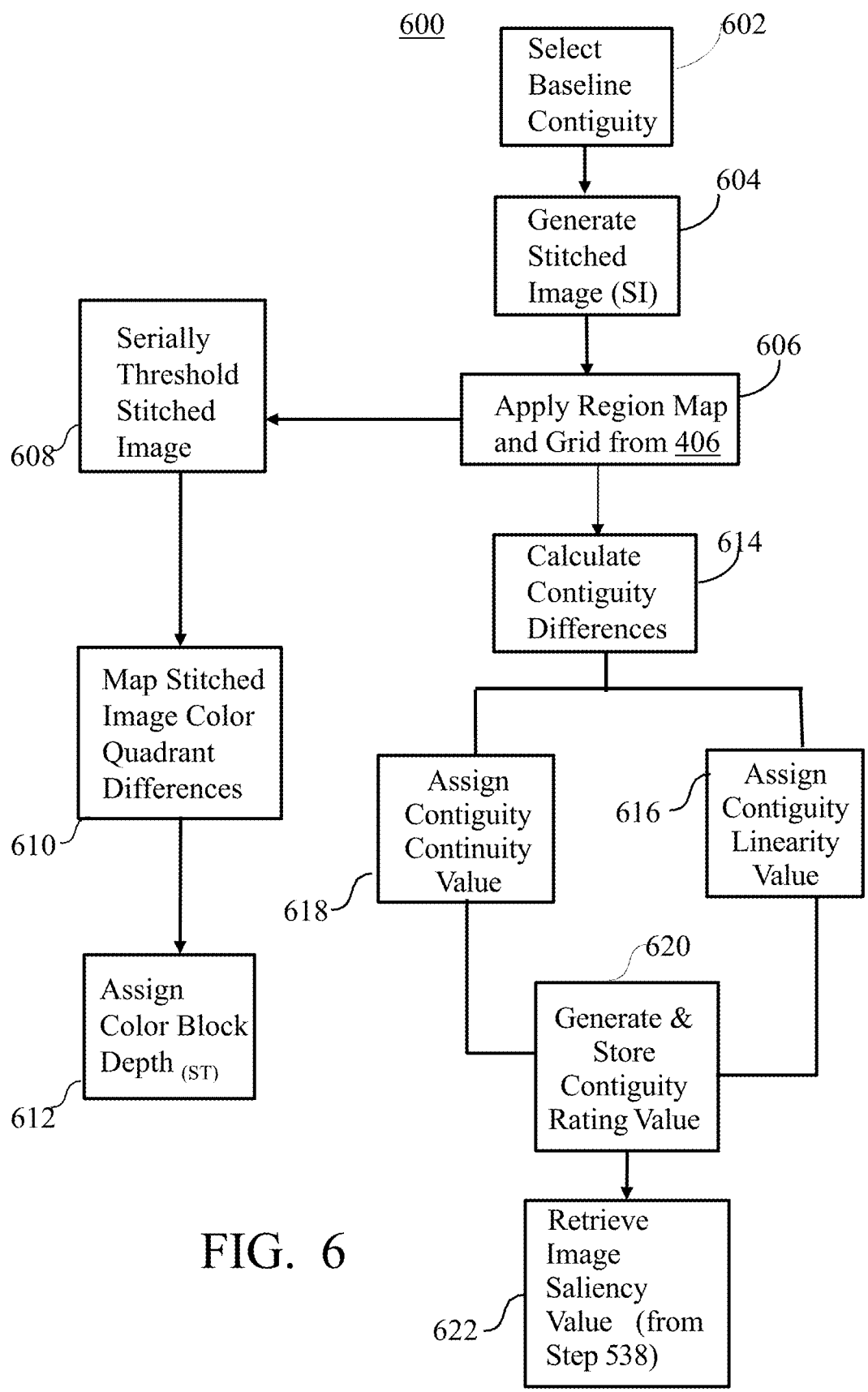
FIGS. 6-8 show an example of a flowchart of an embodiment of a method for computing parameters related to the contiguity of a saliency.
Figure 7:
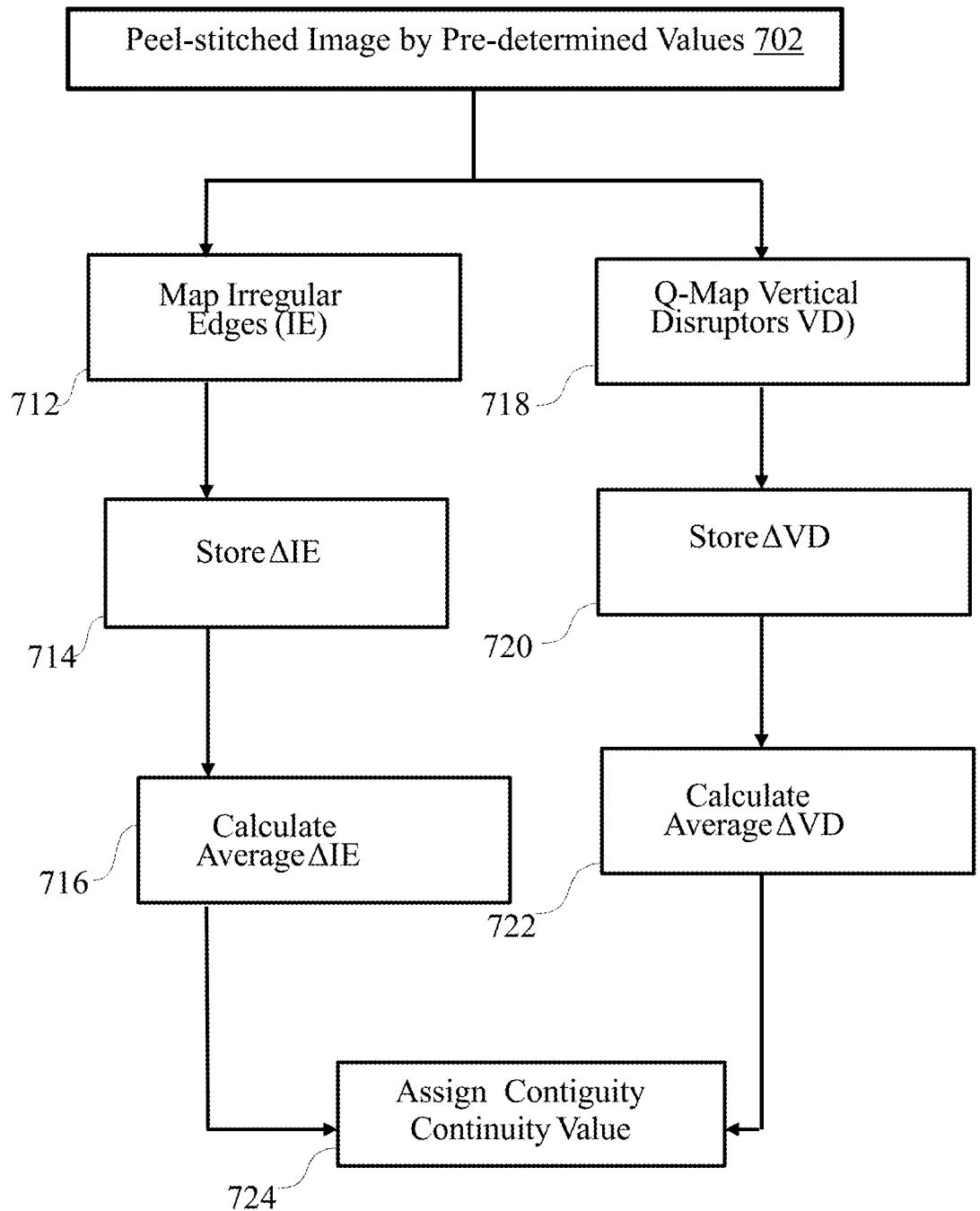
Figure 8:
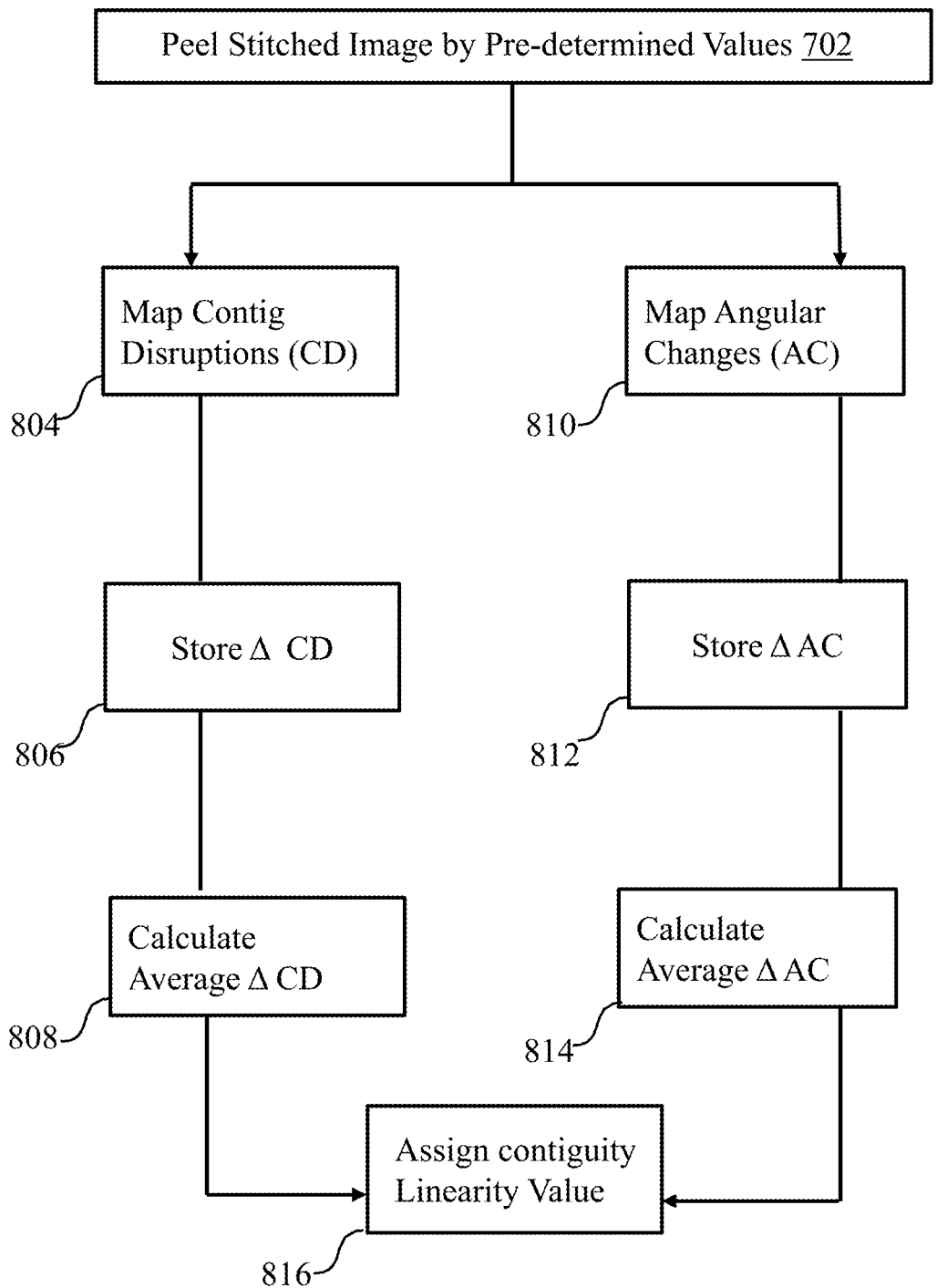

FIGS. 6-8 show an example of a flowchart of an embodiment of a method for stitching an image to identify at least one contiguity and define a subset of attributes. FIGS. 6-8 schematically illustrate a method to stitch an image to identify at least one contiguity and define a subset of attributes.

FIG. 6 schematically illustrates the stitching method described in step 410 of FIG. 4 in more detail. The stitch method utilizes the image saliency value of step 538 (FIG. 5) and the color depth block$_{100}$ generated in step 528 and combined with threshold maps in step 510 and with contiguity data in step 530 (FIG. 5). In at least one embodiment, parameters such as color block depth$_{60}$, contiguity angle, contiguity disruption, vertical distractors, and/or irregular edges, for example, may be obtained. In step 602 a baseline contiguity is defined.

In step 604, a stitched image is generated. In at least one embodiment, machine system 101 can be configured to generate the stitched image. The stitched image may be generated by sectioning the image into a predetermined number of sections, e.g. three sections across a defined area, which are used to implement the stitching analysis. For example, the image can be divided into three equal sections, e.g. a first section, a second section and a third section. The sections can be divided such that one section of the three sections can be shifted to mask another section of the three sections, in part or whole according to user requirements.

In step 404 a delta contiguity is computed. In at least one embodiment, system 100 can be configured to calculate the delta contiguity, which can provide baseline measurements for the stitched image, and which can be compared to an unstitched version of the image. In at least one embodiment, the delta contiguity can provide baseline values of the stitched image that can be compared to peel value, e.g. parameter values measured during peeling of the image as further described herein.

FIG. 6 continues to illustrate a method to stitch an image to identify at least one contiguity and define a subset of attributes, according to at least one embodiment. In step 608 a threshold images at predetermined filter values is generated. In at least one embodiment, machine system 101 can be configured to generate the threshold images at predetermined filter values, which provides various levels of threshold of the image to enable recognition of edges in the image.

In step 610 a stitched image quadrant percentage is mapped. In at least one embodiment, machine system 101 can be configured to map the stitched image quadrant percentage.

In step 612, the color block depth$_{st}$ is computed. In at least one embodiment, machine system 101 can be configured to map the spatial contiguity data. In at least one embodiment, the color block depthST may be generated the can be obtained using the color block map 100 and the hue color spatial map from the stitched image. The overlapping areas between the color block depth 100 and color block depthST maps defined can be compared for the degree of difference between color blocks across the image. In at least one embodiment, in differences within a range less than 15% no additional operation can be required and can indicate that at least one contiguity line is at a confluence extending 100% across the width of the image, similar color blocks at a regular or semi-regular pattern across the width of the image and that the deviation off an X-axis is less than 45 degrees. In at least one embodiment, where the differences are in a range greater than 15% the image stitching can be reversed, performing a peeling of the masked section at a predetermined value of a pixel width, e.g. the total return moves to return the first section to its original position to enable mapping vertical objects and disruptions to linearity and/or continuity.

In step 614 contiguity differences are computed. In step 616, contiguity linearity values are computed. In step 618 contiguity continuity values are computed. In step 620, the contiguity rating is computed. In step 622, the saliency value (of step 538) is retrieved and/or received.

FIG. 7 schematically illustrates a method of peeling, according to at least one embodiment. In step 710 peeling operation at a predetermined value is performed. In at least one embodiment, machine system 101 can be configured to peel the first section off the second section at the predetermined value.

In step 712 irregular edges are mapped. In step 712, a map of irregular edges is computed. The map may be based on the regions (quadrants) of the region map, and map for each region may be computed. In at least one embodiment, machine system 101 can be configured to map the irregular edges, which can be edges that include shapes, contrast hue, and/or color difference with the surrounding areas. The edge irregularity may be computed by computing difference between edge parameters, such as the differences in the angle, contrast, brightness, color, and hue of the edge. Difference between edge irregularities may also be computed.

In step 714, the edge irregularities and optionally the differences in edge irregularities are stored.

In step 716 average of the irregular edges are calculated. In at least one embodiment, machine system 101 can be configured to calculate the average irregular edges.

In step 718 vertical disruptors in the contiguity and/or contiguity lines are mapped. In step 718, a map of vertical disruptors is computed. In step 718 vertical disruptors are mapped. In at least one embodiment, machine system 101 can be configured to map the vertical disruptors. The vertical disruptors can be objects or elements identified in the image that extend into a vertical plane from a horizontal line, e.g. from a contiguity. Vertical disruptors are horizontal features that disrupt contiguity lines and/or contiguities. The map may be based on the regions (quadrants) of the region map, and a map for each region may be computed. In at least one embodiment, machine system 101 can be configured to map the vertical disruptors. Difference between the vertical disruptors may also be computed.

In step 720, the vertical disruptors and optionally the differences in vertical disruptors are stored.

In step 722 an average vertical disruptor is calculated. In at least one embodiment, machine system 101 can be configured to calculate the average vertical disruptor.

In step 724 a contiguity continuity value is computed (based on steps 716 and 722). In at least one embodiment, machine system 101 can be configured to assign the contiguity continuity value, which is the value assigned to the contiguity for disruptions across the X-axis, e.g., horizontal plain of the image. For example, the contiguity continuity value can have a value within a range of −1.0 to 1.0. The contiguity continuity value can be assigned according to the values obtained for the vertical distractors and irregular edges. For example, where the contiguity runs across the image within a range of 75 to 100 percent, a contiguity value range of 1 can be assigned. Where the contiguity line runs across the image within a range of 50 to 75 percent, a value of 0 can be assigned. Where contiguity runs across the image within a range of 0 and 50 percent, or the contiguity is zero, a value of −1 can be assigned.

The method FIG. 8 is part of the method of FIG. 7. Step 702 of FIGS. 7 and 8 may be the same step.

In step 804 contiguity disruptions are mapped. In at least one embodiment, machine system 101 can be configured to map the contiguity disruptions. The contiguity disruptions are mapped to enable machine system 101 to locate the contiguity disruptions in the image, e.g. where there are objects or portions of the image that disrupt the contiguity in the image. The map may be based on the regions (quadrants) of the region map, and map for each region may be computed. In at least one embodiment, machine system 101 can be configured to map the contiguity disruptions, which may be vertical disruptions in contiguities or contiguity lines. Optionally, difference between vertical disruptions in contiguities may also be computed.

In step 806, the contiguity disruptors and optionally the differences in edge irregularities are stored.

In step 808, an average contiguity disruption is computed. In at least one embodiment, machine system 101 can be configured to calculate the average contiguity disruption.

In step 810, angular changes in the contiguity and/or contiguity lines are mapped. In at least one embodiment, machine system 101 can be configured to map angular change of the contiguity line. The angular change can be the angle at which the contiguity in the image relative to an X-axis (a horizontal axis), e.g., horizontal plain of the image. The map may be based on the regions (quadrants) of the region map, and map for each region may be computed. Optionally, difference between angular changes in contiguities may also be computed. In step 812, the angular changes and optionally the differences in angular changes are stored.

In step 814 an average angular change is calculated. In at least one embodiment, machine system 101 may be configured to calculate the average angular change. The average angular change can be the average angular change of all the contiguities in the image.

In step 816, a contiguity linearity value is computed, which may be based on steps 808 and 814. In at least one embodiment, machine system 101 can be configured to assign the contiguity linearity value, which is the value assigned to the contiguity for a deviation of the X-axis, e.g., horizontal plain of the image. For example, the contiguity linearity value can have a value within a range of −1.0 to 1.0 and is derived from the average contiguity changes (Step 808) and angular changes (Step 816) using a measurement boxes, which may be computed in steps 406 (FIG. 4) and/or step 606 (FIG. 6). The measurement boxes (or regions of other shapes) may be boxes formed by a grid. The contiguity disruptor and angular change may be computed for each region (in steps 804 and 810) and then the values of each region for the contiguity disruptor and angular change may be averaged over the entire images in steps 808 and 816, and then the two averages (the contiguity disruptor and angular change) may be used to compute the contiguity linearity in step 818.

An ambiguity value can be a sum of individual ambiguity factors, which are then divided by a total number of factors. The ambiguity value can be how dominant the contiguities are present in the image and how easy it can be for a viewer to switch between the different contiguities in the composite image. For example, some ambiguity factors can be the number of contiguities in the composite image, the number of color blocks, linearity of the contiguities, the continuity of the contiguities, the color block depth$_{100}$, the spatial color-contiguity, and/or the like. In at least one embodiment, the ambiguity value can be used to provide an ambiguity rating to the composite image, which can be used to determine how the ambiguity of the composite image is relative to other composite images generated by machine system 101.

An aesthetic value can be determined from a number of colors, a mix of colors, a density of content in the image, and/or the like. In at least one embodiment, the aesthetics value can be provided as a ratio of the number of colors to the number of pixels.

Figure 9:
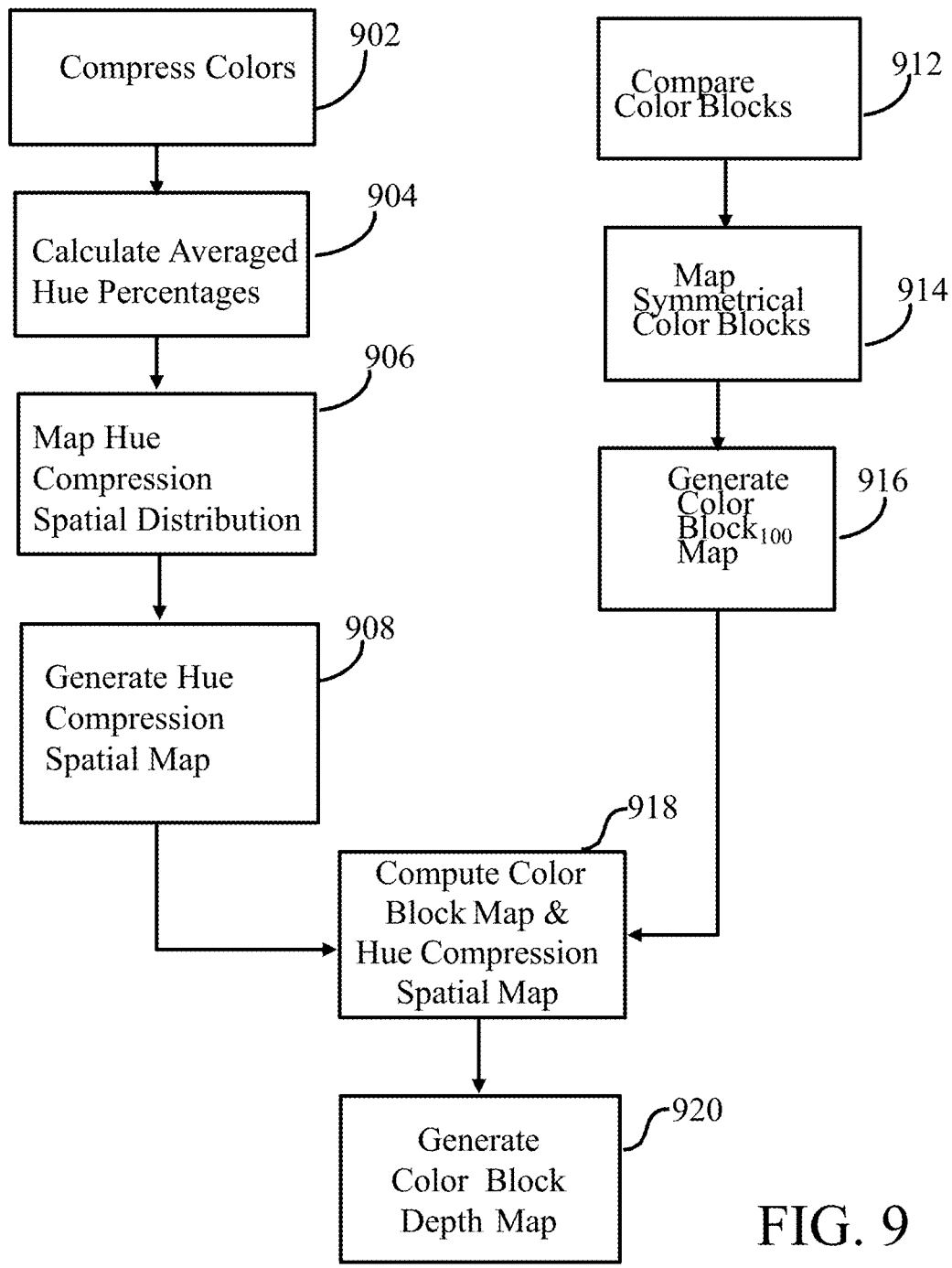
FIG. 9 is an example of a flowchart of an embodiment of method of computing some parameters that are useful in computing a contiguity rating.

FIG. 9 is an example of a flowchart of an embodiment of method 900 of computing some parameters that are useful in computing a contiguity rating. In step 902 a color block depth, $CBD_{100}$ is retrieved (the color depth is the number of bits used to represent color). In step 904 a standard color block depth is retrieved $CBD_{ST}$ (e.g., $CBD_{60}$). In step 906, the $CBD_{100}$ and $CBD_{ST}$ are combined (e.g., the ration of $CBD_{100}$ to $CBD_{ST}$ is computed) and the value is assigned to the Color BLOCK$_{DEPTH}$. In step 908, the Aesthetic value is computed, based on the Color Block$_{DEPTH}$, which is the reciprocal of the Color Block$_{DEPTH}$. In step 910, the contiguity rating is retrieved or received (which was computed in step 620 of FIG. 6). In step 912, a complexity factor is computed, and the aesthetic value and the contiguity rating are combined with the complexity factor. In step 914, a contiguity complexity factor is computed based on the complexity factor, aesthetic rating and contiguity rating. In step 914, a juxtaposition factor is computed.

Figure 10A:
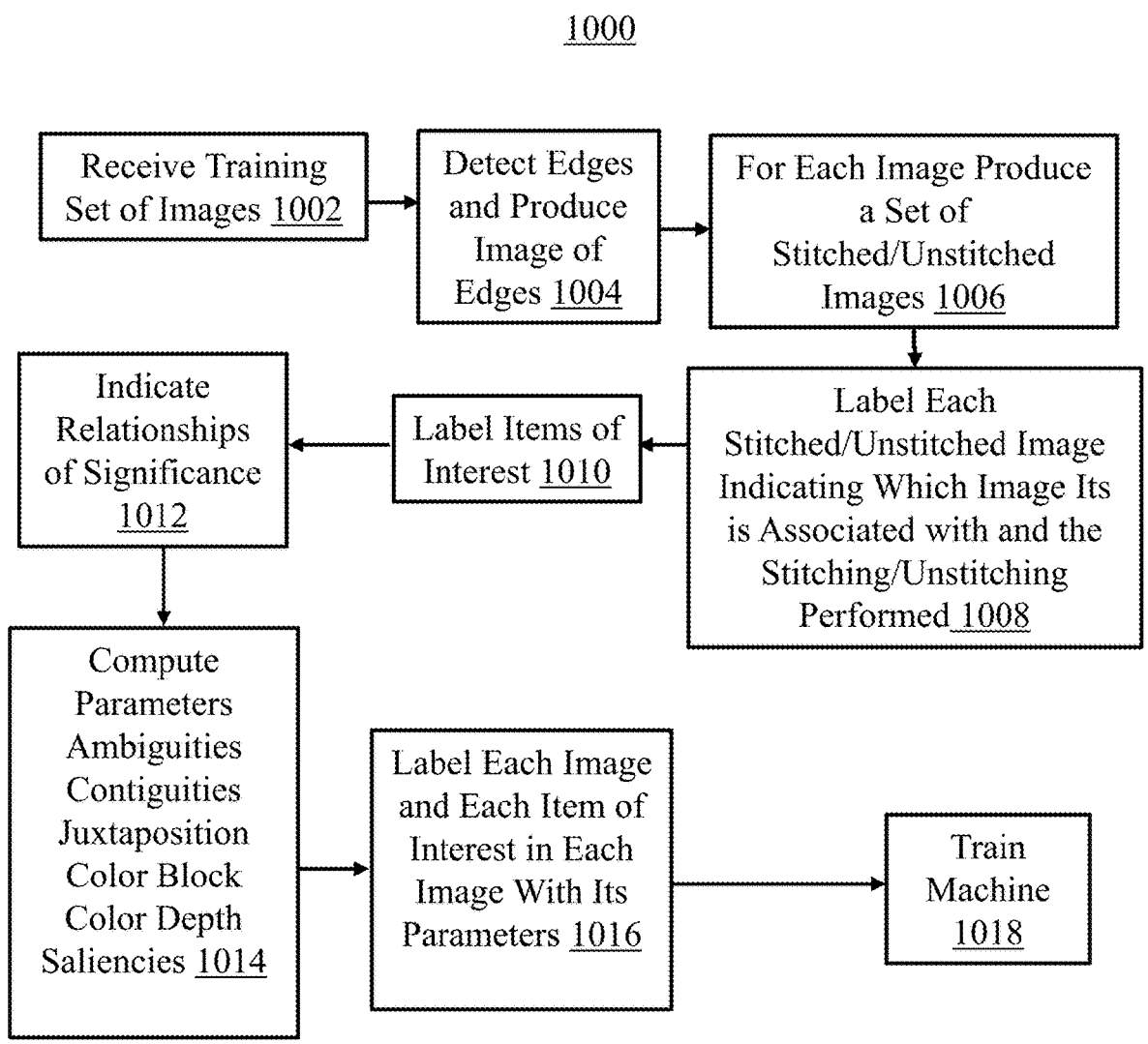
FIG. 10A is an example of a flowchart of an embodiment of method of training artificial intelligence logic, based on the methods of FIGS. 3-9.

FIG. 10A is an example of a flowchart 1000 of an embodiment of method of training an artificial intelligence logic 224, based on the methods of FIGS. 3-9. In step 1002, a group of training images is received. The training images may be based on a particular subject matter of interest. For example, if artificial intelligence logic 224 is being used for navigating a vehicle, the images may relate to different situations seen on a road which driving, if the artificial intelligence logic 224 is being used to identify security threats, the images may be various scenes just prior to a tragic incident. If artificial intelligence is being used to identify natural events of interest (e.g., the appearance of animals not often scene or activities of animals not often scene), the images may be of similar events. In step 1004, edges within images are detected and the image of the edges may be saved. In step 1006, for each image a set of stitched images is produced. Step 1006 may optionally also include producing a set of threshold maps, contiguity maps, maps of contiguity irregularities, maps of contiguity angle changes, maps of contiguity disruptions, maps of vertical contiguity disruptions and/or color maps for each stitched image. In step 1008, the stitched images, the color threshold maps, the black and/or threshold maps and labeled, stored, and/or tagged so as to maintain an association between the image, the stitched version of the image, the edge map, the threshold and/or color maps of the image and/or the stitched images. In step 1010, the items of interest in the images (and optionally in the color maps, threshold maps, edge maps, and/or stitched images) are labeled, so that the machine has an association between the item of interest and the image. In step 1012, an indication is added of the relationships in each image is associated with the image (and optionally with the color maps, threshold maps, edge maps, and/or stitched images). In step 1014, the parameter associated with the image are computed, such as the juxtaposition factor, contiguity ambiguity, which may be computed for the image as a whole, and/or for each block the image, and/or for each variation of the image. In step 1016, the parameters computed are associated with the images and/or the variation of the images (e.g., the color maps, threshold maps, edge maps, and/or stitched images). In step 1018, artificial intelligence logic 224 is trained to identify the items of interest and/or relationships of interest, based on the set of training images and the information add to the image.

Figure 10B:
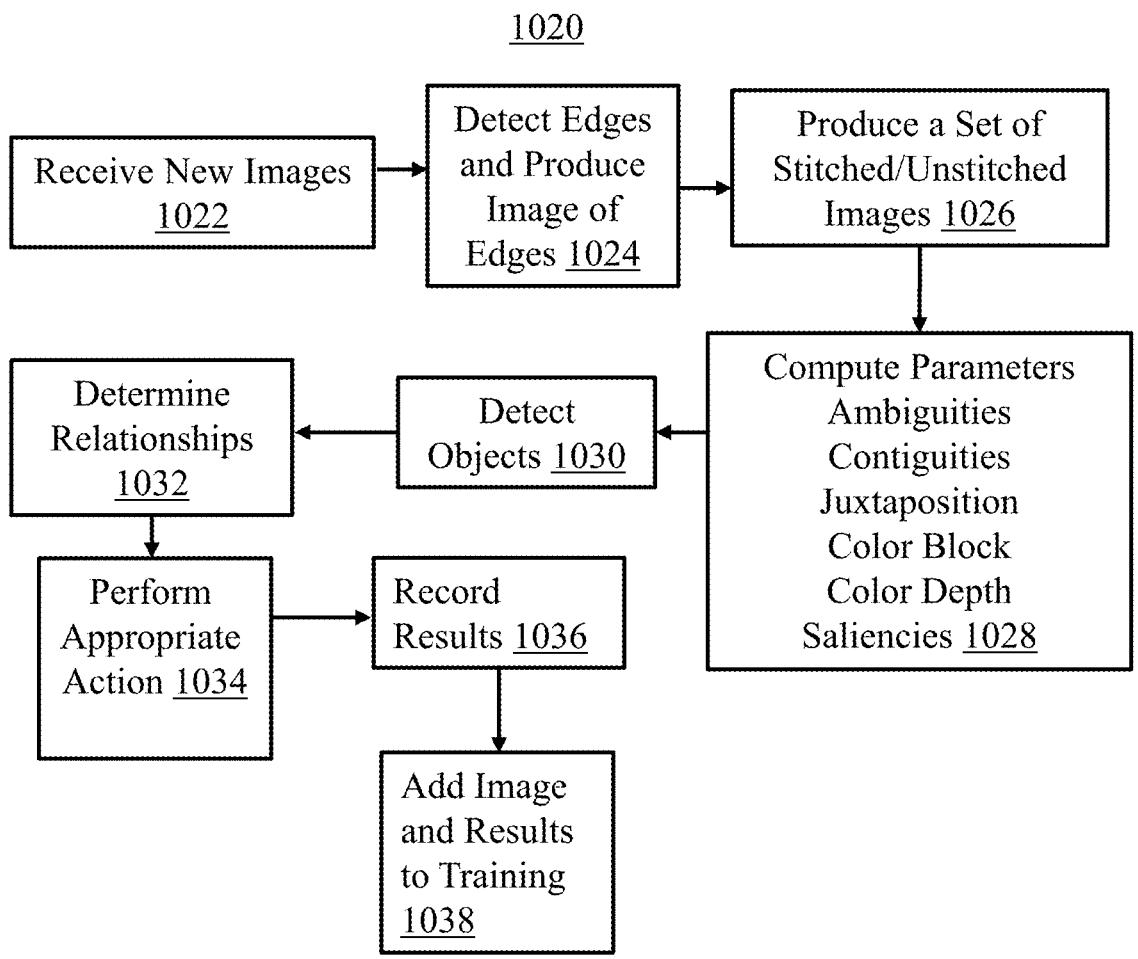
FIG. 10B is an example of a flowchart of an embodiment of method of identifying objects and relationships.
Figure 12A:
FIGS. 12A-G show the application of a stitch and peel, according to at least one embodiment.
Figure 12B:
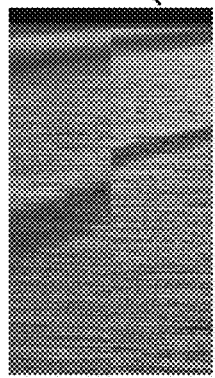
Figure 12C:
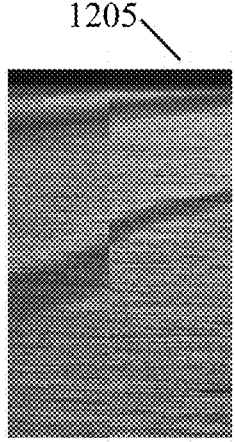
Figure 12D:
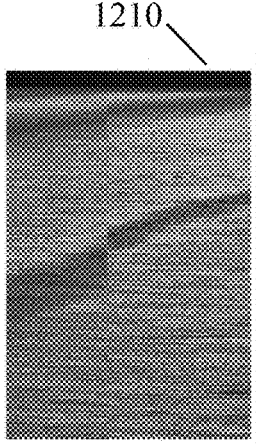
Figure 12E:
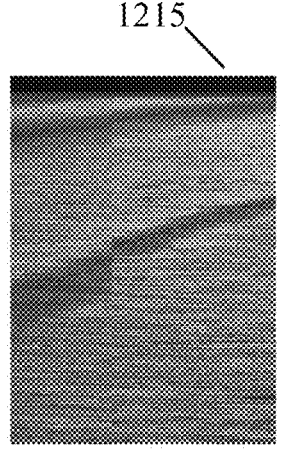
Figure 12F:
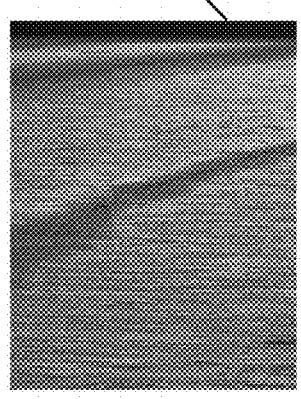
Figure 12G:
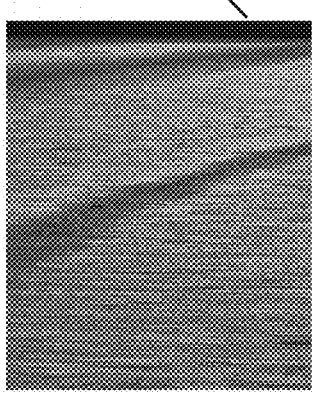
Figure 13A:
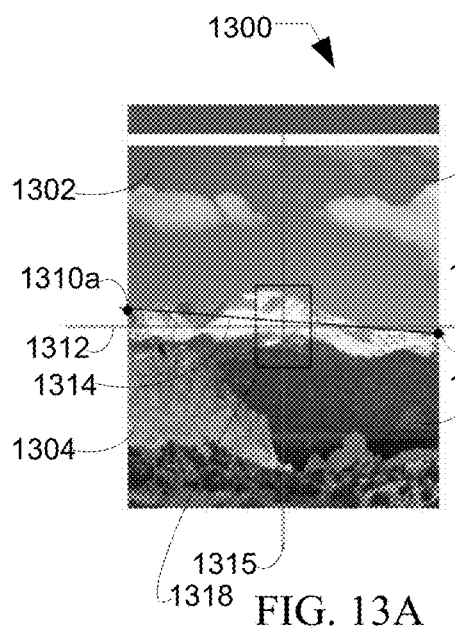
FIGS. 13A-H shows the application of quadrant-based measures, a stitch-based angle determination in an image, according to at least one embodiment.
Figure 13B:
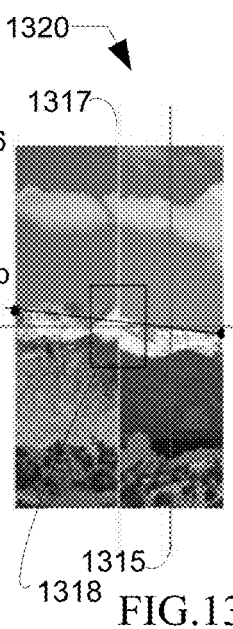
Figure 13C:
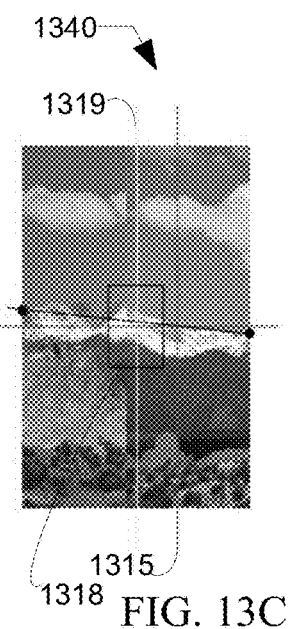
Figure 13D:
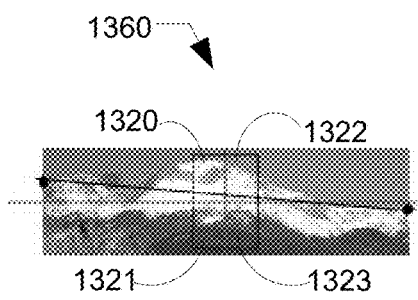
Figure 13E:
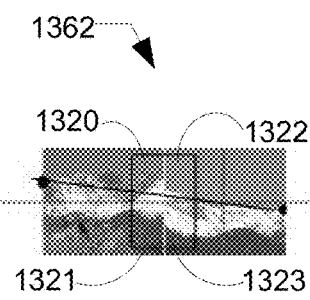
Figure 13F:
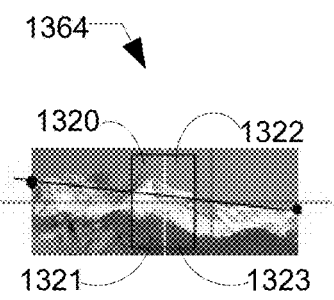
Figure 13G:
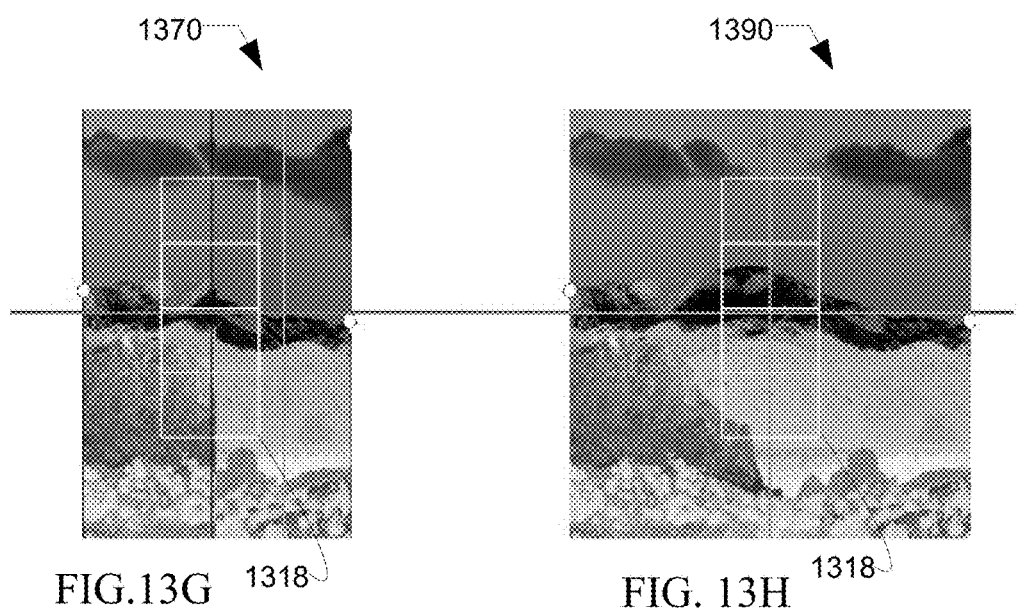
Figure 13H:
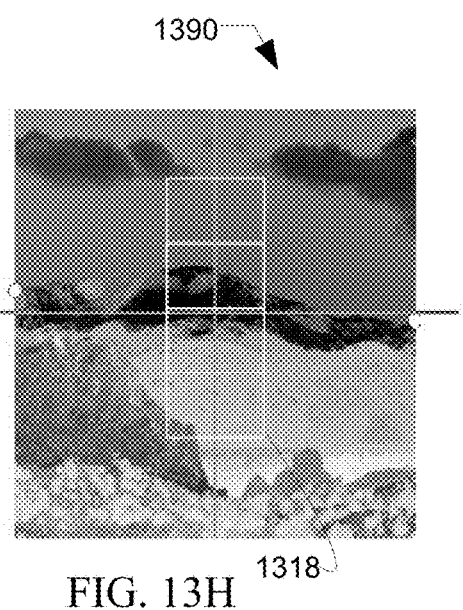

FIG. 10B is an example of a flowchart 1020 of an embodiment of method of identifying objects and relationships, via artificial intelligence logic 224, based on the methods of FIGS. 3-9. In step 1022, a group of one or more new images is received. The images may be collected as a part of artificial intelligence logic 224 performing a task, such as navigating a vehicle, monitoring a wildlife preserve for animals or activities of scientific interest, or monitoring a location for signs of danger, for example. In step 1024, edges within images are detected. In step 1026, for each image a set of stitched images is produced. Step 1026 may optionally also include producing a set of threshold maps, contiguity maps, maps of contiguity irregularities, maps of contiguity angle changes, maps of contiguity disruptions, maps of vertical contiguity disruptions and/or color maps for each stitched image. In step 1028, parameters of the images or are computed, such as saliency, ambiguity, contiguity, and/or contiguity linearity associated with the image. In step 1030, the items of interest are identified. In step 1032 relationships of interest in the images are identified. In step 1034, appropriate action is taken, which may be causing the vehicle to turn to avoid an object or stay on the road, send an alert if a dangerous situation is detected, or store and log the image for researchers to analyze. In step 1036, results of the situation and/or the action taken may be recorded. In step 1038, the results and the new image may be added to the training set, to improve artificial logic 224 ability to identify the items and/or relationships of interest.

FIG. 11 shows a table that summarizes some computations that may be performed to identify contiguities. The prominence and number of contiguities may be represented by a contiguity rating (CR), which may be computed based on a formula, $$CR=\Sigma(AF_1+AF_2+AF_3+AF_4+AF_5+AF_6)/n \text{ (where } n=6\text{), where } AF_1, AF_2, AF_3, AF_4, AF_5, AF_6 \text{ are ambiguity factors (AF)}.$$

As indicated in the table, $AF_1$ is a contiguity number, which is determined by detecting edges, using an edge detection technique and/or on threshold techniques, which produce binary image based on a threshold that determines which of two values a pixels is assigned.

Contiguity Count Total ($AF_1$) is the average of thresholded values for the image measured at a starting point of 127 value (for example) and then at 160 (for example) for standard images, where the color is represented by pixels values of 0 to 255.

More than just two thresholds may be computed. For a thresholded Image at 127 and 160

$$\text{Averaged Contiguity Count} T_{127}=(\text{Part}_{ST127b}+\text{Part}_{ST127w})/2$$

$$\text{Averaged Contiguity Count} T160=(\text{Part}_{ST106b}+\text{Part}_{ST160w})/2, \text{ where}$$

$\text{Part}_{ST127b}$ and $\text{Part}_{ST160b}$ are the number of parts of the image that after thresholding have an average pixel value of black, $\text{Part}_{ST127w}$ and $\text{Part}_{ST160w}$ are the number of parts of the image that after thresholding have an average pixel value of black, and the subscripts T127 and T160 represent the threshold used for generating the threshold map.

$$\text{Contiguity Count Total}(AF1)=(\text{Averaged Contiguity Count}_{T127}+\text{Averaged Contiguity Count}_{T160})/2.$$

$AF_2$, is color block, which is determined based on a sequential color extraction using reduced a fixed number of colors (e.g., 1-6) from which color images may be based. The image is divided into regions (e.g., quadrants quadrant) and dominant color or colors is determined for each region. Color blocking allows for the identification and analysis of the colors in an image. The image is reduced to a small number of colors (e.g., less than 8, less than 7, less than 6, less than 5, less than 4, less than 3) During color reduction the pixels may grouped into bins of a histogram according to which color bin color value of the pixel is closest (e.g., if the image is reduced to the colors having color pixel values 100 and 200, then a pixel with a color value of 75 would be place in the bin for the color 100. A color extraction is performed on each color-reduced image to determine the number of pixels in each color bin. The values are averaged to arrive at the AF2. Up to 6 color blocks can be identified and used for the calculation, depending on the number of colors and their percentage contribution to the image.

For 2 and 3-color reduction the formula for the AF2 is $$CB.\bar{cx}(AF2)=CB.c2+CB.c3/2$$

More Generally the formula for AF2 is $$CB.\bar{cx}(AF2)=(\Sigma CB.c2+\ldots CB.c(n))/n \text{ (where } n \text{ is an integer between 2-6)}.$$

$AF_3$, is a contiguity linearity ($C_{linearity}$), which may be computed from $C_{linearity}=C_A+C_D$ where $C_A$ is a value that represent an average of the degree to which the angle of the contiguities changes (e.g., the angularity) across the contiguity, and $C_D$ is an average of breaks in the contiguity.

$AF_4$ is a continuity value ($C_{cont}$) that is computed from $C_{cont}=C_{VD}+C_{IE}$, where $C_{VD}+$ is a value representing the average of the vertical disruptors, and $C_{IE}$ is an average of the irregular edges.

$AF_5$, is the color block depth, which defines color block distribution.

$AF_6$ is the spatial color-contiguity, which compares the contiguity number to the color block number.

FIGS. 12A-G show the application of a stitch and peel, according to at least one embodiment. In at least one embodiment, an image 1200 is divided into predefined sections, e.g. a first section, a second section, and a third section. The first section can be shifted from a first area in which it is arranged to a second area, so the first section can mask the second section as shown in 1202. The first section can be peeled at a predetermined value, for example, at twenty percent, as represented by 1205, 1210, 1215, 1220, until the first section is arranged in the first area and the second section is uncovered, to resumes the previous shape and size of the image as shown in 1225. As the first section is peeled and moved, the contiguity in the image is identified by machine system 101.

FIGS. 13A-H shows the application of quadrant-based measures, a stitch-based angle determination in an image, according to at least one embodiment. Image 1300 shows stitch and peeling to emphasize a difference in the quadrants, according to at least one embodiment. Image is equally divided into four quadrants, e.g. first quadrant 1302, second quadrant 1304, third quadrant 1306 and a fourth quadrant 1308, which are separated by horizontal line 1312 and vertical line 1315. In image 1300, vertical line 1315 is aligned with a horizontal center of the image. A baseline 1314 is connected by endpoints 1310a and 1310b, which can represent a dominant contiguity in the image. In at least one embodiment, a measurement area 1318 for determining the contiguity can be designated.

A stitched image 1320 of image 1300 can be provided after a stitch analysis of FIG. 4 is implemented. In at least one embodiment, when the image is compressed to the stitched image 1320, the vertical line 1315 is maintained in an original horizontal center according to the horizontal center of image 1300. The measurement area 1618 is defined to cover an area of interest according to predetermined parameters.

As peeling is performed on the stitched image 1320, a peeling image 1640 is provided in which additional content is provided for identification of differences within measurement area 1318.

Image 1320 shows quadrant division of the image within the measurement area 1618, according to at least one embodiment. For example, the quadrants can be first quadrant 1620, second quadrant 1621, third quadrant 1622 and fourth quadrant 1323. Each quadrant of the quadrants can be further divided into quadrant to obtain additional information of contiguity characteristics in the image.

Image 1340 shows identifying multiple contiguity characteristics through implementation of a measurement area 1618.

FIG. 14A-D shows the application of a stitching analysis with quadrant-based color blocking, according to at least one embodiment. Image 1400 shows stitch of a first image 1400, according to at least one embodiment. The first image 1400 is divided into four quadrants, e.g. first quadrant 1402, second quadrant 1404, third quadrant 1406 and fourth quadrant 1408. The division can be represented by horizontal line 1412 and vertical line In stitched image 1420 the quadrants overlap to produce first stitch quadrant 1422, second stitch quadrant 1424, third stitch quadrant 1426 and fourth stitch quadrant 1428. The stitched image 1420 can enable determining that the colors between the quadrants is different and asymmetrical. By bringing together two areas of the image that are not actually juxtaposed, machine system 101 can provide an indication of a disruption in the color block or an object in the image.

Image 1460 shows stitch of a second image 1460, according to at least one embodiment. The second image 1460 is divided into four quadrants (but could be divided into a different number of regions), e.g. first quadrant 1762, second quadrant 1764, third quadrant 1466 and fourth quadrant 1468. The division can be represented by vertical line 1470 and horizontal line 1472. In stitched image 1480 the quadrants overlap to produce first stitch quadrant 1482, second stitch quadrant 1484, third stitch quadrant 1486 and fourth stitch quadrant 1488.

Figure 15A:
FIG. 15A-C shows application of edge detection using thresholding and edge detection, according to at least one embodiment.
Figure 15B:
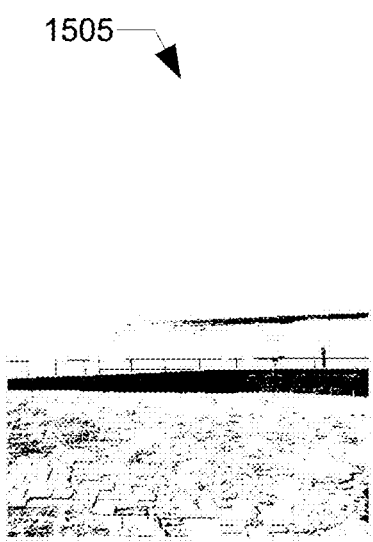
Figure 15C:
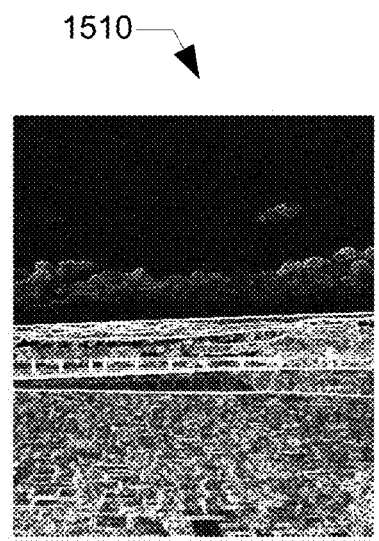
Figure 16A:
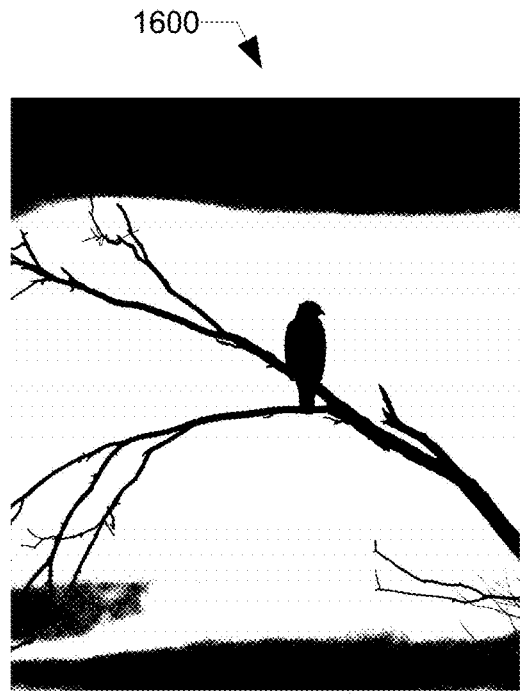
FIG. 16A-D shows color block contiguities through implementation of edge detection, according to at least one embodiment.
Figure 16B:
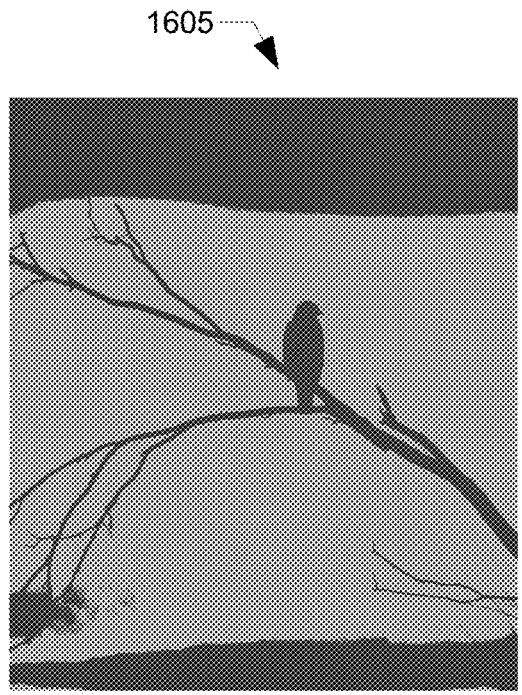
Figure 16C:
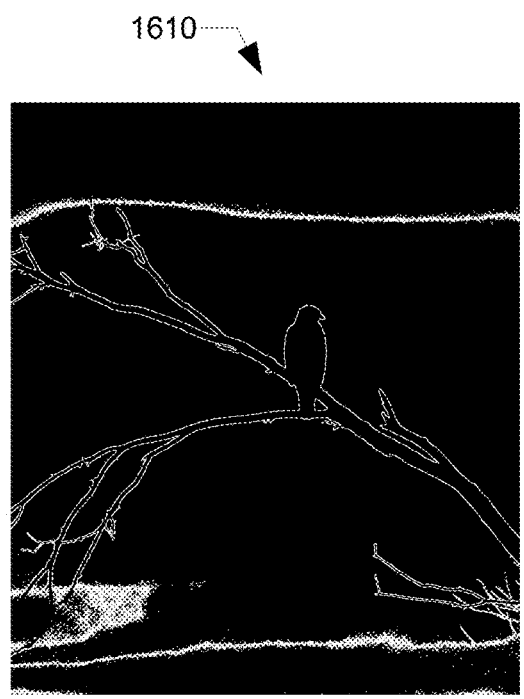
Figure 16D:
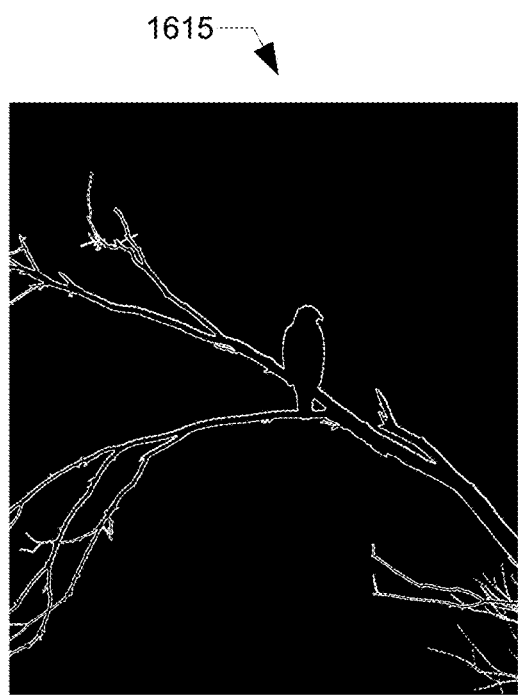

FIG. 15A-C shows application of edge detection using thresholding and Sobel, according to at least one embodiment. The original image 1500 can be filtered using thresholding to generate the threshold filtered image 1505 and can be filtered using Sobel to generate a Sobel filtered image 1510.

Figure 17:
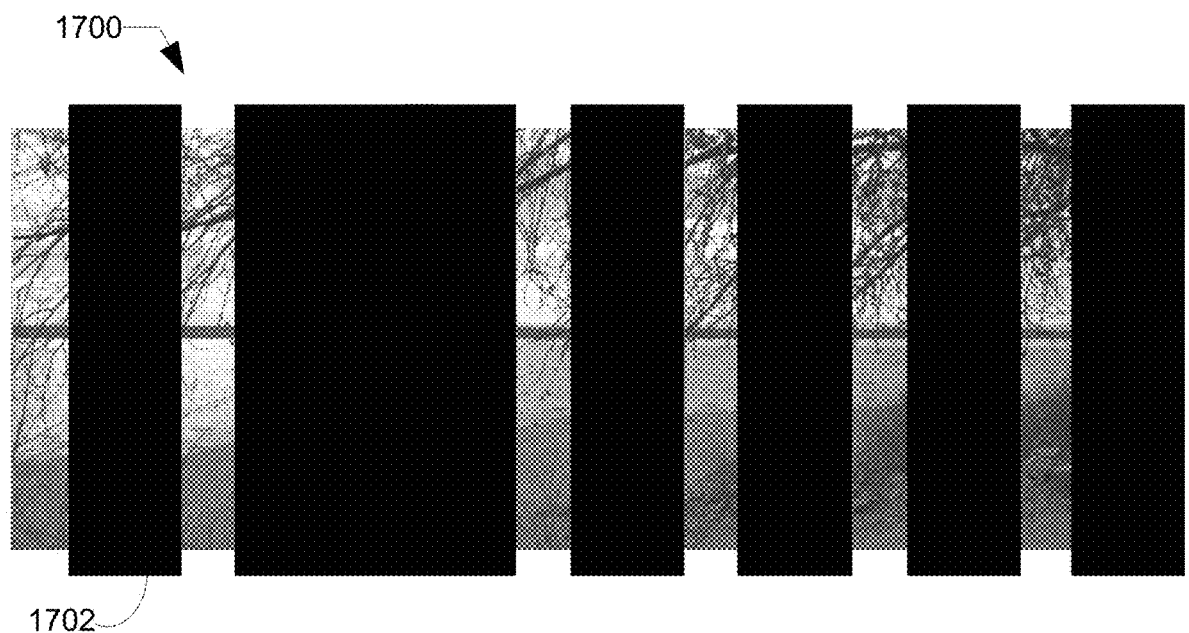
FIG. 17 shows an example of masking of contiguous regions of an image according to at least one embodiment.

FIG. 16A-D shows color block contiguities through implementation of Sobel and Thresholding edge detection, according to at least one embodiment. In at least one embodiment, 1610 and 1615 illustrate the limitations of edge detection by using only a Sobel filter subsequent to color reductions to b/w and using the Sobel filter (or another edge detection filter) without color reduction. When compared to 1600 and 1605, there is a loss of detail/information. In FIGS. 16A-D, the branch extending diagonally across the image is a contiguity and the region above the branch (which is the sky) is also a contiguity. The bird on the branch is a vertical disruption in the contiguity of above the branch and the branch. A contiguity, such as the bird on the branch, can be interrupted with intervening images and still be used to inform subsequent image sections for discerning content, including machine vision training schema as part of a predictive model system to identify parts of sequential images and/or multiple image sets despite the spatial hyphenation of the content. The vertical disruption can be in the contiguity may be objects of interest, and the fact that a region is a vertical disruptor may be used a one factor of multiple factors that indicate that a region is part of an object of interest and/or the object may be a foreground object FIG. 17 shows an example of masking of contiguous regions of an image according to at least one embodiment. In at least one embodiment, 1700 and 1702 illustrate that despite application of a mask, which is placed, and may represent, a missing area of an image, the contiguity can nonetheless be identified using color blocks and edge determination to fill-in the masked content.

General Comments

The contiguity analysis process defines image characteristics that can be applied to any field that deals with edges and the use of edges. For example, Autonomous vehicles are concerned with object boundary detection (such as lanes, cars, and people) as part of feature extraction and scene analysis to detect what is on the road and/detect where the road is (for example). At least one embodiment associates with edges additional information and, as such, to view the edges as integral elements of an image (static or moving), in slightly different ways. At least some of the methods disclosed herein are relationships in images. While the analyses processes are described in an orderly fashion, data from one measurement and the image sets generated (stitched, color reduced, etc.) may be used as resources in the analysis for another step or process. Although some output characteristics are dependent on other data, the interrelationships between the different steps and methods help to define relationships between objects in the image scene as well—the different methods can be computed in parallel.

The 1:3 stitched and variations on the 1:3 stitch can be viewed as near-sighted vision. Whereas, the unaltered image can be likened to farsightedness. The combination of the stitched image(s) and the unaltered image, together, reflect how humans see the world. As humans move from point to point, humans look at what objects are close by, to avoid obstacles in the way, how to get from point to point safely, quickly, and to planning a path of travel. A 1:3 stitched images can be thought of as a way of folding space.

Some further points about at least one embodiment of the system: Saliency can be sharpened and adjusted by cropping to eliminate distractor elements. Stitching can be iterative (drilling down to smaller and smaller areas). Stitching can be of various varieties in joining different sections and masking different amounts of an image (1:3, 1:5; 3:1, etc.). Any quadrant (or other region) can be iteratively subdivided for additional analysis. Differences in similar hues are more evident in stitched images. The observed color on screen may be different than the colors analyzed/extracted (green on screen, may be brown or gray when RGB analyzed). Contiguity position—good spatial separation between contiguities is associated with less conflict in composite, lower ⅓ versus upper ⅓ with and without color blocks. Image in composites—end-point positioning matters (first section can drive the switching process in a composite image). Saliency is a function of sectioning strategy in composited image sets.

Example 1

If someone has a composite image made from three images interleaved with one another. If it is desired to substitute one of the images with another image with similar subject matter (e.g., perhaps the composite image is a combination of a buck, a partly cloudy sky and a lake, and perhaps it is desired to substitute the buck with another image having a buck or the partly cloudy sky with another image having a sky, or the image of the lake with another image having a lake), but this time it is desired to have a different image to be the easiest image for the viewer to put together in their mind.

Some Rules

Images showing the ground across the lower portion of the image will be easier to assemble in the mind. An image showing a large portion of the ground may be said to occupy the ground position, because the mind sees the ground as the ground in the composite image. An image having a horizontal contiguity, will be associated with the ground position, because the contiguity tends to divide ground from sky in the mind.

An image with no contiguities tends to occupy the figure position, the position where the mind places the foreground of an image (e.g., in a picture of a person the person).

In the example above, the hardest image to put together will be an image that occupies the figure position and has no switch capacity, in that it is juxtaposed with an image which has a contiguity and by default is in the ground position.

Regarding what fixes an image—that is, what aids the mind in holding one particular image assemble, in the above example, it has no contiguities. It will not feature a recognizable object, animal, or any part of the object or animal. There are no easily discernible weak contiguities to follow/track across. The content is discernible, but it will not be easily reassembled as compared to the image in the ground position. An image with high contrast between elements of the image and images with a high saliency will also be more easily assembled in the mind. An image has little internal contrast or has a consistent color depth profile throughout then it will be more difficult to reassemble than an image which has internal differences in contrast.

An image with no contiguities can be juxtaposed with a second image which also has a low contiguity, and then both will be equally easy to reassemble in the mind and take the ground position, which seems counter-intuitive. When a contiguity is present it defines figure and ground. When two images have contiguities, then both can both occupy the ground position, but with different frequencies or ease based on saliency/contrast—how noticeable an image or part of the image is to the viewer.

If both of the images in a 2-image composite do not have contiguities, then both the internal and juxtaposed image differences/contrasts in value and hue will contribute more to defining which has a higher degree of saliency. If the internal contrast is only in a portion of the image then potentially the ease of assembly may be regionally dependent—in that in one portion of the image, can be in the ground position, a switch can occur, but in another portion of the image, the saliency/contrast is poor and the image gets "stuck" in the figure position in that region.

The mind may need to work harder in a smaller image to get two images into the ground position. In full size images, it is easier to have two images into the ground position. The target in all cases to effect a ground positioning is in the higher contrast areas.

One caveat being that even an image with only 1 contiguity, i.e. made up of a large object, such a snakeskin that occupies the entire image area, has saliency and which can contribute in terms of ease of re-assembly (the region on the left where the snakeskin ends). The more horizontal visual cues, the easier it will be for the mind to "hold on to" the image in the ground position and to suppress a switch as the viewer tracks across the image set. In general, 3-image composites in which each image occupies an equal percentage of the image are more challenging than 2-image composites for the mind to assemble, in part because there is greater ratio of the spatial distance between the parts of any one image and the size of the entire composite image, with two intervening images between each section and which are comprised of potentially conflicting/confusing content and/or overlapping contiguities. To maintain the coherency of the contiguity throughout the image, there needs to be both spatial separation of the contiguities and color differences in potentially overlapping regions. Depending on the image the width of the sections in a composite (1.5% vs 10% vs. 20% vs. 25%) can make it easier or harder to assemble (the less detail per section, the smaller gap distance needs to be, etc.)

If the image has a high angularity (e.g., the contiguity has a large angle with respect to the horizon or a horizontal line), it will generally be more challenging to reassemble, though it may have high saliency from a curiosity standpoint in the image set. So, a buck on a hillside will be more challenging than one a buck standing in a field because the contiguity is at an angle in the hillside image.

Further, an image set with an object/animal on an angled contiguity appears distorted; an effect magnified with animals or objects, and the distortion in either case (on an angle or splitting animal parts on a level field) will complicate the reassembly in any case. So, the salient part of the image should have fewer disruptions. In the hawk example FIGS. 16A-D, the hawk is centrally placed in an image section works, though the branch is distorted. The branch is at an angle, but is still recognizable, despite the crookedness of the branch (the branch portion on the right looks like the parts do not go together).

A different sectioning strategy or image crop could shift the hawk where it would be split between two image sections. If the hawk were split between two sections, it would be more challenging to re-assemble in the mind Single objects or ones that dominate an image (a flower, buck antlers) with a consistent background may be easier to reassemble in the mind than an image where an animal, an irregular contiguity, is split between multiple sections, even if the part of an object in the former construct (antler) cannot be easily identified.

One may compute a score that is a combination of the percentage of the composite image that is occupied by the image, a contiguity score, the angularity of the contiguity, and the saliency. The contiguity score may be the number of contiguities or may be a weighted sum of weights, which each weight represents how distinct a particular contiguity is, which may depend on how straight a contiguity is (e.g., bold a straight line may have a weight of 1 and an crooked line or faint line may have a weight of 0.5 or some other number between 1 and 0 representing how easily the contiguity can be distinguished). The angularity may be the average of the absolute value of the angle of the contiguity. The manner in which the percentage of the composite image that is occupied by the image, a contiguity score, the angularity of the contiguity, and the saliency are combined, may be a weighted sum, for example. The weights may be determined experimentally and in an embodiment, may depend on the context, types of image being combined, and/or the purpose of the combined image. In other embodiments, the saliency, percentage of the composite image, the contiguity, and the angularity may be combined in another manner, such as in a product. Each of the saliency, percentage of the composite image, the contiguity, and the angularity and/or their weights may be raised to a power, operating upon by a log function a trig function and elliptic function a Bessel function and/or another function and then combined.

To select an image, so as to be easier to combine than another one selects an image with a higher score. If two images should be equally easy/hard to assemble in the mind the score of each image should be the same, within 0.1% within 0.5%, within 1%, within 5%, or within 10% of one another (depending of the embodiment).

Example 2

Assume that a robotic device captures the image of FIGS. 16A-D. In order to direct the robotic device to automatically fly over the buck and take a photo of the top view of the buck (based only on what is visible in FIGS. 16A-D).

The assumptions are that (1) the buck is stationary and could represent any other stationary object on the hillside, (2) there are no other available images that show other angles, (3) there are no other obstructions or higher elevation portions of the hill in the direction of the viewer, (4) the area beyond the hill is open space or at least does not contain an area with a higher elevation than that of the buck on the hillside, (5) the drone is small and has excellent maneuverability, and (6) a map of the area is available that has the longitude and latitude coordinates for the hillside.

Using edge detection, the buck may be recognized by the robotic drone as a vertical disruption and the slope of the hill may be computed to be 4.5. To compute the slope of the hill may be replaced by a straight line that approximates the slope of the hill and then the height divided by the length of the hill is the slope. Alternatively, the slope of each point of the outline of the hill may be computed and the slope may then be averaged. The elevation from the bottom to the top of the hill may be computed to be 12.51° (the elevation is the given by $\cot^{-1}(\text{slope})=\cot^{-1}(4.5)=12.51$ degrees). The drone has several flight path options. The drone can fly directly towards the buck and have a clear path using the area defined by quadrant Q1 and/or Q3. If the drone uses a Q3 approach, the drone can target the lowest visible part of the hill using the edge detection to finds where the edge that represents the hill intersects with the left edge of the image. Using an (x,y) coordinate system (where x represents distance and y represents height), the intersection of the edge representing the hill with the left edge of the image occurs at pixel having coordinates (0, 275). By inferring the distance to the elk based on the size of the elk in the image, for example, the pixel coordinates may then be converted to longitude and latitude. To fly over the buck, there are multiple approaches based on the location of the buck on the hill. To fly directly at the buck, the drone would have to clear the antlers portion which is defined in the vertical disruption calculation, but a wide-angle lens may be helpful to capture the entire area coming at the buck from that direction, because it is not evident from this image what the depth of the hill is in the forward facing direction, even if making a left-sided approach. Any region could be targeted using the quadrant analysis as landmarks. If the image is divided into a grid, and then each grid box is analyzed for color symmetry, one finds that the grid boxes of Q1 and Q3 that are in front of the dear have a color symmetry indicating no obstructions. Similarly, the saliency of each box may computed, which will be low, for the boxes in front of the buck, which is at least one indication that there is nothing present. The use of the stitched image defines a clear path to the buck in Q1 and/or Q3, avoiding the hill at the base of Q3. The path to flying directly at the sun becomes apparent in the peeled stitched image (−60%) for the nearest approach aiming directly for the sun but which also avoids hitting the buck. The stitching better illustrates the local angle of the hillside. Also, the angle of at which to travel upwards is more cautious, in terms of avoiding the buck, based on the stitched image.

As an aside, a simple thresholding and edge analysis of the buck silhouette yields the following images, where standard threshold 127 (middle) and T228 (left) where the tolerance is pushed to reveal the sun's location relative to the buck's antlers; and, T47 is used to identify the hillside's edge. Without further analysis, the middle image could be confused with a buck swimming in the water or a buck standing behind a U-shaped hill where only the buck's head is visible. This is in part why thresholding and edge detection alone can be inadequate tools to locate and identify objects or analyze scenes, because content may be lost. Properties of the image that are useful in determining a region or path via which to approach the buck on the hill is an area containing:

Symmetrical color blocks with no vertical disruptions (no buck in the way)—which is satisfied by the quadrants defined as 1 or 3 except for the region defined as Q3.q3 in the simplest analysis.

The definition of the angular differences across the image using the stitch defines the linearity of the ground element and can further identify the space occupied by a vertical disruption (in this case, the buck is the vertical disruption).

The buck (or other vertical disruption) is in a fixed location. If the "buck" is moving, the location has already been mapped and the stitching may potentially allow for faster targeting (target acquisition), as the buck moves up or down the hill.

The present (invention) may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Ambi Value (=CR) is calculated with the following formula:

$$CR=\Sigma(AF_1+AF_2+AF_3+AF_4+AF_5+AF_6)/n \text{ where } (n=6)$$

CR = Contig Number ($AF_1$) + Color lock ($AF_2$) + Linearity ($AF_3$) + Continuity ($AF_4$) + Color Block Depth (100) ($AF_5$)+ Spatial Color-Contig ($AF_6$)

| Ambiguity Factor | Range | Formula |
| --- | --- | --- |
| Contig Number (AF1) | 0-6 | Sobel or Differential Edge counts using color and thresholded images. Compare b/w area counts |
| Color Block (AF2) | 1.0-6.0 | Sequential color extraction using reduced 2-6 color images, quadrant-based identification of dominant colors (total, Q1-A4, top, bottom, right, left) |
| Linearity (AF3) | −1.0 to +1.0 | $C_{linearity}$ = CA + CD where CA is the angularity across the contiguity and CD is a break in the contiguity |
| Continuity (AF4) | −1.0 to +1.0 | $C_{continuity}$ = CVD + CIE |
| Color Block Depth (100) (AF5) | 0.25 to 1.0 | define color block distribution (see rules table) |
| Spatial Color-Contig (AF6) | −2.0 to +2.0 | compare contig # to color block # |
| Ambi Value* | | 0.75 to 2.25 |

*$\Sigma$(AF1 + AF2 + AF3 + AF4 + AF5 + AF6)/n (where n = 6)
Ambi Value (CR) = ((0-6) + (1.0 to 6.0) + (−1.0 to +1.0) + (−1.0 to +1.0) + (0.25 to +1.00) + (−2.0 to +2.0))/6

$AF_1$ (Contiguity Count/Dominant Contig ID)

Contiguity Count$_{Total}$($AF_1$) the average of thresholded values for the image measured at a starting point of 127 value and then at 160 for standard images. Adjustments to higher or lower Threshold values can be done, as well as progressive value measurements within a range depending on the image requirements for identifying the dominant contig and sub-contigs.

For a Thresholded Image at 127 and 160

Averaged Contiguity Count$_{T127}$=(Parts$_{T127b}$+Parts$_{T127w}$)/2

Averaged Contiguity Count$_{T160}$=(Parts$_{T160b}$+Parts$_{T160w}$)/2

Contiguity Count$_{Total}$($AF_1$)=(Averaged Contiguity Count$_{T127}$ +Averaged Contiguity Count$_{T160}$)/2

General

Contiguity Count$_{Total}$($AF_1$)=$\Sigma$(Averaged Contiguity Count$_{T1}$+... Averaged Contiguity Count$_{Tn}$)/n $AF_2$ (Color Blocking)

Color blocking allows for the identification and analysis of the colors in an image. The image is reduced to 2 colors and 3 colors and a color extraction is performed on each color-reduced image. The values are averaged to arrive at the $AF_2$. Up to 6 color blocks can be identified and used for the calculation, depending on the number of colors and their percentage contribution to the image.

For 2 and 3-color reduction CB.c$_{x-}$(AF$_2$)=(CB.c2+CB.c3)/2

General

CB.c$_{x-}$(AF$_2$)=$\Sigma$(CB.c2+... CB.c(n))/n (where n is an integer between 2-6)

$AF_3$ (Contig Linearity)

Color blocking allows for the identification and analysis of the colors in an image. The Linearity value is reflected in the Contig Angle and Contig Disruption values defined for the dominant contig. The measure can be applied to other contigs in the image.

$AF_3$=Contig$_{Linearity}$Value ($C_{linearity}$)=($C_A$+$C_D$)

Contig Angle ($C_A$)=(L2C$_{x-}$+R2C$_{x-}$)/2 Contig Disruption, Apply Rules Table Linearity Rules: Values are based on the angle of the dominant contig, the Contig Angle; and, the distance off the X-axis to +Y and/or −Y, the Contig Disruption 0: A straight edge, extending across >75% of the image width and an averaged angular difference of a single baseline point <5°

0.15: >5° to 30°

0.25: >30° to 45°

0.75: >45° and which extend across the image as a diagonal

−0.15: disrupted, non-linear (irregular) contigs

−1.0: Images without a defined contig or an object based contig $AF_4$ (Contig Continuity) method $AF_4$ =Contig Continuity =$C_{VD}$+$C_{IE}$ Continuity Rules If an image has at least one contig which is continuous across the entire width of the image (75-100% +/−3%), then assign a value of 1.0; if the contig is continuous across 50-75% +/−3% of the image, then 0; if <50% or if contig # is 0, then assign a value of −1.0.

If there is/are a Vertical Distractor extending >5% but less than 30%, individually or if combined, up from any otherwise linear and continuous contig, but which has additional complex contigs, then assign a value of 0.5.

If there are 2-3 VD but which are spatially separated, then assign a value of 0.5 or which individually extend less than 20% from an otherwise linear contig then assign a value of 0.5.

If multiple Vertical Distractors are present in the image (trees in the foreground), then assign a value of −1.0. Can use progressive decrements to identify variations/objects of the X-axis and their return to an established baseline across the entire image.

If there are multiple irregular edges on one or more contigs or if a single contig without an adjacent color block >40% of the image, then assign a value of −0.25. Assign a value of −0.15 for a single contig with a poorly defined edge but which is adjacent to at least one continuous color block or a color block >40%.

$C_{VD}$ Apply rules table (above)

where Sub-area$_{dc}$ is the area above the dominant contig $C_{VD.a1}$= Vertical Distractor$_{area1}$=(VD1$_{Q1w}$)(VD1$_{Q1h}$) / Sub-area$_{dc}$ Apply Continuity Rules $C_{VD.a2}$= Vertical Distractor$_{area2}$=(VD2$_{Q2w}$)(VD2$_{Q2h}$) / Sub-area$_{dc}$ Apply Continuity Rules $C_{VD.a3}$= Vertical Distractor$_{area3}$=(VD3$_{Q3w}$)(VD3$_{Q3h}$) / Sub-area$_{dc}$ Apply Continuity Rules
$C_{IE}$ Apply rules table (above)
$AF_5$ Color Block Depth100 (see chart rules}

| Color Block Depth 100 Rules | | | | |
|---|---|---|---|---|
| Value | $HQ_1$ | $HQ_2$ | $HQ_3$ | $HQ_4$ |
| 1 | A | A | A | A(B) |
| 0.75 | A | A | B | B |
| 0.5 | A | A | B | C |
| 0.5 | A | B | A | B |
| 0.25 | A | B | C | A |
| 0 | A | B | C | D |

$AF_6$ Spatial Color-Contig (see rules)
Compare the value obtained for $AF_2$ (Color Block) to $AF_1$(# of Contigs present in the image)

| Value | Condition Rules |
|---|---|
| 0 | If same $AF_2 = AF_1$ |
| 1 | If $AF_2$ is less than $AF_1$ |
| 2 | If $AF_2$ is more than $AF_1$, unless the contig # is equal to 0 |
| -1 | If $AF_1 = 0$ |

Ambi Value=CR=$\Sigma(AF_1+AF_2+AF_3+AF_4+AF_5+AF_6)/n$ (where n=# of Ambi factors)
$CBD_{60}$ (see rules table comparing color distribution using stitched image)

| Color Block Depth 60 (stitched image) Rules | | | | |
|---|---|---|---|---|
| Value | $HQ_1$ | $HQ_2$ | $HQ_3$ | $HQ_4$ |
| 1 | A | A | A | A(B) |
| 0.75 | A | A | B | B |
| 0.5 | A | A | B | C |
| 0.5 | A | B | A | B |
| 0.25 | A | B | C | A |
| 0 | A | B | C | D |

Color Block$_{(DEPTH)}$=$CBD_{100}/CBD_{60}$
Aesthetic Value ($V_{AES}$)=$1/((CBD_{100})(CB_{DEPTH}))$
Switch Capacity
$CF_{(Q)}=V_{AES}+CR$
Compositing Factor
$CF_{CR}=CF_Q-0.25$

FOR GENERATING COMPOSITE IMAGE SETS

Complexity Rating for the Image Set ($CR_{IS}$)
$CR_{IS}=\Sigma(CF_{(CR)1}, CF_{(CR)2}, CF_{(CR)3}/n=\Sigma(CF_{(AM)1}, CF_{(AM)2}, CF_{(AM)3})/n=\Sigma(CF_{(SEC)1}, CF_{(SEC)2}, CF_{(SEC)3}/n$
where n can be 2 or 3 and the 3rd term is included with 3-image composite $CF_{(CR)}$ Calculated as shown above
$CF_{(AM)}$ Follow Rules for assigning 0 or 1 to the calculated Ambi Value
$CF_{(AM)}$ Rules
1.0 For Ambi Value >0.5, but <2.25 (switch capable)
0.5 For Ambi Value >2 (switch capable but may have contig overlaps; image should be paired with other images with an AR Rating between 0.5-1.8 to limit potential contig overlaps)
0.0 For Ambi Value between 0-1 (f:g +:+; switch possible, but indicates a dominant object is present in the image)
0.0 For Ambi Value <0 (predominantly figure; switch negative)

$CF_{(SEC)}$ Assigned based on the sectioning strategy used for each image when the composited image is generated
$CF_{(SEC)}$ Rules
1.0 Equal sectioning used for component images with 2-10 (1:50 to 1:10) for either a 2- or a 3-image composite
1.0 Variable sectioning; total # of sections is between 10 to 20 for a 3-image composite with Ambi Value for the individual images which are greater than 0.75 to less than 1.5
0.5 Equal sectioning used for component images with 10-20 sections for 2-image composite
0.5 Variable sectioning; total # of sections 10 to 20 for a 3-image composite with Ambi Value for the individual images which are less than 0.75 and/or greater than 1.5
0.0 Equal sectioning used for component images with 10-20 sections for 3-image composite
0.0 Equal sectioning with greater than 20 image sections for one of the component images and/or if the Ambi Value is negative
0.0 Variable sectioning; total # of sections is greater than 20 for a 3-image composite with Ambi Value <0.75 and/or >1.5

| Ambiguity Factors | IM1 |
|---|---|
| Contig Number (AF1) | 3.5 (3/4) |
| Color Block (AF2) | 3.5 |
| Linearity (AF3) | 0.0 |
| Continuity(AF4) | 0.5 |
| Color Block Depth (100) (AF5) | 0.5 (AABC) |
| Spatial Color-Contig (AF6) | 0 |
| Ambi Rating (on screen) | H |
| Ambi Value (sum of factors/6) aka CR | 1.33 |
| $CBD_{60}$ | 0.5 (AABC) |
| Color Block$_{(DEPTH)}$ = | 1.0 |
| $CBD_{100}/CBD_{60}$ | (0.5/0.5) |
| Aes Rating (on screen) | — |
| Aesthetic Value ($V_{AES}$) = $1/((CBD_{100})(CB_{DEPTH}))$ | $2 = [1/((1.0)(0.5))]$ |
| CF(Q) = $V_{AES}$ + CR | 3.33 = (2 + 1.33) |
| CF(CR) = CFQ − 0.25 | 3.08 (3.33 − 0.25)[1] |

[1]Note: The dominant contig is also located at about 509 of the height of the image and is more dominant on the right than on the left because of the juxtaposition of another blue color block in Q4 adjacent to the dominant contig.

Figure 20:
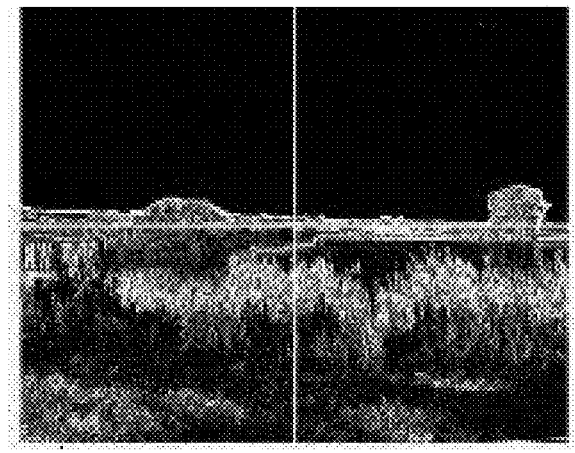
FIG. 20 shows an image that has been divided into quadrants and upon which edge detection is applied in preparation for further analysis.

Prepare Image, See FIG. 20
Step 1. Obtain width and length dimensions
Step 2. Define Dominant Edge
Step 2a. Use original color image
Step 2b. Apply Sobel or Gaussian Difference Edge Detection
Step 2c. Spatially map the dominant contig end-points
Step 3. Apply 4-Quadrant grid lines
Prepare Initial Quadrants, FIG. 21
Step 1. Divide the original image into four equal-sized quadrants
Step 2. Apply 4-Quadrant grid lines according to the sized quadrants. The positioning is at coordinates given by: height/2 and width/2
Step 3. Designate the quadrants as shown in the image, and sub-quadrants of a quadrant Q1.1, Q1.2, Q1.3, Q1.4 accordingly. Secondary quadrants are then designated Q1.q/1.1 ... q1.2 ... 3 ... 4 and then q' as needed. Q can then be designated with a-z names as the individual quadrants are sub-divided further.

Figure 18A:
FIGS. 18A, 18B, 19A and 19B show examples of contiguities.
Figure 18B:
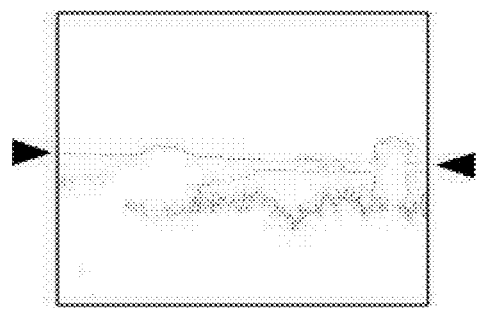
Figure 19A:
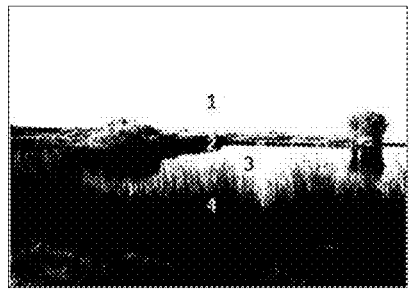
Figure 19B:

Prepare Stitch (1:3) and Peel (20% decrements) Image Set
Step
  1. Divide total width of the original image by 3
  Step 2. Cut 1/3 of the images width (Section 1).
  Step 3. Paste the cut 1/3 section of the image over Section 2, masking it.
  Step 4. Use the 1:3 Stitched Image 9from Step 3)
    Step 4a. Progressive Decrement 20% Move Section 1 back to its original position by 20% (other decrements can be used)
    Step 4b. Repeat Step 4a progressively moving Section 1 back to its original position.
  Obtain Color Profile
  Step 1. Color Extract original image
  Step 2. Group similar hues
  Step 3. Tally number of color groups
  $AF_1$ IDENTIFICATION OF CONTIG NUMBER
  Contiguity Method: Thresholding Method. See FIG. 21
  Im0 Result Visual Inspection
  Q1-Q2 block of continuous, of potentially similarly color block spanning ~50% of the image's height with a defined edge/interface spanning Q1-Q2; two Y-disruptions; smaller similarly hued block to right in Q4.q4; irregular edged region in foreground; distinction between bottom 20% region of region and next 20% region in Q4 region, where both extend from Q3 to Q4; continuity on left in Q3 from edge interface to bottom of image
  Im0 (Original Image, FIG. 21)
  Part I. Threshold 127, See FIG. 19A
  Step 1. Apply Thresholding to Original Color Image (Im0)
  Step 2. Generate binary image (settings 127/255) ->Im1A
  Step 3. Count b/w Parts
    $Parts_{T127b}$
      black parts count=2 (labeled areas 2, 4)
    $Parts_{T127w}$
      white parts count=2 (labeled areas 1 & 3)
    $Parts_{T127w}$ + $Parts_{T127b}$ =Contiguity $Count_{T127}$
    Contiguity $Count_{T127}$=4
  Part II. Threshold 160, See FIG. 19B
  Step 1. Adjust Thresholding to Original Image (Im0)
  Step 2. Generate binary image (settings 160/255) -->Im1B
  Step 3. Count b/w Parts
  $Parts_{T160b}$
    black parts count=1 (labeled areas 2)
  $Parts_{T160w}$
    white parts count=2 (labeled areas 1 & 3)
  $Parts_{T127w}$+$Parts_{T127b}$=Contiguity $Count_{T127}$
  Contiguity $Count_{T127}$=3
  General: Contiguity $Count_{Total}$ ($AF_1$)=(Contiguity $Count_{T127}$+Contiguity $Count_{T160}$)/2
  Example 3+4/2=3.5, $AF_1$=3.5
  Part III: Identification of Dominant Contiguity—Threshold Image +Edge Detection, See FIGS. 18A and 18B.
  Step 1. Use either Thresholded Image 160/255 or 2C reduced image.
  Step 2. Apply Edge Detection, Difference in Gaussian method with inverted colors.
  Step 3. Identify contiguity(s) with edge-to-edge characteristics and color block consistencies.
  Step 4. Attach length, width, depth and spatial coordinates data for the dominant contig and other contigs of interest.

Figure 22A:
FIG. 22A shows an example of color blocking the image of FIG. 20 into two colors.
Figure 22B:
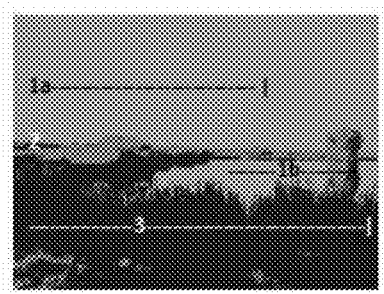
FIG. 22B shows an example of color blocking the image of FIG. 20 into three colors.
Figure 23:
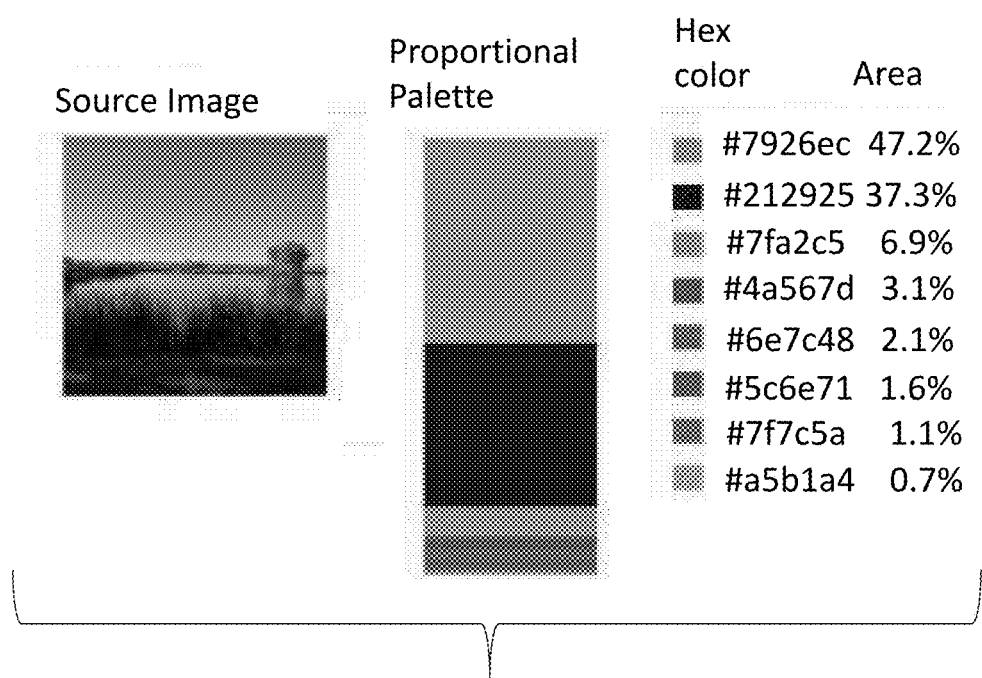
FIG. 23 shows an example of the color reduction of the image of FIG. 20 into 8 colors.

Part IV: Identification of Dominant Contiguity: Original Color Image-Edge Detect
  Dominant Contig
    * Image Dimensions width=(0, 0)×(Im.$X_{lim}$, 0); height= (0, 0)×(0, Im.Ylim)
    * Contig Width: 75%-100%
    * Height/XV-position (from top 0, 0) left: (0, Imy.5) right: (Im.$X_{lim}$, Imy.5)
    * Disruptions: 2 distinct, spatially separated Y-disruptions
    * Angularity difference: small
    * Framing: Above (−x,+y/+x,+y) and at right below (+x,−y) blue color block framing
  $AF_2$ COLOR BLOCKING (VALIDATION OF THRESHOLD CONTIG COUNT & CONTIG DOMINANT)
  Part I. Color Blocking.c2
  Step 1. Use Original Image
  Step 2. Reduce Image to 2 Indexed Colors (resembles threshold 160/255 image) (Im0.-2C), See FIG.22
  Step 3. Color Extract Image to identify Reduced Colors. Blue and Dark Grey/Green
  C1=blue C2=dark grey
  Step 4. Tally number of Discontinuous Color Blocks
    1st Color Block in 2 Color reduction =CB.c2c1
      CB.c2c1=1a+1b= 2
      Identified two non-contiguous blue areas Infer sky and water.
    2nd Color Block in 2 Color reduction =CB.c2c2
      ("+" indicates dark gray area appears contiguous on left but split by blue on right)
      $CB.c2c_1$ +$CB.c2c_2$ =CB.c2
      Color Block Contiguity Count (CB.c2): 2+1=3
    $CB.c_2$=3
    3rd Color Block in 3 Color reduction =CB.c3c3
    CB.c3c3=(Area 2)=1
    Color Block Contiguity
    CB.c3=$CB.c3c_1$+$CB.c3c_2$+$CB.c3c_3$
    (CB.c3)=4
  Part II. Color Blocking.c3
  Step 1. Use Original Image
  Step 2.: Reduce Image to 3 Indexed Colors (Im0.-3C)
  Step 3. Color Extract to identify Reduced Colors.
  Blue, Dark Grey, Olive green, Assign Variable Label
  $C_1$=blue $C_2$=dark grey $C_3$=dark green
  Step 4. Tally number of Discontinuous Color Blocks
    1st Color Block in 3 Color reduction =$CB.c3c_1$
      $CB.c3c_1$ (Area 1a+1b)=2
    Identified two non-contiguous blue areas separated by an olive green contiguity.
    Infer sky and water.
    2nd Color Block in 3 Color reduction =$CB.c3c_2$
      $CB.c3c_2$ (Area 3)=1+("+" indicates dark grey area includes a limited amount of olive green)
    3rd Color Block in 3 Color reduction =$CB.c3c_3$
      $CB.c3c_3$ (Area 2)=1
      CB.c3=$CB.c3c_1$+$CB.c3c_2$+$CB.c3c_3$
    Color Block Contiguity (CB.c3)=4
  Part III
  Step 1. Reduce Original image to 4, 5, or 6 indexed colors, depending on image color content.
  Step 2. Repeat Steps 3-4
  Step 3. Average CB.c2, CB.c3 (CB.c4, CB.c5, CB.c6)
    General: Color Block Contiguity Count ($AF_3$)= (CB.c2+CB.c3)/2

Example: 3+4/2=3.5

AF3=3.5

NOTE: Additional color reductions (to 4, 5, 6 colors) can be applied depending on the number of color groups identified by color extraction of the original image and lump summing similar hues. As shown in the figure to the right, three (3) dominant colors are identified: blue, black/gray, deep green. Additional analysis of color reduced images is conducted as part of Color Block analyses and quadrant mapping.

AF3 CONTIG LINEARITY VALUE

Range: −1.0 to 1.0

$C_{linearity} = {}^-C_A {}^+C_D$

This value is represented by the sum of the values assigned to the Contig Angle and the Contig Disruption using the Stitched 1:3 image. The use of the progressive decrements identifies variations/objects off the X-axis and the return to an established baseline across the entire image for measuring angles and disruptions.

Measured relative to the defined or designated Dominant Contiguity (>75-100% of the image)

Rules: Values are based on the angle of the dominant contig, the Contig Angle; and, the distance off the X-axis to +Y and/or −Y, the Contig Disruption 0: A straight edge, extending across >75% of the image width and an averaged angular difference of a single baseline point <5°

0.15: >5° to 30°

0.25: >30° to 45°

0.75: >45° and which extend across the image as a diagonal

−0.15: disrupted, non-linear (irregular) contigs

−1.0: Images without a defined contig or an object based contig

Contig Angle (CA)

Part I. Original Image Angle Measurements (see Table 1 below), See FIG. 24

Using the stitched image, during each progressive shift of Sec. 1 back to Area 1 (its original location) the angular difference between the previous height of dominant contig to its new current location is calculated, and averaged across the image until Section 1 is in Area 1.

Step 1. Apply the measurement area tool to the original image; this can be centered at 0, 0 on the mapped grid of the image or to another designated set of coordinates to facilitate measurements based on the relative position of the dominant contig. The designated center, however, is used consistently for all subsequent measurements applied to the image.

Step 2. Position the grid measurement tool at (w/2=375px, h/2=282px)

Step 3. Measure Edge to Edge (E2E) angle on the image passing through the Y-axis at the level of the detected edge for the Dominant Contig.

Step 4. Measure L to C (L2C) angle to the same midpoint edge detected point.

Step 5. Measure R to C (R2C) angle to same midpoint edge detected point.

Part II. Stitch and Peel Image Measurements (see Table 1 below) see FIGS. 25-27

Step 1. Apply the measurement area tool to the stitched image (1:3) at the center of the image. The X coordinate will change, but not the Y as the height of the image is not affected by the stitch.

Step 2. Position the grid measurement tool at (w/2=250px, h/2=282px)

Step 3. Measure Edge to Edge (E2E) angle on the image passing through the Y-axis at the level of the detected edge for the Dominant Contig.

Step 4. Measure L to C (L2C) angle to the same midpoint edge detected point.

Step 5. Measure R to C (R2C) angle to same midpoint edge detected point.

Step 6. Average L2C and R2C measurements.

Step 7. Compare E2E measurement to averaged measurement.

Step 8a. Apply the measurement area tool to the stitched 1:3 image, 20% decrement.

Step 8b. Repeat Steps 3-5 for each Peel.

Step 9a. Apply the measurement area tool to the stitched 1:3 image, 40% decrement.

Step 9b. Repeat Steps 3-5 for each Peel.

Step 10a. Apply the measurement area tool to the stitched 1:3 image, 60% decrement.

Step 10b. Repeat Steps 3-5 for each Peel.

Step 11a. Apply the measurement area tool to the stitched 1:3 image, 80% decrement.

Step 11b. Repeat Steps 3-5 for each Peel.

Step 12. Average E2E, including un-stitched and all stitched images.

Step 13. Average all L2C, including un-stitched and all stitched images.

Step 14. Average all R2C, including un-stitched and all stitched images.

Step 15. Find the average angle difference between the averaged E2E value and the R2C and L2C averaged value.

$C_A$ Value =0

$C_A$=L2C+R2C /2

$C_A$=2.58+1.51/2=2.045

Contig Disruption (CD)

Using the stitched image, during each progressive shift of Sec.1 back to Area 1 (its original location), the gap space between the absent or missing contig and the contig which is present, whether this is in Sec.1 or Sec.3, is measured. Assign a value of −0.25 to contigs which extend less than 75% of the image width or for a split contig with or without a Vertical Disruptor. For contigs extending >75%+/−3% of the width of the image assign a value of 0.

General: $C_{linearity}(AF3)=C_A+C_D$

CD Value N/A

TABLE 1

Contig Angle Measurements

| Image Type | E2E (o) (edge to edge) | L2C (o) (left to center) | R2C (o) (right to center) | average (x-) | compare full image x- |
|---|---|---|---|---|---|
| Q2.q4.1 & Q2.q4.2 | colspan | contiguity not localized to this region, based on T-spatial and color blocks | | | |
| Q2.q4.3 | N/A | N/A | N/A | N/A | N/A |
| Q2.q4.4 | 1.53 | 21.59 | 24.08 | 22.835 | vertical disruption |
| Q2.q4.4-1:3 | 2.29 | 35.75 | 38.38 | 37.065 | m > o r > 135.775 |
| Q2.q4.4-1:3 dec 20% | 2.08 | 35.02 | 37.53 | 36.275 | m > o r > 134.195 |
| Q2.q4.4-1:3 dec 40% | 1.91 | 32.07 | 34.73 | 33.4 | m > o r > 131.49 |
| Q2.q4.4-1:3 dec 60% | 1.76 | 28.51 | 31.02 | 29.765 | m > o r > 128.005 |
| Q2.q4.4-1:3 dec 80% | 1.64 | 26.70 | 29.25 | 27.975 | m > o r > 126.335 |
| Q2.q4.q'.3 & Q2.q4.q'.4 | contiguity not localized to this region, based on T-spatial and color blocks | | | | |

AF4 CONTIG CONTINUITY VALUE

Range: −1.0 to 1.0

$C_{cont} = C_{VD} + C_{IE}$

This value is represented by the sum of the values assigned to Vertical Distractors and Irregular Edges using the 1:3 stitched image.

If an image has at least one contig which is continuous across the entire width of the image (75-100% +/−3%), then assign a value of 1.0; if the contig is continuous across 50-75% +/−3% of the image, then 0; if <50% or if contig # is 0, then assign a value of −1.0.

If there is/are a Vertical Distractor extending >5% but less than 30% up from any otherwise linear and continuous contig, but which has additional complex contigs, then assign a value of 0.5.

If there are 2-3 Vertical Distractor but which are spatially separated, then assign a value of 0.5 or which individually extend less than 20% from an otherwise linear contig then assign a value of 0.5.

If multiple Vertical Distractors are present in the image (trees in the foreground), then assign a value of −1.0. Can use progressive decrements to identify variations/objects of the X-axis and their return to an established baseline across the entire image.

If there are multiple irregular edges on one or more contigs or if a single contig without an adjacent color block >40% of the image, then assign a value of −0.25. Assign a value of −0.15 for a single contig with a poorly defined edge but which is adjacent to at least one continuous color block or a color block >40%.

Vertical Distractors

Method 1: Stitched Image, see FIGS. 28 and 29

Using the stitched image, during each progressive shift of Sec.1 back to Area 1 (its original location), the vertical distraction element is mapped between the point of its emergence and extinction whether this is in Sec.1, Sec.2 or Sec.3. This is compared to the intact image using the mapping tool. The reversed image shows a right end point to the Vertical Disruptor measuring tool.

Contig Angle Measure

Table 2 below shows the results of Quadrant 2 angle sub- mapping across what can be identified as a potential vertical distractor. The height of the distractor element can be calculated, and its characteristics estimated for further inquiry below. (Image reversed for grid mapping visualization)

TABLE 2

| | Q2 Quadrant Sub-Mapping of Vertical Disruptor | | | | |
|---|---|---|---|---|---|
| Image Type | E2E (o) (edge to edge) | L2C (o) (left to center) | R2C (o) (right to center) | average (x-) | compare full image x- |
| Q2.q4.1 & Q2.q4.2 | contiguity not localized to this region, based on T-spatial and color blocks | | | | |
| Q2.q4.3 | N/A | N/A | N/A | N/A | N/A |
| Q2.q4.4 | 1.53 | 21.59 | 24.08 | 22.835 | vertical disruption |
| Q2.q4.4-1:3 | 2.29 | 35.75 | 38.38 | 37.065 | m > o r > 135.775 |
| Q2.q4.4-1:3 dec 20% | 2.08 | 35.02 | 37.53 | 36.275 | m > o r > 134.195 |
| Q2.q4.4-1:3 dec 40% | 1.91 | 32.07 | 34.73 | 33.4 | m > o r > 131.49 |
| Q2.q4.4-1:3 dec 60% | 1.76 | 28.51 | 31.02 | 29.765 | m > o r > 128.005 |
| Q2.q4.4-1:3 dec 80% | 1.64 | 26.70 | 29.25 | 27.975 | m > o r > 126.335 |
| Q2.q4.q'.3 & Q2.q4.q'.4 | contiguity not localized to this region, based on T-spatial and color blocks | | | | |

Method 2: X-axis distance and area Using a Thresholded 160 or Sobel Edged image, the height of the VD(s) (distance off the X-axis) is measured relative to the dominant contig, as well as the area containing the VD(s) relative to the area of the image above it.

Step 1. Recall Image Dimensions $Width_o = 4.66$ $Height_o = 3.50$ $Area_o = 16.31$ Step 2. Measure dimensions of the image area above contig for each VD $Width_{dc} = 4.66$ $Height_{dc} = 1.60$ $Sub\text{-}area_{dc} = 7.456$ Step 3. Measure separation distance between the contiguities if there is more than 1 VD Separation distance $= VD_1 - VD_2 = $ 2.25

Step 4. Assign each VD a variable which includes its Quadrant locale.

$VD1_{Q1}$ $VD2_{Q2}$

Step 5. Measure the width and height of each VD relative to the dominant contig.

$VD1_{Q1w} = 0.60$ $VD1_{Q1h} = 0.17$ $VD2_{Q2w} = 0.53$ $VD2_{Q2h} = 0.35$

Step 6. Calculate % height occupied by each VD relative to the height above the contig.

$VD1_{Q1h} = VD1_{Q1h} / Height_{dc}$ $10.63\% = 0.17/1.60$ $VD2_{Q2h} = VD2_{Q2h} / Height_{dc}$ $21.88\% = 0.35/160$ Step 7. Calculate the area of each VD as a percentage of the area above the contig.

$VD1_{vd} = (VD1_{Q1w})(VD1_{Q1h}) / Sub\text{-}area_{dc}$ $VD1_{vd} = (0.60)(0.17) / 7.456 = 0.0137$ $VD2_{vd} = (VD2_{Q2w})(VD2_{Q2h}) / Sub\text{-}area_{dc}$ $VD2_{vd} = (0.53)(0.35) / 7.456 = 0.0249$ see Rules Table Contig is continuous across between 50-75% of the image.

Contig has 2 minor Vertical Distractors.

$C_{VD} = 0.5$

Irregular Edges

Using either the original image or the stitched image, deviations off the X-axis relative to the dominant contig are evaluated using the Grid Tool to define the Intrusion Area. If the suspected IE extends beyond one or more adjacent grid boxes, or extends along the X-axis for 3 or more grid boxes and/or fills 1 or more grid boxes more than 20% and/or extends beyond the boundaries of one or more grid boxes, using a standard grid tool, it is evaluated as a Vertical Distractor. Use a stitched image in regions known to contain a Vertical Distractor.

Step 1. Highlight the dominant contig on a thresholded or edge image (stitched or original).

Step 2. Apply the grid tool to the image.

Step 3. Identify grid square intrusion areas off the X-axis where contiguity edge extends into grid area using image color reversals.

Step 4. Map intrusion areas according to rules as non-irregular or classified as Vertical Distractors.
See FIGS. 31 and 32.
$C_{IE}=0$
No Irregular Edges
Example .05+0=.5
General: Continuity Factor $(AF_4)=C_{IE}+C_{VD}$
$AF_4=.5$
AF5 COLOR BLOCK DEPTH 100: (REFERENCE INFORMATION)

| Color Block Range Assignment/Color Block Depth | | | |
|---|---|---|---|
| Color | RGB | HTML | HSV |
| Red | 255, 0, 0 | ff0000 | 0, 100, 100 |
| Green | 0, 255, 0 | 00ff00 | 120, 100, 100 |
| Blue | 0, 0, 255 | 0000ff | 240, 100, 100 |
| Yellow | 255, 255, 0 | ffff00 | 60, 100, 100 |
| Purple | 128, 0, 255 | 8000ff | 270 100, 100 |
| Orange | 255, 128, 0 | ff8000 | 30 100, 100 |
| Violet | 255, 0, 128 | ff0080 | 330, 100, 100 |
| Black | 0, 0, 0 | 000000 | 0, 0, 0 |
| White | 255,255,255 | Fffff | 0, 0, 100 |

Divide image into 4 equal-sized quadrants: Q1-Q4, see FIG. 21.
Im width value =$Im.X_{lim}$
Im height value =$Im.Y_{lim}$
   Quadrant width value=$Im.Xh_{lim}/2=Im_{x.5}$ Quadrant height value=$Im.Y_{lim}/2=Im_{y.5}$ Define Quadrant Space (Area)=$(Im_{x.5})(Im_{y.5})$
Define Quadrants' Coordinates (Spatial Distribution)

| Coordinates Naming | | | | |
|---|---|---|---|---|
| Quadrant | left, top | right, top | left, bottom | right, bottom |
| 1 | 0, 0 | 0, Imx.5 | 0, Imy.5 | Imx.5, Imy.5 |
| 2 | $Im_{x.5}$, 0 | $Im.X_{lim}$, 0 | Imx.5, Imy,5 | $Im.X_{lim}$, $Im_{y.5}$ |
| 3 | 0, $Im_{y.5}$ | Imx.5, Imy.5 | 0.Im, $Y_{lim}$ | $Im_{x.5}$, $Im.Y_{lim}$ |
| 4 | Imx.5, Imy.5 | $Im.X_{lim}$, $Im_{y.5}$ | Imx.5, $Im.Y_{lim}$ | $Im.X_{lim}$, $Im.Y_{lim}$ |

Q1span$_{width}$ = (0, $Im_{x.5}$)    Q1span$_{height}$ = (0, $Im_{y.5}$)
Q2span$_{width}$ = ($Im_{x.5}$, $Im.X_{lim}$)    Q2span$_{height}$ = (0, $Im_{y.5}$)
Q3span$_{width}$ = (0, $Im_{x.5}$)    Q3span$_{height}$ = ($Im_{y.5}$, $Im.Y_{lim}$)
Q4span$_{width}$ = ($Im_{x.5}$, $Im.X_{lim}$)    Q4span$_{height}$ = ($Im_{y.5}$, $Im.Y_{lim}$)

AF5 COLOR BLOCK DEPTH 100 ANALYSIS Description: Blue sky, lighter toward horizon; similar to blue water. Does the differentiation of blue into light blue and medium blue matter in determining if the sky is blue and the water is blue? Does differentiation matter in identifying transition to "edge"

| Dominant Colors | |
|---|---|
| CB1 (blue) | 54.6% |
| CB2 (dark gray) | 33.9% |
| CB3 (olive green) | 11.5% |

For Reference: 6 max; each greater than a total of 10% in quadrant analysis
Additional Image Color Block Assignments: $CB_{red}$, $CB_{green}$, $CB_{blue}$, $CB_{yellow}$, $CB_{black}$, $CB_{white}$, $CB_{purple}$, $CB_{orange}$, $CB_{violet}$ Step 2. Divide original image into equal-sized quadrants (Image width/2); Image height/2).
Step 3. Color extract each quadrant (Q1, Q2, Q3, Q4).
Step 4. Collect percentage values for similar color hues (blues, greens, black/greys, yellows, reds, etc.)
Step 5. Map/Identify Near-Symmetrical Color Distribution matches and other Patterns (Table 3), see FIG. 21.

TABLE 3

| | | $CB_1$ | $CB_2$ | $CB_3$ |
|---|---|---|---|---|
| Im0.4Q | $Q_{alt}$ | 54.6 | 33.9 | 11.5 |
| Im0.4Q.Q1 | Q1 | 92.1 | 3.6 | 2.6 |
| Im0.4Q.Q2 | Q2 | 94.9 | 1.2 | 2.6 |
| Im0.4Q.Q3 | Q3 | — | 76.1 | 13.4 |
| Im0.4Q.Q4 | Q4 | 28.3 | 71 | — |

Visual Description Analysis
* Q1 and Q2 show approximately the same blue color distribution.
* Q1 and Q2 both show small amounts of green/black.
* Q3 and Q4 show dark colors.
* Q3 does not have detectable blue (%-wise).
* Q3 having olive green as a secondary color; * Q4 shows blue as a secondary color.
Step 6. Color extract combined quadrant regions (Top Q1-Q2; Bottom Q3-Q4; Left Q1-Q3; Right Q2-Q4)
Step 7. Collect percentage values for similar color hues (blues, greens, black/greys, yellows, reds, whites)
Step 8. Map/Identify Color Distribution and other Patterns (Table 4)
Step 9. Reduce image colors to 6 colors, 5 colors, 4 colors, 3 colors, 2 colors.
Step 10. Compare % Values for each of the identified colors across the entire image (all 4 Quadrants) (Table 5).

TABLE 4

| | | $CB_{blue}$ | $CB_{black}$ | $CB_{green}$ |
|---|---|---|---|---|
| Im0.4Q | Qall | 54.6 | 33.9 | 11.5 |
| Im0.4Q.Qtp | Q1-Q2 | 93.3 | — | 5.9 |
| Im0.4Q.Qbt | Q3-Q4 | 12.9 | 70.3 | 16 |
| Im0.4Q.Qlt | Q1-Q3 | 48.1 | 47.7 | 3.4 |
| Im0.4Q.Qrt | Q2-Q4 | 60.6 | 32.1 | 6.5 |

Figure 21:
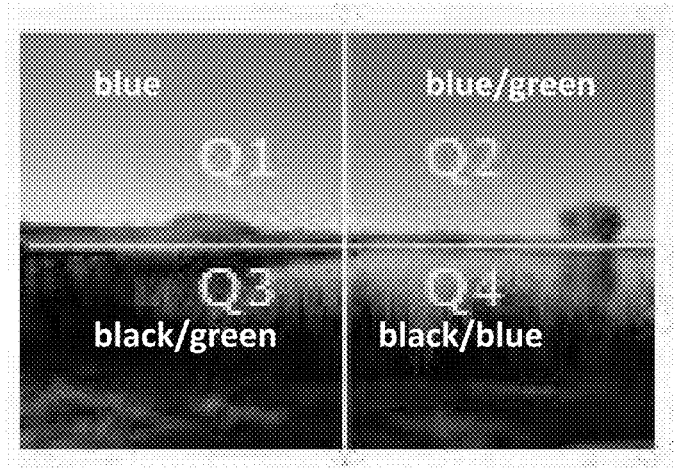
FIG. 21 shows the same image as FIG. 20 after labeling the quadrants, which is used in a color block analysis.

See FIG. 21.
See FIG. 34-38.
Results

| *All Image | Blue dominant color: >50% > Dk Grey/Black-30% > Green-10% |
|---|---|
| *Q1 | Blue dominant color: >90% > Black-3% > Green-2% S1 |
| *Q2 | Blue dominant color: >90% > Black-3% > Green-2% S1 |
| *Q3 | Dk Grey/Black dominant color: >75% > Green-13% R1 |
| *Q4 | Dk Grey/Black dominant color: >70% > Blue-28% R1 |
| *Q1-Q2 | Blue dominant color: >90% > Green-5% |
| *Q3-Q4 | Dk Grey/Black dominant color: >70% > Green-15% > Blue-12% |
| *Q1-Q3 | Blue/Black dominant colors = >45% > Green-3% |
| *Q2-Q4 | Blue dominant color: >60% > Black-30% > Green-6% See Table 6 for % color distributions |

Rules Chart 1

| Value | HQ$_1$ | HQ$_2$ | HQ$_3$ | HQ$_4$ |
|---|---|---|---|---|
| 1 | A | A | A | A(B) |
| 0.75 | A | A | B | B |
| 0.5 | A | A | B | C |
| 0.5 | A | B | A | B |
| 0.25 | A | B | C | A |
| 0 | A | B | C | D |

Comment: Resolution of black color into other non-black colors (e.g., black -->dark grey or dark green); Quadrants can be subdivided as needed based identification of symmetrical and non-symmetrical color identities and patterns

AF5=.05

AF$_5$ COLOR BLOCK DEPTH 100: (REFERENCE INFORMATION}

Color Block Range Assignment/Color Block Depth

| Color | RGB | HTML | HSV |
|---|---|---|---|
| Red | 255, 0, 0 | ff0000 | 0, 100, 100 |
| Green | 0, 255, 0 | 00ff00 | 120, 100, 100 |
| Blue | 0, 0, 255 | 0000ff | 240, 100, 100 |
| Yellow | 255, 255, 0 | ffff00 | 60,100, 100 |
| Purple | 128, 0, 255 | 8000ff | 270 100, 100 |
| Orange | 255, 128, 0 | ff8000 | 30 100, 100 |
| Violet | 255, 0, 128 | ff0080 | 330, 100, 100 |
| Black | 0, 0, 0 | 000000 | 0, 0, 0 |
| White | 255,255,255 | ffffff | 0, 0, 100 |

Divide image into 4 equal-sized quadrants: Q1-Q4 Im width value=Im.X$_{lim}$

Im height value=Im.Y$_{lim}$

Quadrant width value=Im.X$_{lim}$/2 =Im$_{x.5}$

Quadrant height value=Im.Y$_{lim}$/2 =Im$_{y.5}$

Define Quadrant Space (Area)=(Im$_{x.5}$)(Im$_{y.5}$)

Define Quadrants' Coordinates (Spatial Distribution)

Coordinates Naming

| Quadrant | left, top | right, top | left, bottom | right, bottom |
|---|---|---|---|---|
| 1 | 0, 0 | 0, Im$_{x.5}$ | 0, Im$_{y.5}$ | Im$_{x.5}$, Im$_{y.5}$ |
| 2 | Im$_{x.5}$, 0 | Im.X$_{lim}$, 0 | Im$_{x.5}$, Im$_{y.5}$ | Im.X$_{lim}$, Im$_{y.5}$ |
| 3 | 0, Im$_{y.5}$ | Im$_{x.5}$, Im$_{y.5}$ | 0, Im.Y$_{lim}$ | Im$_{x.5}$, Im.Y$_{lim}$ |
| 4 | Im$_{x.5}$, Im$_{y.5}$ | Im.X$_{lim}$, Im$_{y.5}$ | Im$_{x.5}$, Im.Y$_{lim}$ | Im.X$_{lim}$, Im.Y$_{lim}$ |

Q1span$_{width}$ = (0, Im$_{x.5}$)   Q1span$_{height}$ = (0, Im$_{y.5}$)
Q2span$_{width}$ = (Im$_{x.5}$, Im.X$_{lim}$)   Q2span$_{height}$ = (0, Im$_{y.5}$)
Q3span$_{width}$ = (0, Im$_{x.5}$)   Q3span$_{height}$ = (Im$_{y.5}$, Im.Y$_{lim}$)
Q4span$_{width}$ = (Im$_{x.5}$, Im.X$_{lim}$)   Q4span$_{height}$ = (Im$_{y.5}$, Im.Y$_{lim}$)

AF$_5$ COLOR BLOCK DEPTH 100 ANALYSIS

Visual Description: Blue sky, lighter toward horizon; similar to blue water. Does the differentiation of blue into light blue and medium blue matter in determining if the sky is blue and the water is blue? Does differentiation matter in identifying transition to "edge"?

Step 1A. Color extract original color image using TinEye program or similar color extraction program; then lump sum similar hues. (Programs tend to use relative averages. Color reduction to X# colors isn't exact relative to TinEye color extraction).

Step 1B. Identify Dominant Colors after lump summing similar hues.

Dominant Colors

| CB1 (blue) | 54.6% |
|---|---|
| CB2 (dark gray) | 33.9% |
| CB3 (olive green) | 11.5% |

For Reference: 6 max; each greater than a total of 10% in quadrant analysis

Additional Image Color Block Assignments: CB$_{red}$, CB$_{green}$, CB$_{blue}$, CB$_{yellow}$, CB$_{black}$, CB$_{white}$, CB$_{purple}$, CB$_{orange}$, CB$_{violet}$ Step 2. Divide original image into equal-sized quadrants (Image width/2; Image height/2).

Step 3. Color extract each quadrant (Q1, Q2, Q3, Q4).

Step 4. Collect percentage values for similar color hues (blues, greens, black/greys, yellows, reds, etc.)

Step 5. Map/Identify Near-Symmetrical Color Distribution matches and other Patterns (Table 3).

TABLE 3

| | | CB$_1$ | CB$_2$ | CB$_3$ |
|---|---|---|---|---|
| Im0.4Q | Qall | 54.6 | 33.9 | 11.5 |
| Im0.4Q.Q1 | Q1 | 92.1 | 3.6 | 2.6 |
| Im0.4Q.Q2 | Q2 | 94.9 | 1.2 | 2.6 |
| Im0.4Q.Q3 | Q3 | — | 76.1 | 13.4 |
| Im0.4Q.Q4 | Q4 | 28.3 | 71 | — |

Visual Description/Analysis

* Q1 and Q2 show approximately the same blue color distribution.
* Q1 and Q2 both show small amounts of green/black.
* Q3 and Q4 show dark colors.
* Q3 does not have detectable blue (%-wise).
* Q3 having olive green as a secondary color.
* Q4 shows blue as a secondary color.

Step 6. Color extract combined quadrant regions (Top Q1-Q2; Bottom Q3-Q4; Left Q1-Q3; Right Q2-Q4).

Step 7. Collect percentage values for similar color hues (blues, greens, black/greys, yellows, reds, whites).

Step 8. Map/Identify Color Distribution and other Patterns (Table 4).

TABLE 4

| | | CB$_{blue}$ | CB$_{black}$ | CB$_{green}$ |
|---|---|---|---|---|
| Im0.4Q | Qall | 54.6 | 33.9 | 11.5 |
| Im0.4Q.Q$_{tp}$ | Q1-Q2 | 93.3 | — | 5.9 |
| Im0.4Q.Q$_{bt}$ | Q3-Q4 | 12.9 | 70.3 | 16 |
| Im0.4Q.Q$_{lt}$ | Q1-Q3 | 48.1 | 47.7 | 3.4 |
| Im0.4Q.Q$_{rt}$ | Q2-Q4 | 60.6 | 32.1 | 6.5 |

Step 9. Reduce image colors to 6 colors, 5 colors, 4 colors, 3 colors, 2 colors

Step 10. Compare % Values for each of the identified colors across the entire image (all 4 Quadrants) (Table 5)

TABLE 5

| | CB$_{blue}$ | CB$_{black}$ | CB$_{green}$ |
|---|---|---|---|
| Im0.4Q$_{256}$ | 54.6 | 33.9 | 11.5 |
| Im0.4Q-$_{6c}$ | 53.7 | 36.3 | 9.9 |
| Im0.4Q-$_{5c}$ | 52.1 | 42.3 | 4.4 |

TABLE 5-continued

|  | $CB_{blue}$ | $CB_{black}$ | $CB_{green}$ |
|---|---|---|---|
| Im0.4Q-$4c$ | 52.1 | — | 47.1 |
| Im0.4Q-$3c$ | 53.3 | — | 46.7 |
| Im0.4Q-$2c$ | 53.5 | — | 46.5 |

Results

\* All Image Blue dominant color: >50%>Dk Grey Black–30%>Green–10%

| *Q1 | Blue dominant color: >90% > Black-3% > Green-2% | S1 |
|---|---|---|
| *Q2 | Blue dominant color: >90% > Green-3% > Black-1% | S1 |
| *Q3 | Dk Grey/Black dominant color >75% > Green-13% | R1 |
| *Q4 | Dk Grey/Black dominant color >70% > Blue-28% | R1 |
| *Q1-Q2 | Blue dominant color >90% > Green-15% > Blue-12% | |
| *Q1-Q3 | Blue/Black dominant colors = >45% > Green-3% | |
| *Q2-Q4 | Blue dominant color: >60% > Black-30% > Green-6% | |

Rules Chart 1

| Value | $HQ_1$ | $HQ_2$ | $HQ_3$ | $HQ_4$ |
|---|---|---|---|---|
| 1 | A | A | A | A(B) |
| 0.75 | A | A | B | B |
| 0.5 | A | B | C | B |
| 0.5 | A | B | A | B |
| 0.25 | A | B | C | A |
| 0 | A | B | C | D |

Comment: Resolution of black color into other non-black colors (e.g. black --> dark grey or dark green); Quadrants can be subdivided as needed based identification of symmetrical and non-symmetrical color identities and patterns $AF_5 = 0.5$

TABLE 6

Color Percentages - Details for AF5 Analysis

| Full Color | Medium Blue/Light Blue | Black | Green |
|---|---|---|---|
| Full Color 54.6  33.9  11.5 | #82aef0 46.3% #7d9ebf 5.1% #4a6071 3.2% | #202420 33.9% | #444a32 6.1% #72794b 5.4% |
| Q-top (Q1:2) 93.3, —, 5.9 | #82aef0 93.3% | | #7a854a 2.5% #646c49 2.4% #a7b3b0 1.0% |
| Q-bottom (Q3:4) 12.9, 70.3, 16 | #4f687c 2.4% #7b9dbf 10.5% | #212523 70.3% | #484d34 12.6% #68733d 3.4% |
| Q-left (Q1:3) 48.1, 47.7, 3.4 | #8eb8f5 46.1% #6a89aa 2.0% | #272e24 47.7% | #727c44 3.4% |
| Q-right (Q2:4) 60.6, 32.1, 6.5 | #76a4ea 47.1% #50687e 6.9% #87a9cb 6.6% | #1e2620 32.1% | #4a4e37 2.6% #677543 2.5% #8c8863 1.4% |
| Q1 92.1, 3.6, 2.6 | #8fb9f5 92.1% | #81894d 3.6% | #59613e 2.6% |
| Q2 94.9, 1.2, 2.6 | #6e9fea 85.8% #b8d5f0 9.1% | #949d83 1.2% | #727e4c 3.1% |
| Q3 —, 76.1, 13.4 | | #212523 76.1% | #454d321 4.5% #636d39 5.5% #7396ba 3.4% |
| Q4 28.3, 71, — | #88abcd 12.4% #506879 6.2% #3a4a51 4.9% #5c7da2 4.8% | #20271f 65.8% #727450 5.2% | |
| Red 6C 53.7, 36.3, 9.9 | #5f95e4 23.8% #8bbbf8 15.5% #a7c5de 11.8% #6a7e84 2.6% | #252722 36.3% | #4d5747 5.6% #7c855d 4.3% |

TABLE 6-continued

Color Percentages - Details for AF5 Analysis

| Full Color | Medium Blue/Light Blue | Black | Green |
|---|---|---|---|
| Red 5C 52.1, 43.5, 4.4 | #77a7ee 36.1% #a5c3dc 16.0% | #21241e 29.8% #414a3e 12.5% #627474 1.2% | #7c855d 4.4% |
| Red 4C 52.1, 30.8, 47.1 | #77a7ef 36.1% #a7c5clf 15.5% | | #2b332b 41.6% #7b8259 5.5% |
| Red 3C 53.3 — 46.7 | #81adeb 50.9% #4d6375 1.3% #6b89af 1.1% #8095a0 0.5% | | #2a322a 41.2% #7d855a 5.5% |
| Red 2C 53.5, —, 46.5 | #82aae4 53.5% | | #293129 46.5% |

AF6 SPATIAL COLOR CONTIG

Compares the # of Colors to the # of Contigs present in the image as being equal to, greater than or less than the # of contigs. A Value of 0 for same; 1 if less; 2 if more, unless the contig # is equal to 0 then assign a value of −1

Example,

AF1=AF2

.05−.05

AF6=0

AMBIGUITY RATING

Formula: $CR = \Sigma(AF1+AF2+AF3+AF4+AF5+AF6)/n$ (where n=6)

Example: 3.1+3.5+0.0+0.5+0.5+0=8.0/6.0=1.33

COLOR BLOCK DEPTH 60 ($CBD_{60}$), see FIG. 28

Refers to Color Block analysis of a Stitched Image

Step 1. Use 1:3 Stitched Image

Step 2. Divide into 4 equal sized Quadrants

Step 3. Color Extract each quadrant

Step 4. Compare % for symmetrical and non-symmetrical color distribution and other patterns.

See FIG. 21.

TABLE 7

|  | $CB_{blue}$ | $CB_{black}$ | $CB_{green}$ |
|---|---|---|---|
| Im0.4$Q_{256}$ | 54.6 | 33.9 | 11.5 |
| Im1:3.Q.1 | 90.3 | 5.3 | 3.3 |
| Im1:3.Q.2 | 94.4 | — | 5.6 |
| Im1:3.Q.3 | 0.8 | 90.1 | 9.1 |
| Im1:3.Q.4 | 24.6 | 67.7 | 7.7 |

Rules Chart

| Value | $HQ_1$ | $HQ_2$ | $HQ_3$ | $HQ_4$ |
|---|---|---|---|---|
| 1 | A | A | A | A(B) |
| 0.75 | A | A | B | B |
| 0.5 | A | A | B | C |
| 0.5 | A | B | A | B |
| 0.25 | A | B | C | A |
| 0 | A | B | C | D |

$CBD_{60} = .05$

COLOR BLOCK$_{(DEPTH)}$

General: COLOR BLOCK$_{(DEPTH)}$=$CBD_{100}/CBD_{60}$

Example: COLOR BLOCK$_{(DEPTH)}$=0.5/0.5=1

AESTHETIC VALUE ($V_{AES}$)
General: AESTHETIC VALUE ($V_{AES}$)=1/(($CBD_{100}$) ($CBD_{Depth}$))=
Example: $V_{AES}$=1/((1.0)(0.5))=2
SWITCH CAPACITV ($CF_{(Q)}$)
General: $CF_{(Q)}$=$V_{AES}$+CR
Example: $CF_{(Q)}$=$2_S$+1.33=3.33
COMPOSITING FACTOR ($CF_{(CR)}$)
General:
COMPOSITING FACTOR ($CF_{(CR)}$)=$CF_{(Q)}$−.25
Example: $CF_{(CR)}$=(3.33−.25)=3.08

ALTERNATIVES AND EXTENSIONS

Each embodiment disclosed herein may be used or otherwise combined with any of the other embodiments disclosed. Any element of any embodiment may be used in any embodiment. Although the invention has been described with reference to specific embodiments, it will be understood by those skilled in the art that various changes may be made, and equivalents may be substituted for elements thereof without departing from the true spirit and scope of the invention. In addition, modifications may be made without departing from the essential teachings of the invention.

The invention claimed is:

1. A method of analyzing images comprising:
determining, by a machine, one or more contiguities of an image, each contiguity of the one or more contiguities, being a group of picture elements that are adjacent to one another that form a continuous image element that extends at least as much horizontally as vertically and that extends horizontally across most the image, the machine including a processor system having one or more processors and a memory system;
determining, by the processor system, a value that represents how many contiguities are in the image; and
determining, by the machine, features of the image based on one or more computed aspects of the image that include at least the one or more contiguities and the value representing how many contiguities are in the image.

2. The method of claim 1, further comprising
determining, by the machine, a value representing an internal contrast within the image; and
the one or more computed aspects include the value representing the internal contrast.

3. The method of claim 1, further comprising
removing, by the machine, one or more portions of the image;
computing, by the machine, a threshold map, where the threshold map sets pixels having a pixel value that is less than a threshold to a first value and pixels having a pixel value above the threshold to a second value; and
determining, by the machine, contiguities of the one or more contiguities based on the threshold map.

4. The method of claim 3, further comprising computing multiple threshold maps based on different thresholds.

5. The method of claim 3, wherein the threshold is a brightness threshold, and the pixels having a brightness below the threshold are set to the first value and the pixels having a brightness above the threshold are set to the second value.

6. The method of claim 3, wherein the threshold is a color threshold, and the pixels having a color value below the threshold are set to the first value and the pixels having a color value above the threshold are set to the second value.

7. The method of claim 1, further comprising
determining, by the machine, disruptions in the one or more contiguities;
assigning, by the machine, a lower value for a contiguity continuity value of a contiguity having disruption than to a contiguity that does not have the disruption; and
computing a contiguity rating based on the contiguity continuity value; and
the one or more computed aspects include the contiguity rating.

8. The method of claim 1, further comprising
determining, by the machine, changes in angle of the one or more contiguities;
assigning, by the machine, a lower value for a contiguity continuity value of a contiguity having larger changes in angle than to a contiguity that does has the smaller changes in angle; and computing a contiguity rating based on the contiguity continuity value; and
the one or more computed aspects include the contiguity rating.

9. The method of claim 1, further comprising:
determining a contiguity linearity value that represents a linearity of the one or more contiguities of the image, the computed aspects including the contiguity linearity.

10. The method of claim 1, further comprising:
for each of a multiplicity of pixels, determining a color of a pixel;
determining which of a predetermined set of colors, to which the color of the pixel is closest;
associating the pixel with the color that was determined to be the closest;
determining a value for representing a color distribution that is based on the determining of which of the predetermined set of colors, to which the pixel was determined to be closest;
determining a contiguity rating based on the value representing the color distribution, the contiguity rating being one or more computed aspects of the image.

11. The method of claim 1, further comprising:
determining, by the machine, a distribution of colors in the image;
determining, by the machine, a contiguity rating based on the distribution of the colors in the image;
the contiguity rating being part of the one or more computed aspects.

12. A machine-implemented method comprising:
determining, by a machine of a system, one or more contiguities of a plurality of images, a contiguity of the one or more contiguities being a group of picture elements that are adjacent to one another that form a continuous image element that extends at least as much horizontally as vertically and that extends horizontally across most the image, the machine including a processor system having one or more processors and a memory system;
receiving at the machine a first image, the machine including at least the processor system having the one or more processors and the memory system;
determining, by the processor system, a value that represents how many contiguities are in each of the plurality of images;
selecting, by the system, at least two images from the plurality of images based on a category of each image and based on the value that represents how many contiguities are in each image;
removing, by the processor system, one or more vertical strips of the first image; and forming, by the system, a composite image of the first image and second image in which the second image is visible in portions of the composite image where the one or more vertical strips of the first image was removed and showing the first image in remaining portions of the composed image where the vertical strips were not removed.

13. A system comprising:
a processor system having one or more processors and
a memory system storing one or more machine instructions which when invoked cause the processor system to implement a method comprising:
determining, by a machine, one or more contiguities of an image, each contiguity of the one or more contiguities being a group of picture elements that are adjacent to one another that form a continuous image element that extends at least as much horizontally as vertically and that extends horizontally across most the image, the machine including the processor system having the one or more processor and the memory system;
determining, by the processor system, a value that represents how many contiguities are in the image; and
determining, by the machine, features of the image based on one or more computed aspects of the image that include at least the one or more contiguities and the value representing how many contiguities are in the image.

14. The system of claim 13, the method further comprising:
determining, by the machine, a value representing an internal contrast within the image; and
the one or more computed aspects include the value representing the internal contrast.

15. The system of claim 13, the method further comprising:
removing, by the machine, one or more portions of the image;
computing, by the machine, a threshold map, where the threshold map sets pixels having a pixel value that is less than a threshold to a first value and pixels having a pixel value above the threshold to a second value; and
determining, by the machine, contiguities based on the threshold map.

16. The method of claim 15, the method further comprising computing multiple threshold maps based on different thresholds.

17. The method of claim 15, wherein the threshold is a brightness threshold, and the pixels having a brightness below the threshold are set to the first value and the pixels having a brightness above the threshold are set to the second value.

18. The method of claim 15, wherein the threshold is a color threshold, and the pixels having a color value below the threshold are set to the first value and the pixels having a color value above the threshold are set to the second value.

19. The system of claim 13, the method further comprising:
determining, by the machine, disruptions in the contiguities;
assigning, by the machine, a lower value for a contiguity continuity value of a contiguity having disruption than to a contiguity that does not have the disruption; and
computing a contiguity rating based on the contiguity continuity value; and
the one or more computed aspects include the contiguity rating.

20. The system of claim 13, the method further comprising:
determining, by the machine, changes in angle of the contiguities;
assigning, by the machine, a lower value for a contiguity continuity value of a contiguity having larger changes in angle than to a contiguity that does has the smaller changes in angle; and
computing a contiguity rating based on the contiguity continuity value; and
the one or more computed aspects include the contiguity rating.

21. The system of claim 13, the method further comprising:
determining a contiguity linearity value that represents a linearity of the one or more contiguities of the image, the computed aspects including the contiguity linearity.

22. The system of claim 13, the method further comprising:
for each of a multiplicity of pixels, determining a color of a pixel;
determining which of a predetermined set of colors, to which the color of the pixel is closest;
associating the pixel with the color that was determined to be the closest;
determining a value for representing a color distribution that is based on the determining of which of the predetermined set of colors, to which the pixel was determined to be closest;
determining a contiguity rating based on the value representing the color distribution, the contiguity rating being one or more computed aspects of the image.

23. The system of claim 13, the method further comprising:
determining, by the machine, a distribution of colors in the image;
determining, by the machine, a contiguity rating based on the distribution of the colors in the image;
the contiguity rating being part of the one or more computed aspects.

24. The system of claim 13, the method further comprising:
determining, by the machine, one or more color blocks associated with the image;
wherein the determining of the one or more contiguities is based at least in part on the one or more color blocks.

25. The system of claim 13, the method further comprising:
determining, by the machine, one or more edges associated with the image;
wherein the determining of the one or more contiguities is based at least in part on the one or more edges.

26. The system of claim 13, the method further comprising:
determining, by the machine, one or more lines associated with the images;
wherein the determining of the one or more contiguities is based at least in part on the one or more lines.

27. A system comprising:
a processor system having one or more processors and
a memory system storing one or more machine instructions which when invoked cause the processor system to implement a method including at least
determining, by the system, one or more contiguities of a plurality of images, each contiguity of the one or more contiguities being a group of picture elements that are adjacent to one another that form a continuous image element that extends at least as much horizontally as vertically and that extends horizontally across most the image;

receiving, at the system, a first image, the machine including at least a processor system having one or more processors and a memory system;

determining, by the processor system, a value that represents how many contiguities are in each of the plurality of images;

selecting, by the system, at least two images from the plurality of images based on a category of each image and based on the value that represents how many contiguities are in each image;

removing, by the processor system, one or more vertical strips of the first image; and forming, by the system, a composite image of the first image and a second image in which the second image is visible in portions of the composite image where the one or more vertical strips of the first image was removed and showing the first image in remaining portions of the composed image where the vertical strips were not removed.

* * * * *